US012806981B2

(12) United States Patent
Watt

(10) Patent No.: US 12,806,981 B2
(45) Date of Patent: Nov. 24, 2026

(54) LIFT SYSTEM FOR MODIFYING SEPARATION DISTANCE BETWEEN A VEHICLE COVER AND A VEHICLE BED

(71) Applicant: Darren James Watt, Lindell Beach (CA)

(72) Inventor: Darren James Watt, Lindell Beach (CA)

( * ) Notice: Subject to any disclaimer, the term of this patent is extended or adjusted under 35 U.S.C. 154(b) by 382 days.

(21) Appl. No.: 18/513,360

(22) Filed: Nov. 17, 2023

(65) Prior Publication Data

US 2024/0166037 A1 May 23, 2024

Related U.S. Application Data

(60) Provisional application No. 63/426,614, filed on Nov. 18, 2022.

(51) Int. Cl.
*B60J 7/16* (2006.01)

(52) U.S. Cl.
CPC .................................. *B60J 7/1614* (2013.01)

(58) Field of Classification Search
CPC ..................................................... B60J 7/1614
See application file for complete search history.

(56) References Cited

U.S. PATENT DOCUMENTS 3,507,535 A 4/1970 Wallace
4,012,070 A * 3/1977 Mertz ...................... B60P 3/32 296/165
4,294,484 A * 10/1981 Robertson ................. B60P 3/34 135/88.13
4,363,380 A 12/1982 Rued et al.
4,603,901 A * 8/1986 McIntosh .................. B60P 3/34 296/26.05
4,815,786 A * 3/1989 McRay ..................... B60P 3/34 296/26.05
5,366,266 A * 11/1994 Harbison ............... B60J 7/1614 296/165
6,707,173 B2 3/2004 Bauman et al.
6,749,252 B2 * 6/2004 Cervenka ................ B60P 3/341 296/165
6,896,313 B2 5/2005 Mack et al.
6,929,303 B1 8/2005 Sharples
7,513,562 B2 4/2009 Hardy et al.
8,186,739 B2 5/2012 Bruestle et al.
(Continued)

FOREIGN PATENT DOCUMENTS

| | | | |
|---|---|---|---|
| EP | 2824061 | A1 | 1/2015 |
| FR | 3054536 | A1 | 2/2018 |
| WO | 2017125113 | A1 | 7/2017 |

*Primary Examiner* — Robert E Fuller

(57) ABSTRACT

A system for modifying a separation distance between a vehicle cover and a vehicle bed comprises a plurality of lift members coupled to the vehicle bed and the vehicle cover. Each lift member comprises an active actuator actuatable to extend each lift member and a passive actuator operable to extend each lift member. Actuating the active actuators of first ones of the lift members causes the passive actuators of second ones of the lift members to extend to move the vehicle cover away from the vehicle bed by a first separation distance. Actuating the active actuators of the second ones of the lift members causes the passive actuators of the first ones of the lift members to extend to move the vehicle cover away from the vehicle bed by a second separation distance.

20 Claims, 26 Drawing Sheets

(56) References Cited

U.S. PATENT DOCUMENTS

| | | | |
|---|---|---|---|
| 8,215,241 | B2 | 7/2012 | Garneau et al. |
| 9,475,371 | B2 | 10/2016 | LaBiche |
| 9,663,981 | B2 | 5/2017 | Conner et al. |
| 9,849,763 | B1 | 12/2017 | Sullivan |
| 10,457,128 | B2 | 10/2019 | Sullivan |
| 10,538,151 | B2 | 1/2020 | Sullivan |
| 10,611,219 | B2 | 4/2020 | Trinier |
| 11,440,481 | B1 * | 9/2022 | Cooper .............. B62D 33/0276 |
| 2003/0146646 | A1 | 8/2003 | Cervenka |
| 2009/0267381 | A1 | 10/2009 | Huddleston et al. |
| 2011/0001333 | A1 * | 1/2011 | Bruestle ................. B60J 7/1614 296/100.05 |
| 2011/0095559 | A1 * | 4/2011 | Edens .................... B60J 7/1614 296/100.1 |
| 2018/0326826 | A1 * | 11/2018 | Møller ................... B60J 7/1614 |
| 2019/0061497 | A1 | 2/2019 | Trinier |
| 2019/0359041 | A1 * | 11/2019 | Sullivan ..................... B60J 7/12 |

* cited by examiner

LIFT SYSTEM FOR MODIFYING SEPARATION DISTANCE BETWEEN A VEHICLE COVER AND A VEHICLE BED

BACKGROUND

This disclosure relates generally to systems for modifying a separation distance between a vehicle cover and a vehicle bed, and more specifically to a lift system comprising a plurality of lift members, each of the lift members having an active actuator and a passive actuator.

Existing systems for lifting a vehicle cover relative to a vehicle bed may not provide sufficient separation distance to enable an operator to stand between the vehicle cover and the vehicle bed once fully extended. Additionally, existing systems for lifting vehicle covers may require complex attachments to the vehicle cover and/or the vehicle bed, or require complex and expensive components to achieve the desired separation distance. Finally, existing systems for lifting the vehicle cover may also lack stability during the lifting process. There exists a need for continued improvement of systems for lifting vehicle covers relative to vehicle beds.

SUMMARY

In one embodiment, there is provided a system for modifying a separation distance between a vehicle cover and a vehicle bed. The system comprises a plurality of lift members coupled to the vehicle bed and the vehicle cover. Each lift member comprises an active actuator actuatable to extend the each lift member and a passive actuator operable to extend the each lift member. Actuating the active actuator of first ones of the plurality of lift members causes the passive actuator of second ones of the plurality of lift members to extend to move the vehicle cover away from the vehicle bed by a first separation distance. Actuating the active actuator of the second ones of the plurality of lift members causes the passive actuator of the first ones of the plurality of lift members to extend to move the vehicle cover away from the vehicle bed by a second separation distance.

In another embodiment, there is provided a method of modifying a separation distance between a vehicle cover and a vehicle bed with a plurality of lift members coupled to the vehicle cover and the vehicle bed, each lift member of the plurality of lift members comprising an active actuator and a passive actuator. The method comprises actuating the active actuator of first ones of the plurality of lift members to cause the passive actuator of second ones of the plurality of lift members to extend to move the vehicle cover away from the vehicle bed by a first separation distance and actuating the active actuator of the second ones of the plurality of lift members to cause the passive actuator of the first ones of the plurality of lift members to extend to move the vehicle cover away from the vehicle bed by a second separation distance.

Other aspects and features of the present disclosure will become apparent to those ordinarily skilled in the art upon review of the following description of specific embodiments of the disclosure in conjunction with the accompanying figures.

BRIEF DESCRIPTION OF THE DRAWINGS

In drawings which illustrate embodiments.

DETAILED DESCRIPTION

Figure 1:
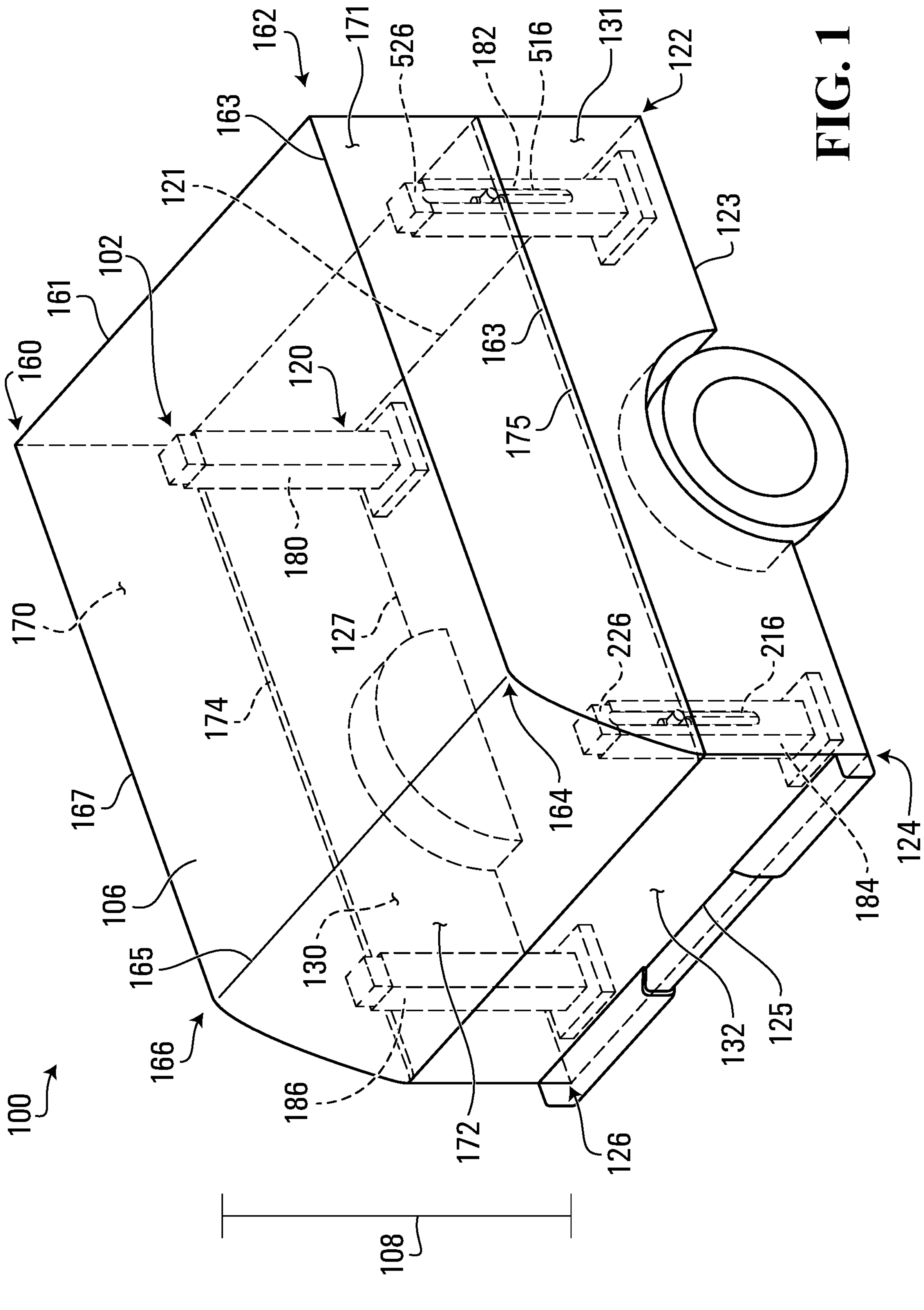
FIG. 1 is a perspective view of a vehicle lift system in a collapsed configuration in accordance with one embodiment.

Referring to FIGS. 1-4, a vehicle cover lift system according to a first embodiment is shown generally at 100. The vehicle cover lift system 100 includes a plurality of lift members 102 configured to be coupled to a vehicle bed 104 and to a vehicle cover 106 to modify a separation distance 108 between a bed surface 128 of the vehicle bed 104 and a cover surface 168 of the vehicle cover 106 as described below. In the embodiment shown, the vehicle bed 104 and the vehicle cover 106 form a part of a rear end of a pickup truck. In other embodiments, the vehicle bed and cover 104 and 106 may form other parts of different vehicles, such as a part of a trailer which would be hitched to a vehicle, a part of the body of a van, bus or other vehicle for example.

In the embodiment shown, the vehicle bed 104 has a generally rectangular configuration and includes a top left corner 120, a top right corner 122, a bottom right corner 124 and a bottom left corner 126. The top left and right corners 120 and 122 are connected with a top edge 121; the right top and bottom corners 122 and 124 connected via a right edge 123; the bottom right and left corners 124 and 126 are connected by a bottom edge 125; and the left bottom and top corners 126 and 120 are connected by a left edge 127. The vehicle bed 104 generally functions to receive cargo or other loads and further includes side walls 130 and 131 for retaining the cargo or other loads in the vehicle bed surface 104 and a rear wall 132 which may be opened to facilitate loading of the cargo or loads onto the bed surface 128 and closed to facilitate retaining the cargo or loads in the vehicle bed 104.

Figure 2:
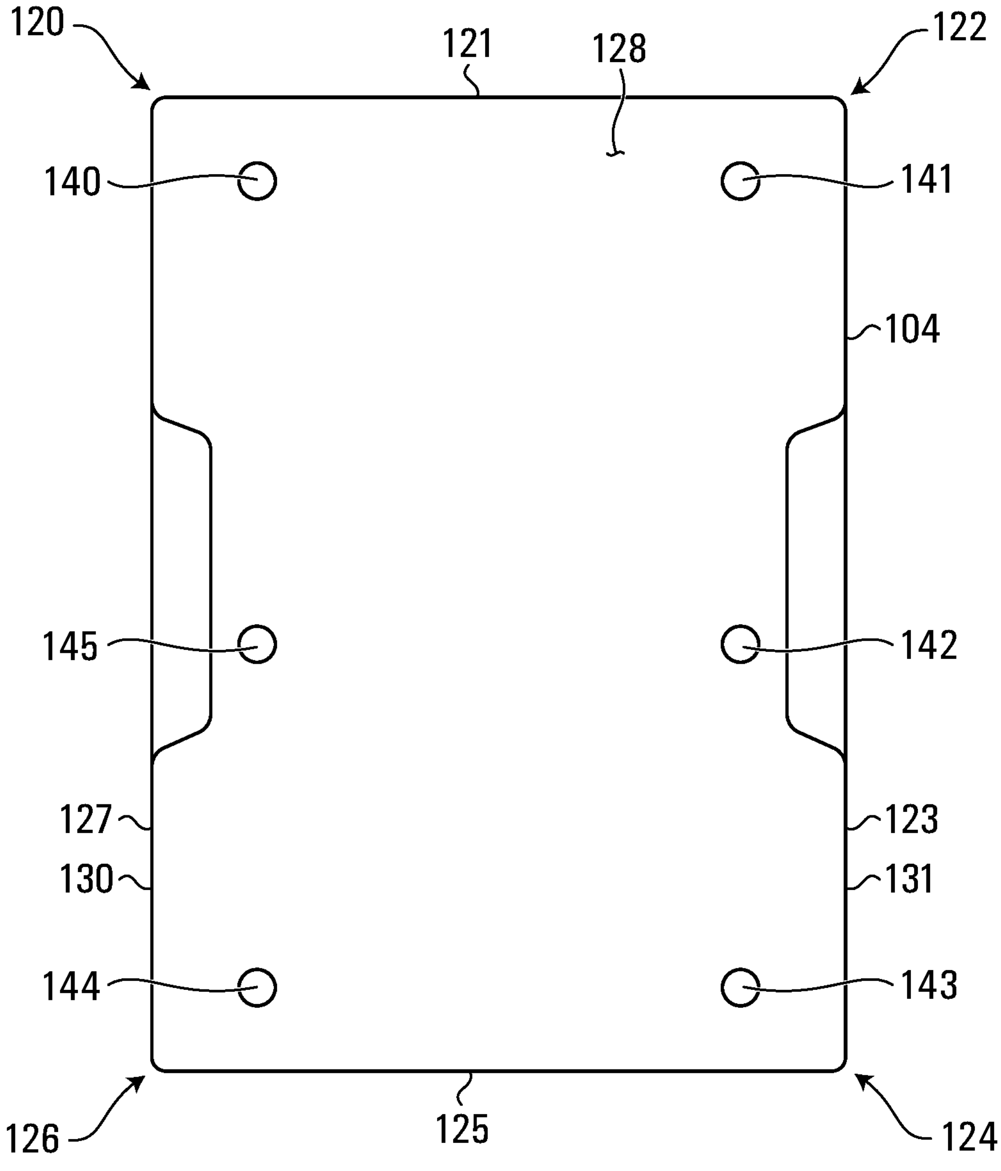
FIG. 2 is a plan view of a vehicle bed of the vehicle lift system of FIG. 1 in accordance with one embodiment.

Referring to FIG. 2, certain vehicles, including Ford® pickup truck models such as the F-150, F-250, F-350 or Ranger for example, and Toyota® pickup truck models such as the Tacoma and Tundra for example, includes factory installed bolts to fasten the vehicle bed 104 to the chassis of the vehicle. In the embodiment shown, the vehicle bed 104 may include six vehicle bed bolts 140, 141, 142, 143, 144, and 145 positioned respectively proximate the top left corner 120, proximate the top right corner 122, at a midway point proximate the right edge 123, proximate the bottom right corner 124, proximate the bottom left corner 126 and at a midway point proximate the left edge 127. In other embodiments, the vehicle bed 104 may include additional or fewer vehicle bed bolts, and may not include the vehicle bed bolts 142 and 145 for example, or may include additional vehicle bed bolts at midway points proximate the top and bottom edges 121 and 125 for example.

Referring back to FIGS. 1, 3 and 4 the vehicle cover 106 has a generally rectangular configuration corresponding to the regular configuration of the vehicle bed 104, and includes a top left corner 160 (corresponding to the top left corner 120), a top right corner 162 (corresponding to the top right corner 122), a bottom right corner 164 (corresponding to the bottom right corner 124), and a bottom left corner 166 (corresponding to the bottom left corner 126). Similar to the vehicle bed 104, the vehicle cover 106 top left and right corners 160 and 162 are connected with a top edge 161 (corresponding to the top edge 121); the right top and bottom corners 162 and 164 connected via a right edge 163 (corresponding to the right edge 123); the bottom right and left corners 164 and 166 are connected by a bottom edge 165 (corresponding to the bottom edge 125); and the left bottom and top corners 166 and 160 are connected by a left edge 167 (corresponding to the left edge 127). In other embodiments, the vehicle bed and cover 104 and 106 may have other corresponding configurations, such as triangular, square, circular, or irregular polygonal for example.

The vehicle cover 106 includes the cover surface 168 forming a top of the vehicle cover 106 to protect the cargo or loads in the vehicle bed 104. The vehicle cover 106 further includes left and right side walls 170, 171 and a rear wall 172 extending from the cover surface 168. The cover left and right side walls 170, 171 and the cover rear wall 172 may generally be configured to releasably couple to the bed side walls 130, 131 and the bed rear wall 132 of via at least one releasable coupling (not shown). The releasable coupling may be any number of mechanisms and fasteners known to one of ordinary skill in the art. The vehicle cover 106 may further include a horizontal left ledge 174 extending along the left edge 167 and a horizontal right ledge 175 extending along the right edge 163, which may facilitate coupling of the vehicle cover 106 to the vehicle bed 104 and coupling of the plurality of lift members 102 to the vehicle cover 106 as described below.

Lift Members 102

Figure 3:
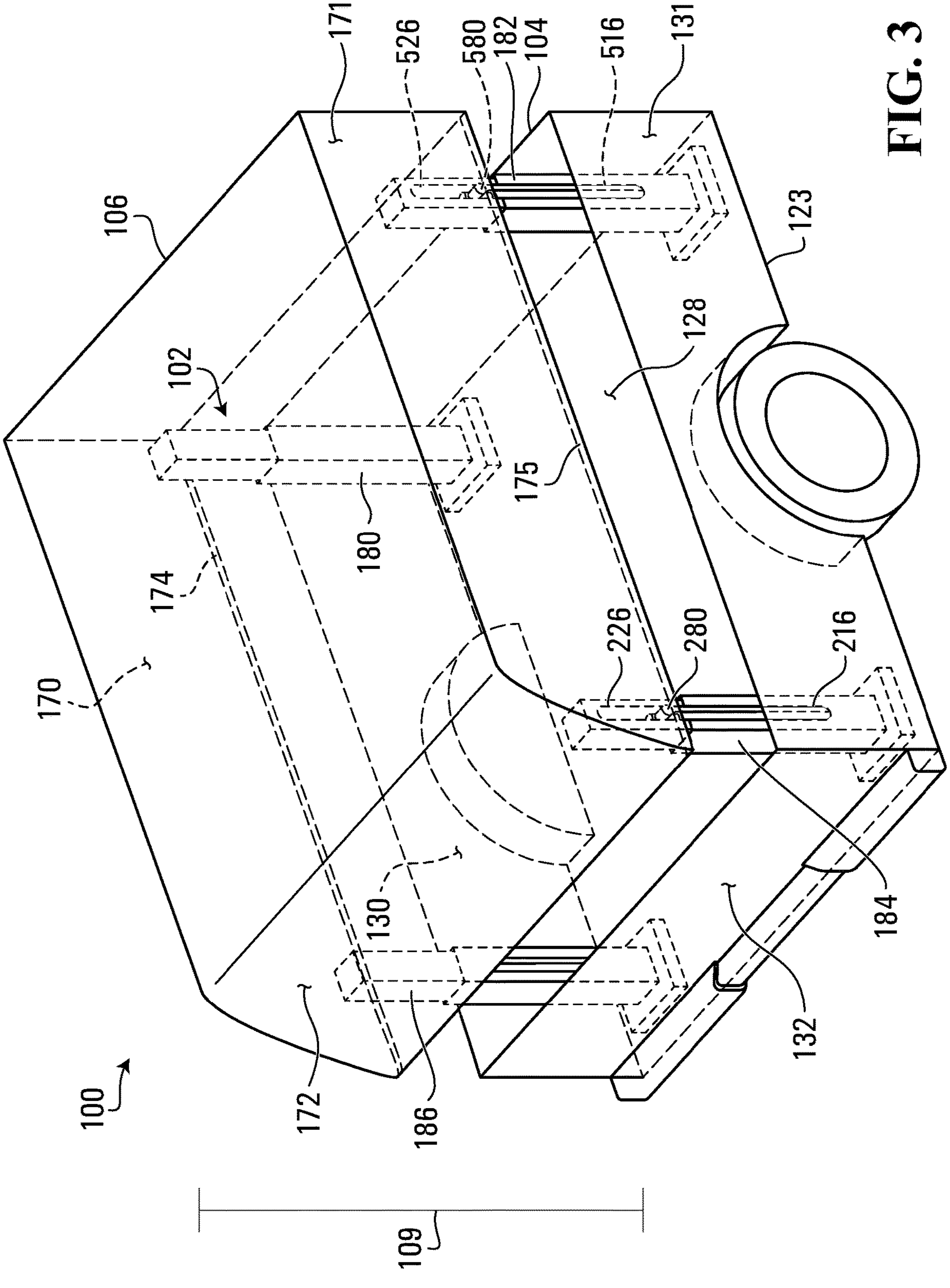
FIG. 3 is a perspective view of the vehicle lift system of FIG. 1 in a first extended configuration in accordance with one embodiment.
Figure 4:
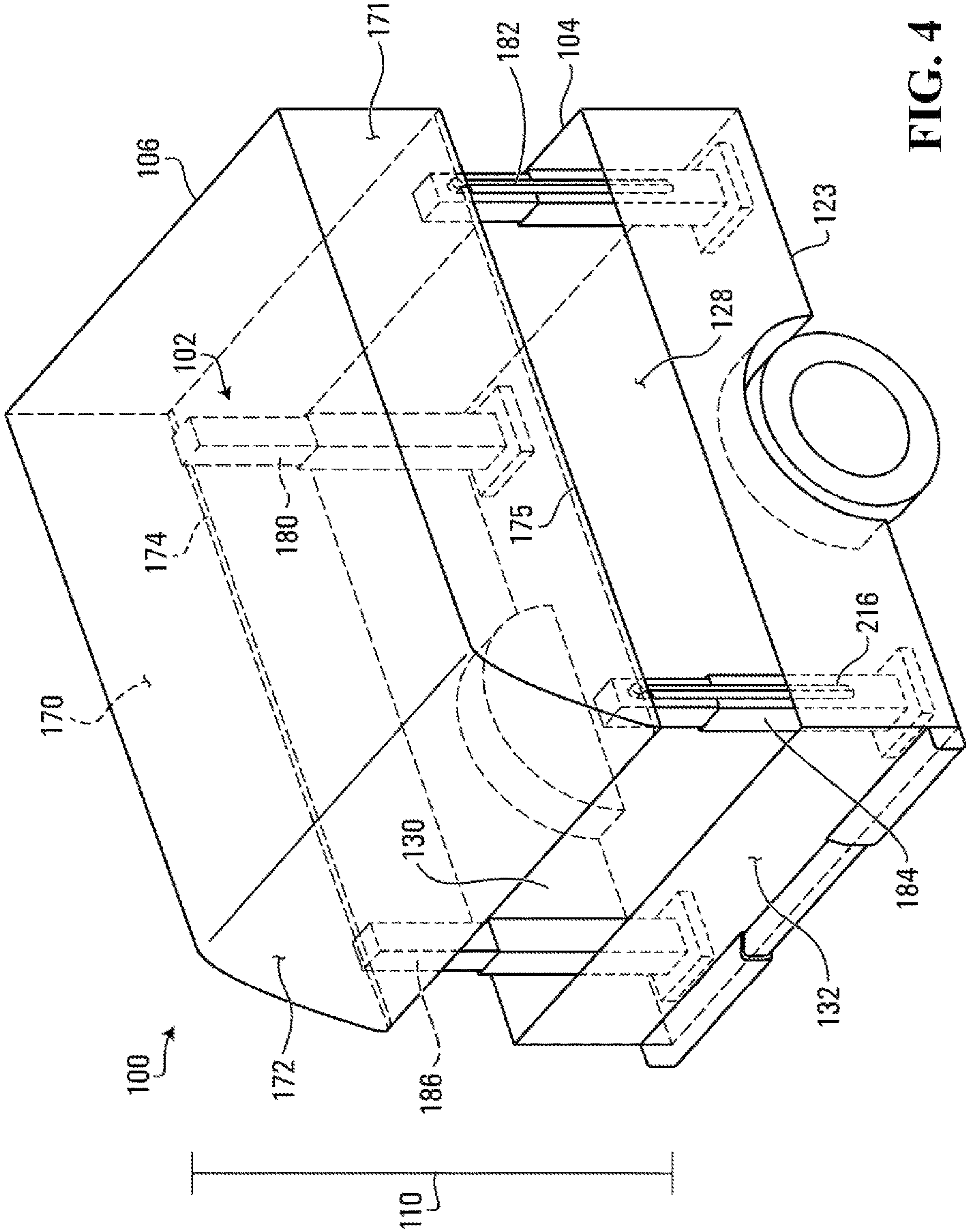
FIG. 4 is a perspective view of the vehicle lift system of FIG. 1 in a second extended configuration in accordance with one embodiment.

Still referring to FIGS. 1, 3 and 4 in addition to the releasable coupling, the vehicle bed 104 and the vehicle cover 106 are further coupled via the plurality of lift members 102 which generally function to adjust the separation distance 108 between the cover surface 168 of the vehicle cover 106 and the bed surface 128 of the vehicle bed 104. In the embodiment shown, the plurality of lift members 102 include four lift members, including a first lift member 180 connecting the vehicle bed and cover 104 and 106 proximate their respective top left corners 120 and 160, a second lift member 182 connecting the vehicle bed and cover 104 and 106 proximate their respective top right corners 122 and 162, a third lift member 184 connecting the vehicle bed and cover 104 and 106 proximate their respective bottom right corners 124 and 164, and a fourth lift member 186 connecting the vehicle bed and cover 104 and 106 proximate their respective bottom left corners 126 and 166. In other embodiments, the plurality of lift members 102 may include additional or fewer lift members. For example, in certain embodiments, the plurality of lift members 102 may include five, six, or eight lift members, including additional lift members connecting the vehicle bed and cover 104 and 106 at midway points along their respective top edges 121 and 161, at midway points along their respective right edges 123 and 163 and/or at midway points along their respective left edges 127 and 167. In yet other embodiments, the plurality of lift members 102 may include an even number of lift members, such as two, four, six, or eight lift members for example.

Referring to FIGS. 1, 3 and 4, each lift member of the plurality of lift members 102 includes a respective base member and respective extension member and each lift member houses a respective active actuator and a respective passive actuator. Actuation of the active and passive actuators move the vehicle cover 106 away from the vehicle bed 104 and specifically from a collapsed configuration shown in FIG. 1 having the first separation distance 108 between the cover and bed surfaces 168 and 128; to a first extended configuration shown in FIG. 3 having a second separation distance 109 between the cover and bed surfaces 168 and 128; and then to a second extended configuration shown in FIG. 4 having a third separation distance 110 between the cover and bed surfaces 168 and 128, as described below. In the embodiment shown in FIGS. 1, 3 and 4, the first separation distance 108 is approximately 38 inches, the second separation distance 109 is approximately 65 inches, and the third separation distance 110 is approximately 78 inches; in other embodiments, the first separation distance 108 may range between approximately 18 and 50 inches, the second separation distance 109 may range between approximately 32 and 77 inches and the third separation distance 110 may range between approximately 46 and 90 inches.

First Type of Lift Member 200

Figure 5C:
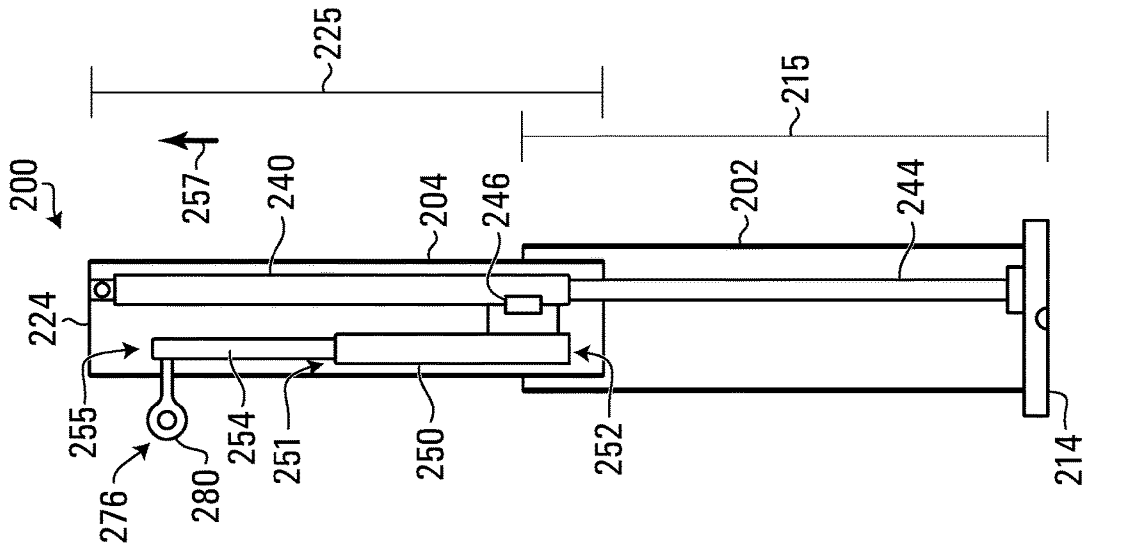
FIGS. 5A-5C are side schematics of a first type of lift member of the vehicle lift system of FIG. 1 in nested and extended configurations in accordance with one embodiment.
Figure 5B:
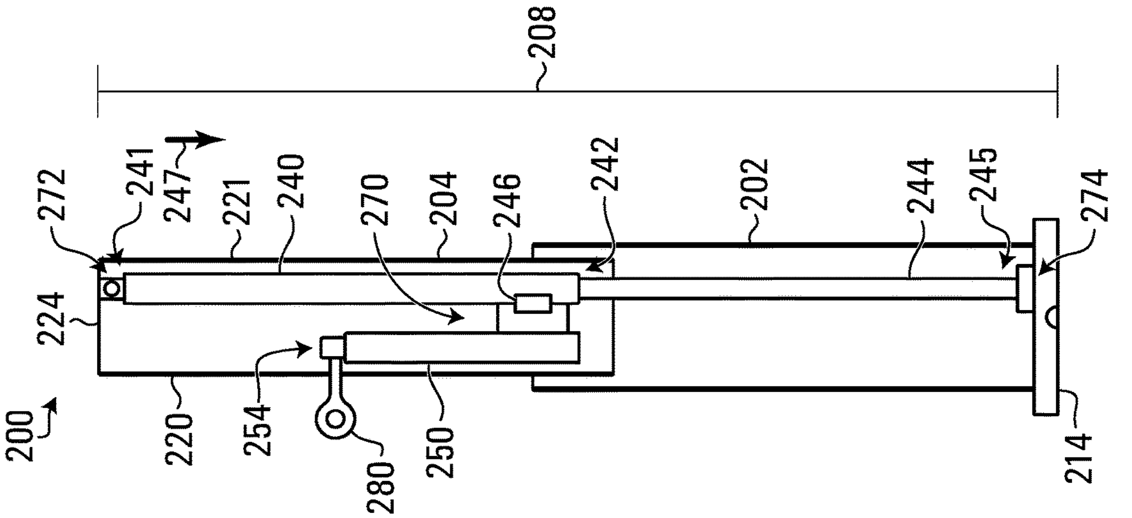
Figure 5A:
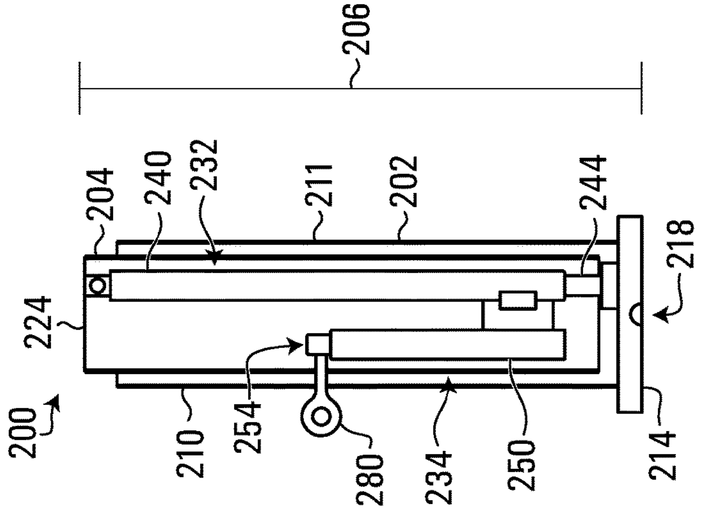

Referring to FIGS. 5A-5C, a first type of lift member which may be used as at least one or at least two of the first, second, third and fourth lift members 180, 182, 184 and 186 is shown generally at 200. For example, the first type of lift member 200 may be used as either both the first and third lift members 180 and 184 or as both the second and fourth lift members 182 and 186.

i) Base Member 202 and Extension Member 204

The lift member 200 includes a base member 202 and an extension member 204 nested within the base member 202. In the embodiment shown, the base member 202 has left and right side walls 210 and 211, front and rear end walls, and a baseplate 214. In the embodiment shown, the base member 202 has a height 215 (shown in FIG. 5C) of approximately 32 inches, a width of approximately 3.75 inches and a length of approximately 6.75 inches; in other embodiments, the height 215 may range between approximately 18 and 48 inches, and the base member 202 may have a width ranging between approximately 2.25 and 6.75 inches, and a length ranging between approximately 2.25 and 6.75 inches. The left side wall 210 may include a slot 216 (shown in FIGS. 1, 3 and 4) to receive a rod connector 280 coupling the lift member 200 to the vehicle cover 106 as described below and which allow movement of the rod connector 280 across a portion of the height 215. In the embodiment shown, the base member slot 216 has a height of approximately 13 inches and a width of approximately 0.75 inches and begins approximately 17 inches from the baseplate 214; in other embodiments, the slot 216 may have a height ranging between approximately 10 and 26 inches, a width ranging between approximately 0.5 and 1 inch, and may begin between approximately 8 and 22 inches from the baseplate 214.

The baseplate 214 fixedly couples the lift member 200 to the vehicle bed 104 via a bed coupling 218. In the embodiment shown, the bed coupling 218 includes a baseplate aperture configured and dimensioned to receive a single one of the vehicle bed bolts 140, 141, 142, 143, 144 and 145 (shown in FIG. 2) which couple the vehicle bed 104 to the chassis of the vehicle. In other words, a single fastener (e.g., a single one of the bed bolts 140, 141, 142, 143, 144 and 145) may be used to couple the lift member 200 to the vehicle bed 104. In the embodiment shown, the baseplate aperture has a diameter of approximately 0.5 inches to receive the single one of the vehicle bed bolts 140, 141, 142, 143, 144 and 145; however in other embodiments, the baseplate aperture may have a diameter ranging between approximately 0.25 and 0.75 inches. The baseplate 214 may be configured and dimensioned to stabilize to the lift member 200 once attached to the vehicle bed 104 via the single one of the vehicle bed bolts 140, 141, 142, 143, 144 and 145, and may have a width of approximately 8 inches, a length of approximately 12 inches and a height of approximately 0.375 inches, and may be made from 304 stainless steel. In other embodiments, the baseplate 214 may have a width ranging between approximately 5 and 10 inches, a length ranging between approximately 13 and 16 inches and a height ranging between approximately 0.25 and 0.5 inches and may be made from aluminium, metals, or metal alloys. In yet other embodiments, the baseplate 214 may include at least one other aperture, or other stabilizing features, such as stabilizing grips at a bottom of the baseplate 214. The combination of the baseplate 214 and the single baseplate aperture enables a user to install the lift member 200 to the vehicle bed 104 via the vehicle bed bolts 140, 141, 142, 143, 144 and 145 and without drilling any additional holes into the vehicle bed 104.

The extension member 204 similarly includes left and right side walls 220 and 221, front and rear end walls, and a top plate 224. In the embodiment shown, the extension member 204 has a height 225 (shown in FIG. 5C) of approximately 32 inches, a width of approximately 2 inches and a length of approximately 5 inches; in other embodiments, the height 225 may range between approximately 18 and 48 inches, and the extension member 204 may have a width ranging between approximately 2 and 5 inches, and a length ranging between approximately 2 and 5 inches. In the embodiment shown, the extension member 204 is dimensioned to nested within the base member 202. As such, the width and the length of the extension member 204 may be less than the width and the length of the base member 202. The lift member 200 is configured to be moved between a nested configuration where the extension member 204 is nested within the base member 202 (shown in FIG. 5A) and an extended configuration where the extension member 204 is extended from the base member 202 (shown in FIGS. 5B and 5C) due to actuation of an active actuator 232 as described below. In certain embodiments, movement of the extension member 204 and alignment of the extension and base members 204 and 202 during movement of the extension member 204 may be facilitated by a slider mechanism having a first linear portion coupled to the extension member 204 and a second linear portion coupled to the base member 202, where the first and second linear portions are configured to couple to, and slidably translate relative to, each other. The slider mechanism may be similar to a drawer slider. The first linear portion may be coupled to an internal surface of the base member right side wall 211 while the second linear portion may be coupled to an external surface of the extension member right side wall 221. In the embodiment shown, a total nested height 206 (shown in FIG. 5A) of the lift member 200 from the top plate 224 of the extension member 204 to the baseplate 214 of the base member 202 in the nested configuration is approximately 32 inches, while a total extended height 208 (shown in FIG. 5B) from the top plate 224 to the baseplate 214 in the extended configuration is approximately 60 inches. In other embodiments, the total nested height 206 may range between approximately 18 and 48 inches, and the total extended height 208 may range between approximately 34 and 94 inches.

The left side wall 220 has a slot 226 (shown in FIGS. 1, 3 and 4) to receive the rod connector 280 coupling the lift member 200 to the vehicle cover 106 as described below and to allow movement of the rod connector 280 across a portion of the height 225. In the embodiment shown, the base member slot 226 has a height of approximately 13 inches and a width of approximately 0.5 inches; in other embodiments, the base member slot 226 may have a height ranging between approximately 10 and 26 inches and a width ranging between approximately 0.25 and 1.0 inches. The base member slot 216 and the extension member slot 226 are positioned and dimensioned to overlap and align when the extension member 204 is nested within the base member 202 in the nested configuration (shown in FIG. 5A) and to vertically align when the extension member 204 is extended relative to the base member 202 in the extended configuration (shown in FIGS. 5B and 5C), to allow the rod connector

280 to move across both a portion of the base member height 215 and a portion of the extension member height 225 in the nested configuration, in the extended configuration and in configurations between the nested and extended configurations ii) Active Actuator 232 and Passive Actuator 234

The base and extension members 202 and 204 house the active actuator 232 and a passive actuator 234. In the first type of lift member 200 shown in FIGS. 5A-5C, the active actuator 232 generally comprises a large actuator configured and dimensioned to move the vehicle cover 106 between the collapsed configuration (shown in FIG. 1) and the first extended configuration (shown in FIG. 3), while the passive actuator 234 generally comprises a small actuator configured and dimensioned to move the vehicle cover 106 between the first extended configuration (shown in FIG. 3) and the second extended configuration (shown in FIG. 4).

Referring to FIGS. 5A-5C, the active actuator 232 may be an electric linear actuator having a housing 240 having a top end 241 and a bottom end 242, an extendable rod 244 having a distal end 245 and a direct current (DC) motor 246 configured to supply power to extend and retract the active actuator rod 244 relative to the housing 240 in a downward direction 247. In other embodiments, the active actuator 232 may comprise another type of active actuator, such as a pneumatic actuator, a hydraulic actuator, a multi-stage linear actuator, a direct drive rotary motor actuator and slide guides, and a system of pulleys and cables with electrically powered rollers for example. As noted above, in the first type of lift member 200, the active actuator 232 comprises a large actuator generally configured to move the vehicle cover 106 away from the vehicle bed 104 from the collapsed configuration (shown in FIG. 1) to the first extended configuration (shown in FIG. 3), and may specifically comprises a 12V/24V 700 mm stroke 900 N linear actuator. In other embodiments, the active actuator 232 may comprise a linear actuator having stroke lengths ranging between approximately 500 mm and 2000 mm, and/or an expansive force ranging between 500 N and 1000 N.

Still referring to FIGS. 5A-5C, the passive actuator 234 may be a gas strut or a gas spring having a housing 250 having a top end 251 and a bottom end 252 and an extendable rod 254 having a distal end 255, whereby the passive actuator rod 254 is generally biased toward an extended configuration in an upward direction 257 and may be kept in a retracted configuration by a weight of the vehicle cover 106. In other embodiments, the passive actuator 234 may comprise a type of passive actuator, such as a coil spring, spring strut or a combination of gas and spring strut for example. As noted above, in the first type of lift member 200, the passive actuator 234 may be a small passive actuator generally configured to move the vehicle cover 106 away from the vehicle bed 104 from the first extended configuration (shown in FIG. 3) to the second extended configuration (shown in FIG. 4), and may specifically comprises a 785 mm length, 350 mm stroke 100 N gas strut. In the embodiment shown, the housing 250 has a diameter of approximately 22 mm and the passive actuator rod 254 has a diameter of approximately 10 mm. In other embodiments, the passive actuator 234 may comprise an actuator having length dimensions ranging between approximately 500 mm and 981 mm, corresponding stroke lengths ranging between approximately 250 mm and 450 mm, and/or a force ranging between approximately 50 N and 500 N.

The active actuator housing 240 is coupled with the passive actuator housing 250 via a housing coupling 270 (best shown in FIG. 5B). Generally, the housing coupling 270 enables the entire passive actuator 234 to be raised when the active actuator rod 244 is extended in the downward direction 247. The housing coupling 270 may be a twin hose mounting clamp comprising a first aperture to fit the passive actuator housing 250 and a second aperture to fit the active actuator housing 240, where the first and second apertures are horizontally aligned. The alignment of the first and second apertures may maintain corresponding alignment of the active and passive actuator housings 240 and 250. In other embodiments, the housing coupling 270 may comprise other similar clamping mechanisms known to a skilled person in the art. Additionally, the housing coupling 270 may be positioned to couple the bottom end 242 of the active actuator housing 240 (proximal to an aperture where the active actuator rod 244 extends in the downward direction 247) to the bottom end 252 of the passive actuator housing 250 (distal to an aperture where the passive actuator rod 254 extends in the upward direction 257). In other embodiments, the housing coupling 270 may clamp the active and passive actuator housings 240 and 250 together at alternative or additional locations, such as midway between the top and bottom ends 241 and 242 of the active actuator housing 240, midway between the top and bottom ends 251 and 252 of the passive actuator housing 250, and/or proximate the top end 251 of the passive actuator housing 250 for example. Clamping the active and passive actuator housings 240 and 250 together at more than one location can improve alignment of the active and passive actuator housings 240 and 250 as the first type of lift member 200 moves between the nested configuration (shown in FIG. 5A) and the extended configuration (shown in FIGS. 5B and 5C).

The active actuator housing 240 is also coupled to the extension member 204 proximate to the top plate 224 via an extension member coupling 272 (best shown in FIG. 5B). The extension member coupling 272 may include an aperture in the top end 241 of the active actuator housing 240, corresponding apertures in the front and rear end walls of the extension member 204 proximate to the top plate 224, and a binding bolt (not shown) received in the apertures to couple the active actuator housing 240 to the extension member 204. In the embodiment shown, the apertures in the extension member front and rear end walls may be approximately 0.5 inches from the top plate 224. The active actuator rod 244 is also coupled to the baseplate 214 of the base member 202 via a base member coupling 274 (best shown in FIG. 5B). In the embodiment shown, the base member coupling 274 comprises an aperture at the distal end 245 of the active actuator rod 244, corresponding apertures in the front and rear end walls of the base member 202 proximate to the baseplate 214, and a binding bolt received in the apertures to couple the active actuator rod 244 to the base member 202. In the embodiment shown, the apertures in the front and rear end walls of the base member may be approximately 1 inch from the baseplate 214. The combination of the extension member coupling 272 and the base member coupling 274 enables extension of the lift member 200 from the nested configuration (shown in FIG. 5A) to the extended configuration (shown in FIGS. 5B and 5C) when the active actuator rod 244 is extended in the downward direction 247. After extension of the active actuator rod 244, a locking mechanism may be used to lock the base member 202 relative to the extension member 204 prior to any extension of the passive actuator rod 254 to stabilize the lift member 200 in the extended configuration. For example, the locking mechanism may comprise a bolt extending through apertures in the front and rear end walls of both the base member 202 and the extension member 204 to lock a bottom of the extension member 204 to a top of the base member 202. In other embodiments, the locking mechanism may comprise magnetic fasteners, adhesive fasteners, hook-and-loop fasteners, etc.

Figure 6:
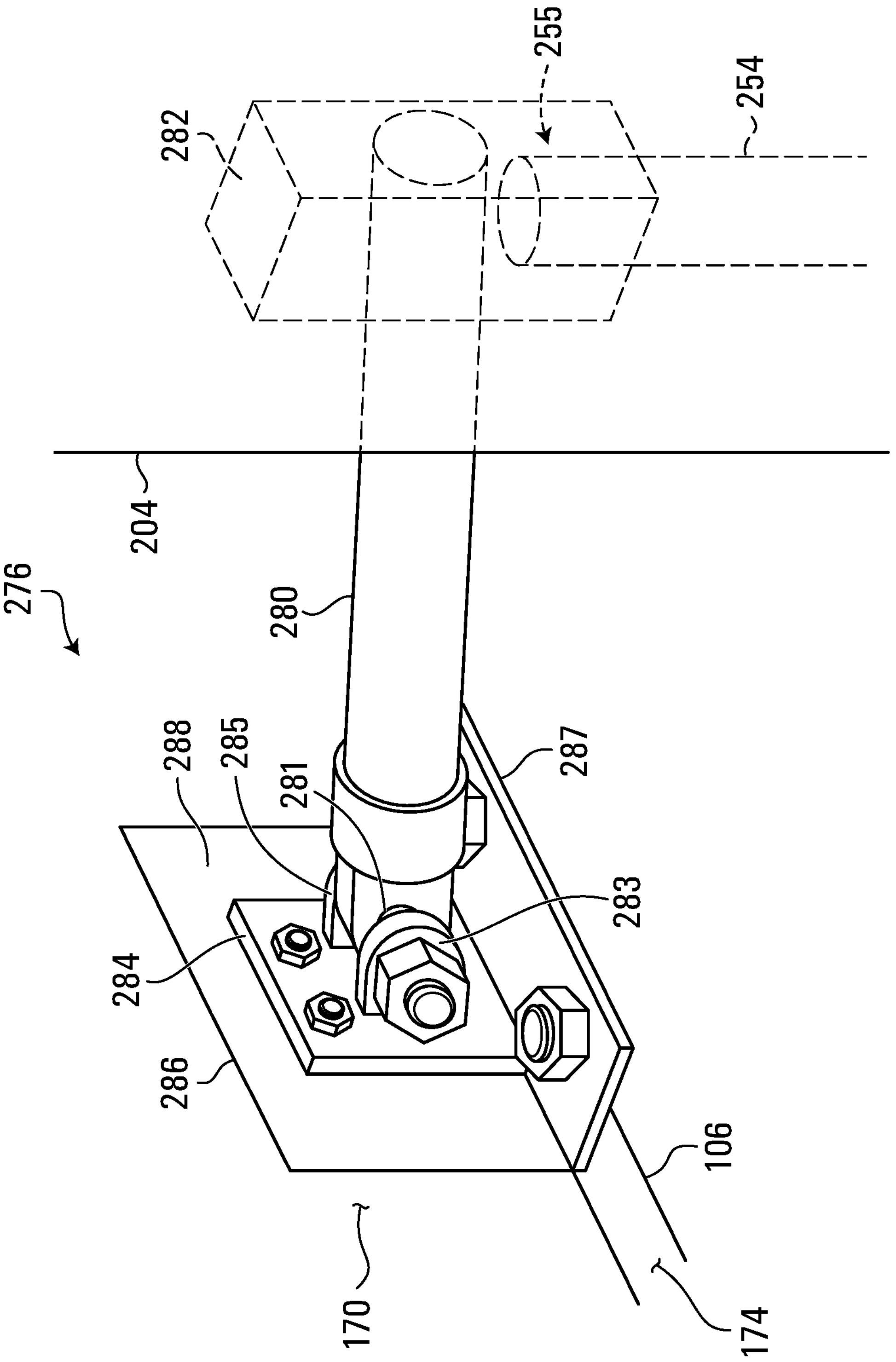
FIG. 6 is a perspective view of a cover coupling of the first type of lift member of FIG. 5A-5C in accordance with one embodiment.

The distal end 255 of the passive actuator rod 254 is coupled to the vehicle cover 106 via a cover coupling 276. The cover coupling 276 may comprise any coupling means known to a person of ordinary skill in the art which couples the distal end 255 of the passive actuator rod 254 to the vehicle cover 106, including different connectors (such as screw- type fastenings), adhesive fastenings, magnetic fastenings, other mechanical fastenings, etc., and may not include specific components described below. Referring to FIG. 6, in the embodiment shown, the cover coupling 276 includes a rod connector 280, a rod connector block 282, a cover connector 284 and a cover connector flange 286. The rod connector 280 generally comprises a rod having threads at a first end and an aperture 281 at a second end. The rod connector block 282 includes a first aperture for retaining the threads of the first end of the rod connector 280 and a second aperture for retaining the distal end 255 of the passive actuator rod 254, and generally functions to connect the rod connector 280 to the distal end 255 of the passive actuator rod 254. The cover connector 284 includes fastener apertures for coupling the cover connector 284 to one of the cover side walls 170, 171 (shown in FIG. 1); in the embodiment shown in FIG. 6, the cover connector 284 is coupled to the cover side wall 170. The cover connector 284 further includes a first protrusion 283 including a first aperture and a second protrusion 285 including a second aperture (not shown), whereby the first and second protrusions 283 and 285 are separated by a distance dimensioned to receive the second end of the rod connector 280. When the second end of the rod connector 280 is received between the first and second protrusions 283 and 285 of the cover connector 284, the aperture 281 of the rod connector 280 is aligned with the first and second apertures of the cover connector 284 and the aligned apertures 281 are operable to receive a through bolt which couples the rod connector 280 and the cover connector 284. The cover connector flange 286 includes a horizontal portion 287 including apertures for receiving fasteners for coupling the cover connector flange 286 to one of the horizontal ledges 174 and 175 of the vehicle cover 106 and a vertical portion 288 including apertures for receiving fasteners for coupling the cover connector flange 286 to one of the cover side walls 170 and 171; in the embodiment shown in FIG. 6, the vertical portion 288 is coupled to the cover side wall 170 and the horizontal portion 287 is coupled to the horizontal ledge 174. The apertures in the vertical portion 288 of the cover connector flange 286 may be dimensioned and positioned to align with the apertures in the cover connector 284, such that the same fasteners may function to couple the cover connector 284 and the cover connector flange 286 together and also to the one of the cover side walls 170 and 171 and the one of the horizontal ledges 174 and 175.

Figure 7A:
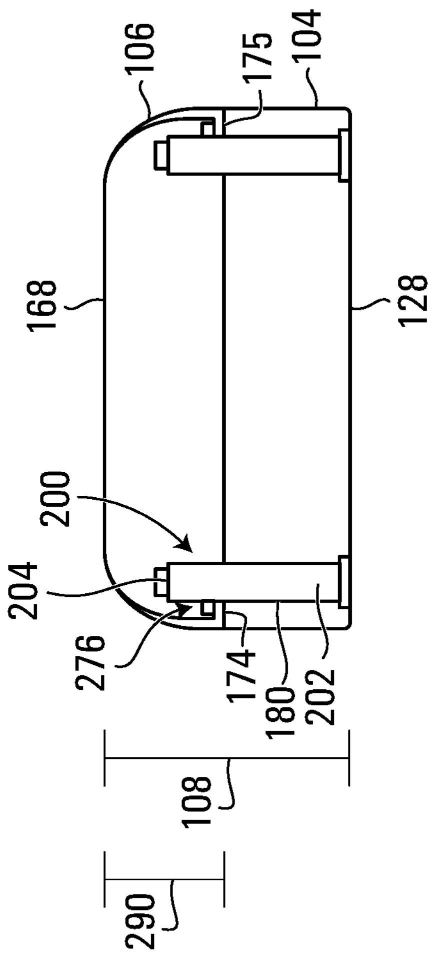
FIGS. 7A and 7B are side schematics of the cover coupling of FIG. 6 in accordance with one embodiment.
Figure 7B:
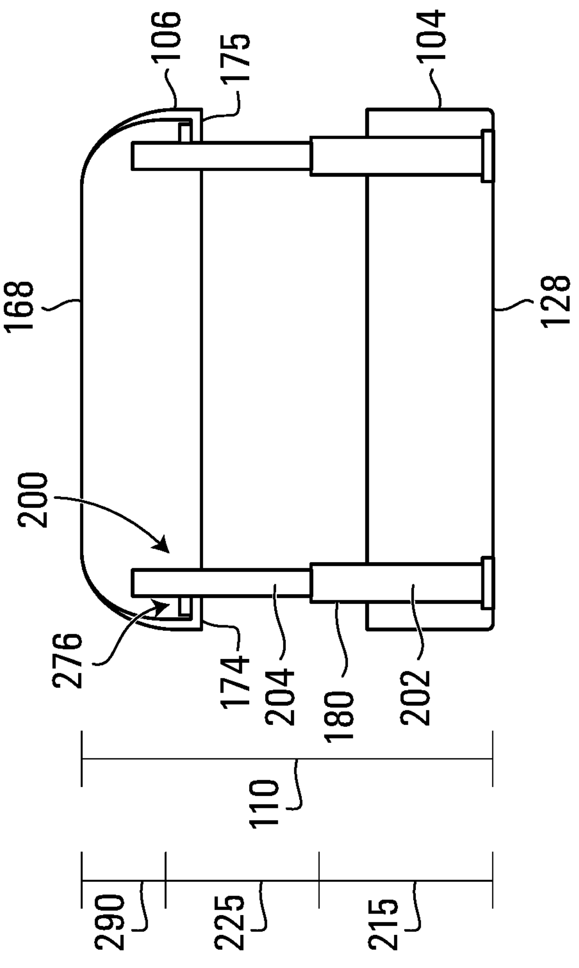

Referring to FIG. 7A and 7B, in the embodiment of the lift member 200 described above, by coupling the distal end 255 of the passive actuator rod 254 to one of the cover side walls 170 and 171 proximate to one of the horizontal ledges 174 and 175 of the vehicle cover 106 (in other words, near a bottom of the cover side walls 170 and 171), the cover coupling 276 may provide the vehicle cover lift system 100 with greater clearance between the bed surface 128 and the cover surface 168 while utilizing smaller lift members 102 and smaller passive and active actuators within such lift members 102. Specifically, by coupling the lift members 102 to near the bottom of the cover side walls 170 and 171, a clearance distance 290 between the bottom of the cover side walls 170 and 171 and the cover surface 168 provides an additional distance between the cover and bed surfaces 168 and 128 which does not need to be provided by actuation of the lift members 102. For example, to achieve the final third separation distance 110 of approximately 78 inches, in the embodiment shown, the lift member 200 includes the base member 202 having the base member height 215 of approximately 32 inches, the extension member 204 having the extension member height 225 of approximately 32 inches, the active actuator 232 comprising the 12V/24V 700 mm stroke 900 N linear actuator, and the passive actuator 234 comprising the 785 mm length, 350 mm stroke 100 N gas strut.

Figure 8A:
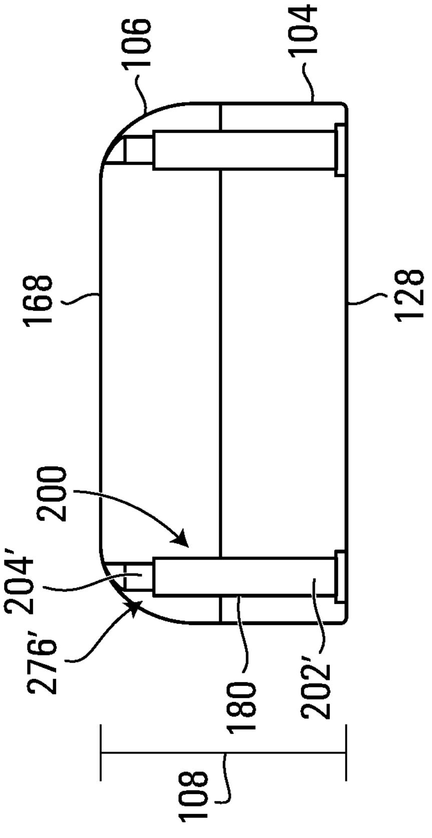
FIGS. 8A and 8B are side schematics of a cover coupling of the first type of lift member of FIGS. 5A-5C in accordance with one embodiment.
Figure 8B:
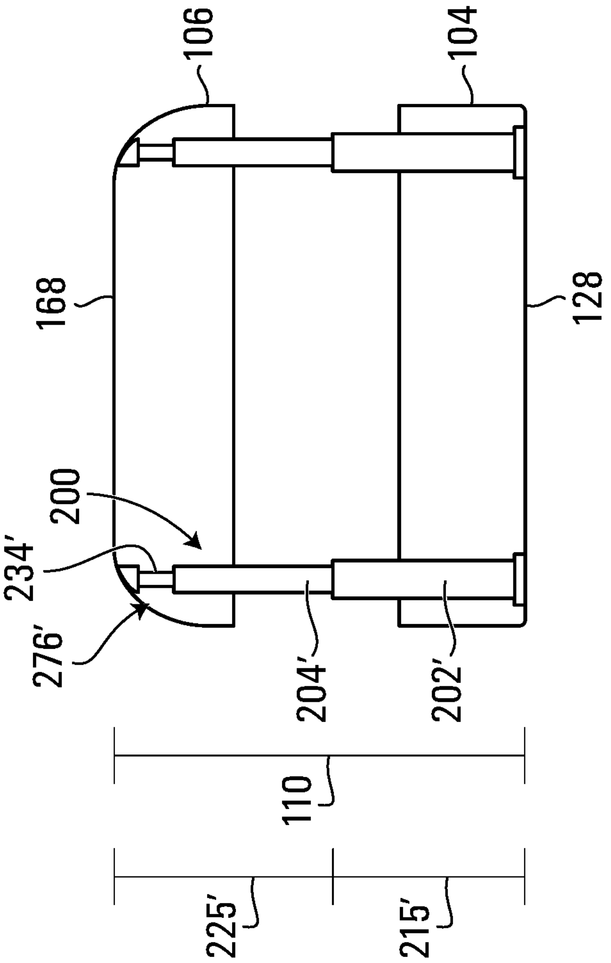

Referring to FIG. 8A and 8B, in other embodiments, the cover coupling may instead comprise a cover coupling 276' configured to couple a distal end of a passive actuator rod of a passive actuator directly to the cover surface 168. For example, the cover coupling 276' may comprise an eyelet fastener coupled to the distal end of the passive actuator rod and a corresponding clevis fastener coupled to the cover surface 168, one or more suction cups coupled to the distal end of the passive actuator rod designed to directly adhere to the cover surface 168, or other attachment mechanisms known to a person of ordinary skill in the art. However, in such embodiments, to achieve the final third separation distance 110 of approximately 78 inches, the lift member 200 may require a base member 202' having a height 215' of approximately 32 inches, an extension member 204' having a height 225' of approximately 32 inches, an active actuator (not shown) comprising a 12V/24V 700 mm stroke 900 N linear actuator, and a passive actuator 234' comprising a 1500 mm length, 700 mm stroke 100 N gas strut, whereby the passive actuator 234' extends past the extension member 204' when the lift member 200 is in the extended configuration and the vehicle cover 106 is in the second extended configuration (shown in FIG. 8B for example).

Referring back to FIG. 5A-5C, the combination of the housing coupling 270, extension member coupling 272, base member coupling 274 and cover coupling 276 generally function to ensure that: (A) extension and retraction of the large active actuator rod 244 results in (1) extension and retraction of the lift member 200 from the nested configuration (shown in FIG. 5A) to the extended configuration (shown in FIG. 5B and 5C) and (2) corresponding rising and lowering of the entire small passive actuator 234 which enables the extension and retraction of the vehicle cover 106 from the collapsed configuration (shown in FIG. 1) to the first extended configuration (shown in FIG. 3), and further that (B) extension and retraction of the small passive actuator rod 254 results in: (3) corresponding extension and retraction of the vehicle cover 106 from the first extended configuration (shown in FIG. 3) to the second extended configuration (shown in FIG. 4). In other embodiments, the housing coupling 270, the extension member coupling 272, the base member coupling 274 and the cover coupling 276 may be any other coupling known to a person of ordinary skill in the art which enables extension of the active and passive actuator rods 244 and 254 to be transferred into the extension and retraction of the vehicle cover 106 between the collapsed configuration, the first extended configuration and the second extended configuration as described above, and may comprise adhesive fastenings, magnetic fastenings, suction-based fastenings etc.

Second Embodiment of First Type of Lift Member 200

The combination of the base member 202, the extension member 204, the active actuator 232, the passive actuator 234, the housing coupling 270, the extension member coupling 272, the base member coupling 274 and the cover coupling 276 enables the vehicle cover 106 to be moved away from the vehicle bed 104 from the collapsed configuration (shown in FIG. 1) to the first extended configuration (shown in FIG. 3) and then to the second extended configuration (shown in FIG. 4). Specific to the first type of lift member 200 described above in association with FIGS. 5A-5C, a large active actuator (the active actuator 232) moves the vehicle cover 106 between the collapsed and the first extended configurations and a smaller passive actuator (the passive actuator 234) facilitates movement of the vehicle cover 106 between the first and second extended configurations. In other embodiments, different configurations and orientations of the base member, the extension member, the active actuator, the passive actuator, and the various couplings may be possible to achieve the same or similar function.

Figure 9C:
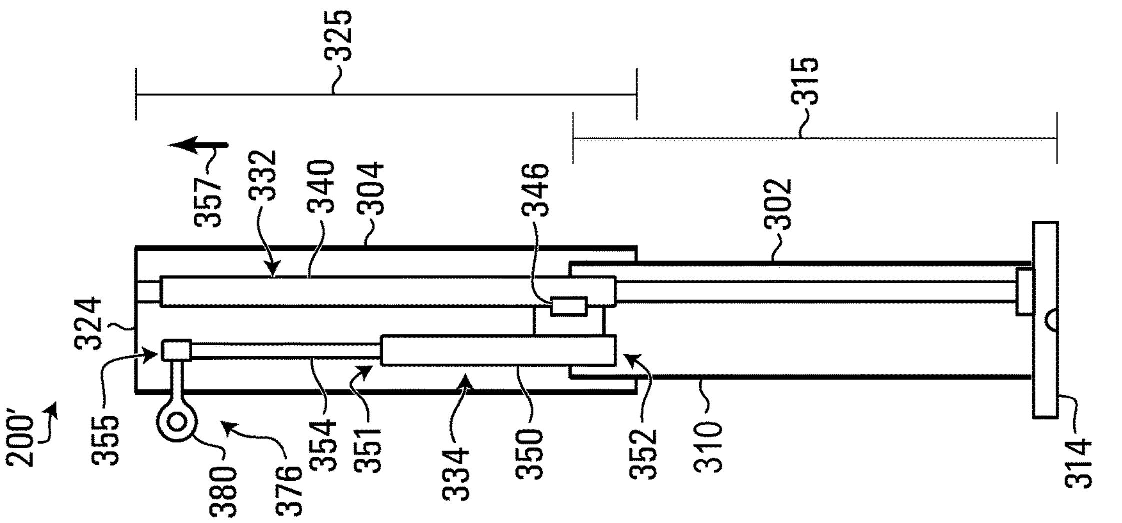
FIGS. 9A-9C are side schematics of a first type of lift member of the vehicle lift system of FIG. 1 in nested and extended configurations in accordance with one embodiment.
Figure 9B:
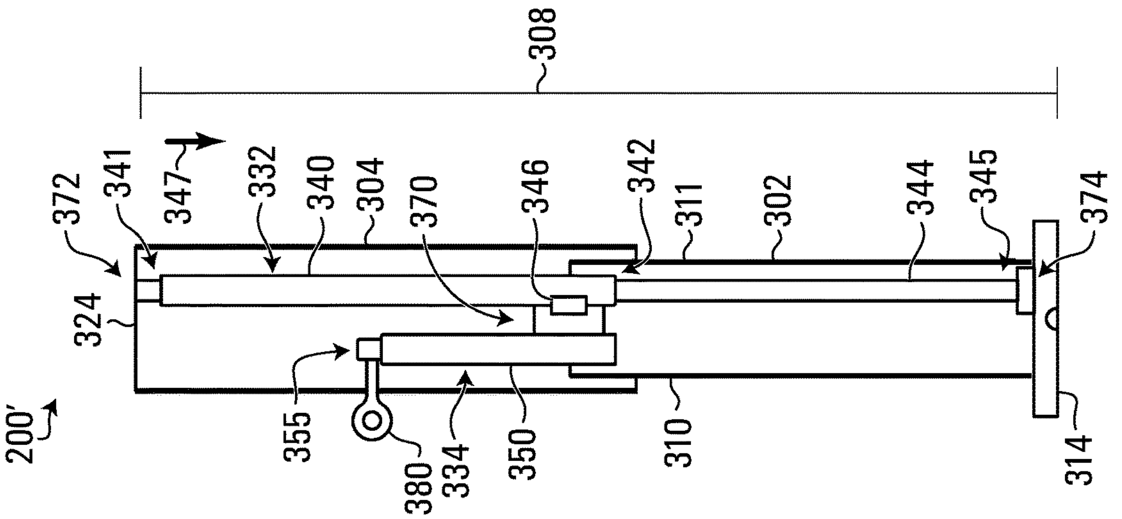
Figure 9A:
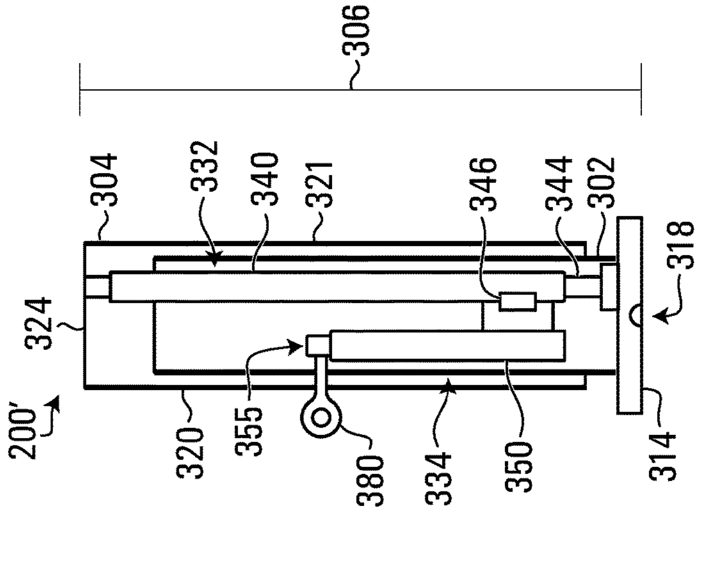

For example, referring now to FIGS. 9A-9C, a second embodiment of the first type of lift members shown generally at 200'. Similar to the first embodiment of the first type of lift member 200 shown in FIGS. 5A-5C, the second embodiment of the first type of lift members 200' may also be used as at least one or at least two of the first, second, third and fourth lift members 180, 182, 184 and 186 (shown in FIGS. 1, 3, and 4), and may be used as either or both the first and third lift members 180 and 184 or as both the second and fourth lift members 182 and 186 for example.

i) Base Member 302 and Extension Member 304

The lift member 200' includes a base member 302 and an extension member 304; however, in the embodiment shown in FIGS. 9A-9C, the base member 302 is configured and dimensioned to be nested within the extension member 304. Similar to the base member 202 of the lift member 200 (shown in FIGS. 5A-5C), the base member 302 also has left and right side walls 310 and 311, front and rear end walls and a baseplate 314. In the embodiment shown, the base member 302 has a height 315 (shown in FIG. 9C) of approximately 32 inches, a width of approximately 2 inches and a length of approximately 5 inches; in other embodiments, the height 315 may range between approximately 18 and 48 inches, and the base member 302 may have a width ranging between approximately 2 and 5 inches, and a length ranging between approximately 2 and 5 inches.

The left side wall 310 may include a slot (not shown) to receive a rod connector 380 coupling the lift member 200' to the vehicle cover 106 and to allow movement of the rod connector 380 across a portion of the height 315. In the embodiment shown, the base member slot has a height of approximately 13 inches and a width of approximately 0.75 inches and begins approximately 17 inches from the baseplate 314; in other embodiments, the base member slot may have a height ranging between approximately 10 and 26 inches and a width ranging between approximately 0.5 inches in approximately 1 inch and may begin between approximately 8 and 22 inches from the baseplate 314. The baseplate 314 fixedly couples the lift member 200' to the vehicle bed 104 via a bed coupling 318. The bed coupling 318 may be similar to the bed coupling 218 of the lift member 200 (shown in FIGS. 5A-5C). The baseplate 314 may be configured and dimensioned to stabilize the lift member 200' once attached to the vehicle bed 104 via the bed coupling 318, and in the embodiment shown in FIGS. 9A-9C, the baseplate 314 has a width of approximately 8 inches, a length of approximately 12 inches, and a height of approximately 0.375 inches, and may be made from 304 stainless steel; in other embodiments, the baseplate 314 may have a width ranging between approximately 5 and 10 inches, a length ranging between approximately 13 and 16 inches and a height ranging between approximately 0.25 and 0.5 inches, may be made from aluminium, metals, or metal alloys, and may have stabilizing features similar to the baseplate 214 of the lift member 200.

Similar to the extension member 204 of the lift member 200 (shown in FIGS. 5A-5C), the extension member 304 similarly includes left and right side walls 320 and 321, front and rear end walls and a top plate 324. In the embodiment shown, the extension member 304 has a height 325 (shown in FIG. 9C) of approximately 32 inches, a width of approximately 2.5 inches and a length of approximately 5.5 inches; in other embodiments, and depending on the corresponding dimensions of the base member 302, the height 325 may range between approximately 18 and 48 inches, and the extension member 304 may have a width ranging between approximately 2 and 5.5 inches and a length ranging between approximately 2 and 5.5 inches. In the embodiment shown in FIGS. 9A-9C, the base member 302 is dimensioned to be nested within the extension member 304. As such, the width, the length and the height 315 of the base member 302 may be less than the corresponding width, the length and the height 325 of the extension member 304.

The lift member 200' is configured to move between a nested configuration where the base member 302 is nested within the extension member 304 (shown in FIG. 9A) and an extended configuration where the base member 302 is extended from the extension member 304 (shown in FIGS. 9B and 9C) due to actuation of an active actuator 332 described below. In certain embodiments, movement of the extension member 304 and alignment of the extension and base members 304 and 302 during movement of the extension member 304 may be facilitated by a slider mechanism. The slider mechanism may be similar to the slider mechanism of the lift member 200 (shown in FIGS. 5A-5C). In the embodiment shown, a total nested height 306 (shown in FIG. 9A) from the top plate 324 to the baseplate 314 while the lift member 200' is in the nested configuration is approximately 32 inches, while a total extended height 308 (shown in FIG. 9B) from the top plate 324 to the baseplate 314 while the lift member 200' is in the extended configuration is approximately 60 inches; in other embodiments, the total nested height 306 may range between approximately 18 and 48 inches, and the total extended height 308 may range between approximately 34 and 94 inches.

The left side wall 320 may include a slot (not shown) to receive the rod connector 380 and to allow the rod connector 380 to move across a portion of the height 325. In the embodiment shown, the extension member slot has a height of approximately 13 inches and a width of approximately 0.75 inches and begins approximately 17 inches from the top plate 324; in other embodiments, the extension member slot may have a height ranging between approximately 10 and 26 inches and a width ranging between approximately 0.5 and 1 inch and may begin between approximately 8 and 22 inches from the top plate 324. The base member slot and the extension member slot are positioned and dimensioned to overlap and align when the base member 302 is nested within the extension member 304 in the nested configuration (shown in FIG. 9A) and to vertically align when the extension member 304 is extended relative to the base member 302 in the extended configuration (shown in FIGS. 9B and 9C), to allow the rod connector 380 to move across both a portion of the base member height 315 and a portion of the extension member height 325 when the lift member 200' is in the nested configuration, in the extended configuration and in configurations between the nested and extended configurations.

ii) Active Actuator 332 and Passive Actuator 334

The base and extension members 302 and 304 house the active actuator 332 and a passive actuator 334. As noted above, in the first type of lift member 200', the active actuator 332 generally comprises a large actuator configured and dimensioned to move the vehicle cover 106 between the collapsed configuration (shown in FIG. 1) and the first extended configuration (shown in FIG. 3), while the passive actuator 334 generally comprises a small actuator configured and dimensioned to move the vehicle cover 106 between the first extended configuration (shown in FIG. 3) and the second extended configuration (shown in FIG. 4).

The active actuator 332 of the lift member 200' may be an electric linear actuator having a housing 340 having a top end 341 and a bottom end 342, an extendable rod 344 having a distal end 345, and a direct current (DC) motor 346 configured to supply power to extend and retract the active actuator rod 344 and its distal end 345 relative to the active actuator housing 340 in a downward direction 347. In other embodiments, the active actuator 332 may comprise another type of active actuator requiring input of power, and may be similar to the active actuator 232 of the lift member 200. As described above, in the first type of lift member 200', the active actuator 332 comprises a large actuator generally configured to move the vehicle cover 106 away from the vehicle bed 104 from the collapsed configuration (shown in FIG. 1) to the first extended configuration (shown in FIG. 3), and may comprise a 12V/24V 700 mm stroke 900 N linear actuator. In other embodiments, the active actuator 332 may comprise an actuator having stroke lengths ranging between approximately 500 mm and 2000 mm, and/or having an expansive force ranging between 500 N and 1000 N.

The passive actuator 334 may be a gas strut or a gas spring having a housing 350 having top and bottom ends 351, 352 and an extendable rod 354 having a distal end 355, whereby the passive actuator rod 354 is generally biased toward an extended configuration in an upward direction 357 relative to the top end 351 of the passive actuator housing 350 and may be kept in a retracted configuration by a weight of the vehicle cover 106. In other embodiments, the passive actuator 334 may comprise another type of passive actuator similar to the passive actuator 234 of the lift member 200. As described above, in the first type of lift member 200', the passive actuator 334 is a small passive actuator generally configured to move the vehicle cover 106 away from the vehicle bed 104 from the first extended configuration (shown in FIG. 3) to the second extended configuration (shown in FIG. 4), and may specifically comprises a 785 mm length, 350 mm stroke 100 N gas strut. The passive actuator housing 350 has a diameter of 22 mm, and the passive actuator rod 354 has a diameter 10 mm. In other embodiments, the passive actuator 234 may comprise an actuator having a housing length ranging between approximately 500 and 981 mm, a corresponding stroke length ranging between 250 and 450 mm, and/or having a force ranging between 50 and 500 N.

In the embodiment shown, the active actuator housing 340 is coupled to the passive actuator housing 350 via a housing coupling 370. The housing coupling 370 may enable the entire passive actuator 334 to be raised when the active actuator rod 344 is extended in the downward direction 347. The housing coupling 370 may be similar to, and may be positioned similar to, the housing coupling 270 of the lift member 200 (shown in FIGS. 5A-5C). The active actuator housing 340 is coupled to the extension member 304 proximate to the top plate 324 via an extension member coupling 372. The extension member coupling 372 may be similar to the extension member coupling 272 of the lift member 200. The active actuator rod 344 is coupled to the baseplate 314 of the base member 302 via a base member coupling 374. The base member coupling 374 may be similar to the base member coupling 274 of the lift member 200. The combination of the extension member coupling 372 and the base member coupling 374 may enable the extension of the first type of lift member 200' from the nested configuration (shown in FIG. 9A) to the extended configuration (shown in FIGS. 9B and 9C) when the active actuator rod 344 is extended in the downward direction 347. After extension of the active actuator rod 344, a locking mechanism may be actuated to lock the base member 302 relative to the extension member 304 prior to extension of the passive actuator rod 354 to stabilize the lift member 200' in the extended configuration. The locking mechanism may be similar to the locking mechanism of the lift member 200. The distal end 355 of the passive actuator rod 354 is coupled to the vehicle cover 106 via a cover coupling 376. The cover coupling 376 may be similar to the cover coupling 276 of the lift member 200 (shown in FIGS. 5A-5C, 6, 7A, and 7B).

The combination of the housing coupling 370, the extension member coupling 372, the base member coupling 374 and the cover coupling 376 generally function ensure that: (A) extension and retraction of the large active actuator rod 344 results in (1) extension and retraction of the lift member 200' from the nested configuration (shown in FIG. 9A) to the extended configuration (shown in FIG. 9B and 9C) and (2) corresponding rising and lowering of the entire small passive actuator 334 which enables the extension and retraction of the vehicle cover 106 from the collapsed configuration (shown in FIG. 1) to the first extended configuration (shown in FIG. 3); and further that (B) extension and retraction of the small passive actuator rod 354 results in: (3) corresponding extension and retraction of the vehicle cover 106 from the first extended configuration (shown in FIG. 3) to the second extended configuration (shown in FIG. 4). In other embodiments, the housing coupling 370, the extension member coupling 372, the base member coupling 374 and the cover coupling 376, may be any other couplings known to a person of ordinary skill in the art which enables the extension and retraction of the active and passive actuator rods 344 and 354 to be transferred into the extension and retraction of the vehicle cover 106 from the collapsed configuration to the first extended configuration and then to the second extended configuration as described above, and may comprise adhesive fastenings, magnetic fastenings, suction-based fastenings, etc.

Second Type of Lift Member 500

Figure 10C:
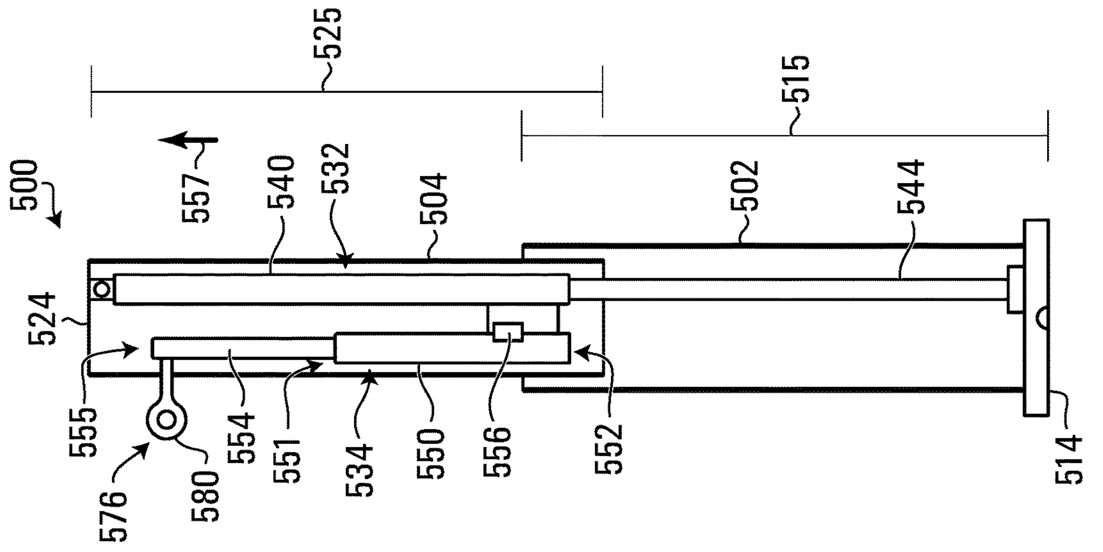
FIGS. 10A-10C are side schematics of a second type of lift member of the vehicle lift system of FIG. 1 in nested and extended configurations in accordance with one embodiment.
Figure 10B:
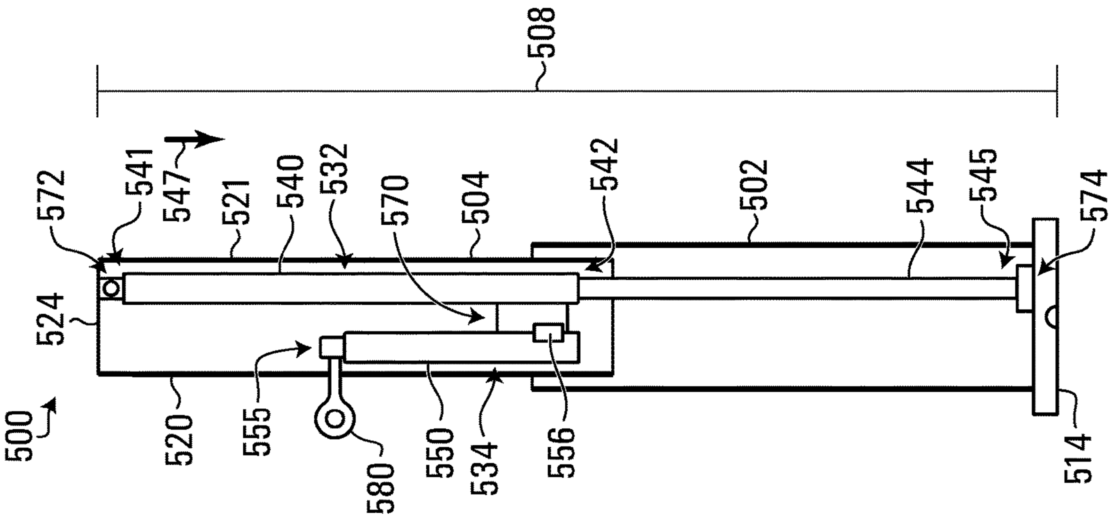
Figure 10A:
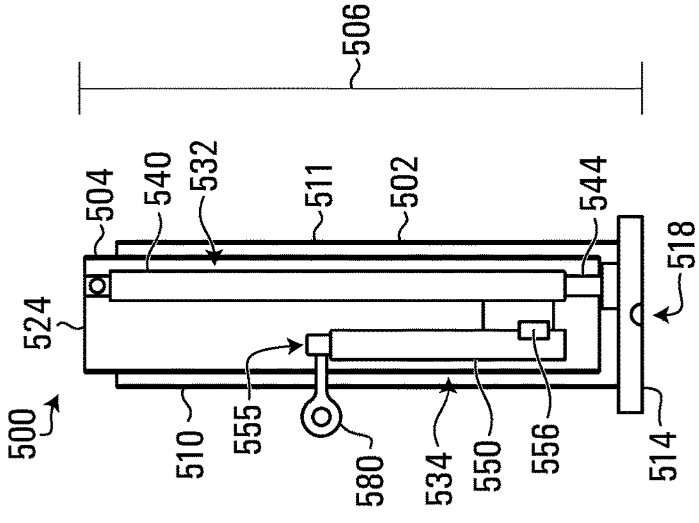

Referring to FIGS. 10A-10C, a second type of lift member which may be used as at least one or at least two of the first, second, third and fourth lift members 180, 182, 184 and 186 is shown generally at 500. Specifically, the first type of lift member 200 may be used as either the both the first and third lift members 180 and 184 or as both the second and fourth lift members 182 and 186 for example.

i) Base Member 502 and Extension Member 504

The lift member 500 includes a base member 502 and an extension member 504, with the extension member 504 being nested within the base member 502. The base member 502 may be similar to the base member 202 of the lift member 200 (shown in FIGS. 5A-5C) and also has left and right side walls 510 and 511, front and rear end walls, and a baseplate 514. In the embodiment shown, the base member 502 has a height 515 (shown in FIG. 10C) of approximately 32 inches, a width of approximately 2 inches and a length of approximately 5 inches; in other embodiments, the height 515 may range between approximately 18 and 48 inches, and the base member 502 may have a width ranging between approximately 2 and 5 inches, and a length ranging between approximately 2 and 5 inches.

The left side wall 510 may include a slot 516 (not shown) to receive a rod connector 580 for coupling the lift member 500 to the vehicle cover 106 and to allow the rod connector 580 to move across a portion of the height 515. In the embodiment shown, the base member slot 516 has a height of approximately 13 inches and a width of approximately 0.75 inches and begins approximately 17 inches from the baseplate 514; in other embodiments, the base member slot 516 may have a height ranging between approximately 10 and 26 inches and a width ranging between approximately 0.5 and 1 inch and may begin between approximately 8 and 22 inches from the baseplate 514. The baseplate 514 fixedly couples the lift member 500 to the vehicle bed 104 via a bed coupling 518. The bed coupling 518 may be similar to the bed coupling 218 of the lift member 200 (shown in FIGS. 5A-5C). The baseplate 514 may generally be configured and dimensioned to stabilize the lift member 500 once the lift member 500 is attached to the vehicle bed 104 via the bed coupling 518, and in the embodiment shown in FIGS. 10A-10C, the baseplate 514 has a width of approximately 8 inches, a length of approximately 12 inches, and a height of approximately 0.375 inches, and may be made from 304 stainless steel; in other embodiments, the baseplate 514 may have a width ranging between approximately 5 and 10 inches, a length ranging between approximately 13 and 16 inches and a height ranging between approximately 0.25 and 0.5 inches, may be made from other type of metals including aluminium or other alloys and may have stabilizing features similar to the baseplate 214 of the lift member 200.

The extension member 504 may be similar to the extension member 204 of the lift member 200 (shown in FIGS. 5A-5C) and may include left and right side walls 520 and 521, front and rear end walls and a top plate 524. In the embodiment shown, the extension member 504 has a height 525 (shown in FIG. 10C) of approximately 32 inches, a width of approximately 2 inches and a length of approximately 5 inches; in other embodiments, the height 525 may range between approximately 18 and 48 inches, and the extension member 504 may have a width ranging between approximately 2 and 5 inches and a length ranging between approximately 2 and 5 inches.

In the embodiment shown in FIGS. 10A-10C, the extension member 504 is dimensioned to be nested within the base member 502 (similar to the extension and base members 204 and 202 of the lift member 200 shown in FIGS. 5A-5C), and as such, the width and the length of the extension member 504 may be less than the width and the length of the base member 502. The lift member 500 is configured to move between a nested configuration where the extension member 504 is nested within the base member 502 (shown in FIG. 10A) to an extended configuration where the extension member 504 is extended from the base member 502 (shown in FIGS. 10B and 10C) due to actuation of a passive actuator 532 described below. In certain embodiments, movement of the extension member 504 and alignment of the extension and base members 504 and 502 during movement of the extension member 504 may be facilitated by a slider mechanism. The slider mechanism may be similar to the slider mechanism of the lift member 200. In the embodiment shown, a total nested height 506 (shown in FIG. 10A) from the top plate 524 to the baseplate 514 while the lift member 500 is in the nested configuration is approximately 32 inches, while a total extended height 508 (shown in FIG. 10B) from the top plate 524 to the baseplate 514 while the lift member 500 is in the extended configuration is approximately 60 inches. In other embodiments, the total nested height 506 may range between approximately 18 and 48 inches, and the total extended height 508 may range between approximately 34 and 94 inches.

The left side wall 520 of the extension member 504 may include a slot 526 (shown in FIGS. 1 and 3) to receive the rod connector 580 coupling the lift member 500 to the vehicle cover 106 and to allow the rod connector 580 to move across a portion of the height 525. In the embodiment shown, the extension member slot 526 has a height of approximately 17 inches, and a width of approximately 0.75 inches and begins approximately 13 inches from the top plate 524; in other embodiments, the extension member slot 526 may have a height ranging between approximately 10 and 26 inches and a width ranging between approximately 0.25 and 1 inch and may begin between approximately 8 and 22 inches from the top plate 524. The base member slot 516 and the extension member slot 526 are positioned and dimensioned to overlap and align when the extension member 504 is nested within the base member 502 in the nested configuration (shown in FIG. 10A) and to vertically align when the extension member 504 is extended relative to the base member 502 in the extended configuration (shown in FIGS. 10B and 10C), to allow the rod connector 580 to move across both a portion of the base member height 515 and a portion of the extension member height 525 when the lift member 500 is in the nested configuration, the extended configuration and configurations between the nested and extended configurations.

ii) Passive Actuator 532 and Active Actuator 534

The base and extension members 502 and 504 house the passive actuator 532 and an active actuator 534. As noted above, in the second type of lift member 500, the passive actuator 532 comprises a large actuator configured and dimensioned to move the vehicle cover 106 between the collapsed configuration (shown in FIG. 1) and the first extended configuration (shown in FIG. 3), while the active actuator 534 comprises a small actuator configured and dimensioned to move the vehicle cover 106 between the first extended configuration (shown in FIG. 3) and the second extended configuration (shown in FIG. 4).

The passive actuator 532 may comprise a gas strut or a gas spring having a housing 540 having a top end 541 and a bottom end 542, and an extendable rod 544 having a distal end 545, whereby the passive actuator rod 544 is generally biased toward an extended configuration (shown in FIGS. 10B and 10C) in a downward direction 547 and may be kept in a retracted configuration (shown in FIG. 10A) by the weight of the vehicle cover 106. In other embodiments, the passive actuator 532 may comprise any other passive extension mechanism including as a coil spring, spring strut or a combination of gas and spring strut for example. As described above, in the second type of lift member 500, the passive actuator 532 comprises a large passive actuator configured to move the vehicle cover 106 away from the vehicle bed 104 from the collapsed configuration (shown in FIG. 1) to the first extended configuration (shown in FIG. 3), and may specifically comprises a 1500 mm length, 700 mm stroke 100 N gas strut, where the passive actuator housing

540 has a diameter of approximately 28 mm, and the passive actuator rod 544 has a diameter of approximately 12 mm. In other embodiments, the passive actuator 532 may comprise an actuator having a housing length ranging between approximately 1000 mm and 3000 mm, a corresponding stroke length ranging between 500 mm and 1500 mm, and/or having a force ranging between 50 N and 500 N.

The active actuator 534 comprises an electric linear actuator having a housing 550 having a top end 551 and a bottom end 552, an extendable rod 554 having a distal end 555, and a direct current (DC) motor 556 configured to supply power to extend and retract the active actuator rod 554 relative to the active actuator housing 550 in an upward direction 557. In other embodiments, the active actuator 534 may comprise another type of active actuator requiring input of a power, such as a pneumatic actuator, a hydraulic actuator, a multi-stage linear actuator, a direct drive rotary motor actuator and slide guides, and a system of pulleys and cables with electrically powered rollers for example for example. As described above, in the second type of lift member 500, the active actuator 534 comprises a small active actuator generally configured to move the vehicle cover 106 away from the vehicle bed 104 from the first extended configuration (shown in FIG. 3) to the second extended configuration (shown in FIG. 4), and may specifically comprise a 12V/24V 700 mm stroke 900 N linear actuator. In other embodiments, the active actuator 534 may comprise an actuator having stroke lengths ranging between approximately 500 mm and 2000 mm, and/or having a force ranging between 500 N and 1000 N.

In the embodiment shown, the passive actuator housing 540 is coupled to the active actuator housing 550 via a housing coupling 570. Generally, the housing coupling 570 enables the entire active actuator 534 to be raised when the passive actuator rod 544 is extended in the downward direction 547. The housing coupling 570 may be similar to the housing coupling 270 of the lift member 200 (shown in FIGS. 5A-5C). In the embodiment shown, the housing coupling 570 is generally positioned to couple the bottom end 542 of the passive actuator housing 540 (proximal to an aperture that the passive actuator rod 544 extends in the downward direction 547) to the bottom end 552 of the active actuator housing 550 (distal to an aperture where the active actuator rod 554 extends in the upward direction 557), which enables the entire active actuator 534 to be raised when the passive actuator rod 544 is extended in the downward direction 547. In other embodiments, the housing coupling 570 may couple the passive and active actuator housings 540 and 550 together as alternative or additional locations in a manner similar to the housing coupling 270 of the lift member 200. Coupling the passive and active actuator housings 540 and 550 together at more than one location can improve their alignment as the lift member 500 moves between the nested configuration (shown in FIG. 10A) and the extended configuration (shown in FIGS. 10B and 10C).

The passive actuator housing 540 may also be coupled to the extension member 504 proximate to the top plate 524 via an extension member coupling 572. The extension member coupling 572 may be similar to the extension member coupling 272 of the lift member 200 (shown in FIGS. 5A-5C). The passive actuator rod 544 may also be coupled to the baseplate 514 of the base member 502 via a base member coupling 574. The base member coupling 574 may be similar to the base member coupling 274 of the lift member 200. The combination of the extension member coupling 572 and the base member coupling 574 may enable the extension of the lift member 500 from the nested configuration (shown in FIG. 10A) to the extended configuration (shown in FIGS. 10B and 10C) when the passive actuator rod 544 is extended from the passive actuator housing 540 in the downward direction 547. After extension of the passive actuator rod 544, a locking mechanism may be actuated to lock the base member 502 relative to the extension member 504 (prior to extension of the active actuator rod 554) to stabilize the lift member 500 in the extended configuration. The locking mechanism may be similar to the locking mechanism of the lift member 200. The distal end 555 of the active actuator rod 554 is coupled to the vehicle cover 106 via a cover coupling 576. The cover coupling 576 may be similar to the cover coupling 276 of the lift member 200 (shown in FIGS. 5A-5C, 6, 7A, and 7B).

The combination of the housing coupling 570, the extension member coupling 572, the base member coupling 574 and the cover coupling 576 generally function to ensure that: (A) extension and retraction of the passive actuator rod 544 results in (1) extension and retraction of the lift member 500 from the nested configuration (shown in FIG. 10A) to the extended configuration (shown in FIG. 10B and 10C) and (2) corresponding rising and lowering of the entire active actuator 534 which enables the extension and retraction of the vehicle cover 106 from the collapsed configuration (shown in FIG. 1) to the first extended configuration (shown in FIG. 3); and further that (B) extension and retraction of the active actuator rod 554 results in: (3) corresponding extension and retraction of the vehicle cover 106 from the first extended configuration (shown in FIG. 3) to the second extended configuration (shown in FIG. 4). In other embodiments, the housing coupling 570, the extension member coupling 572, the base member coupling 574 and the cover coupling 576 may be any other couplings known to a person of ordinary skill in the art which enables the extension and retraction of the passive and active actuator rods 544 and 554 to be transferred into extension and retraction of the vehicle cover 106 from the collapsed configuration to the first extended configuration and then to the second extended configuration as described above, and may comprise adhesive fastenings, magnetic fastenings, suction-based fastenings etc.

Second Embodiment of the Second Type of Lift Member 500'

The combination of the base member 502, the extension member 504, the passive actuator 532, the active actuator 534, the housing coupling 570, the extension member coupling 572, the base member coupling 574 and the cover coupling 576 (shown in FIGS. 10A-10C) enable the extension and retraction of the passive and active actuator rods 544 and 554 to be transferred into extension and retraction of the vehicle cover 106 from the collapsed configuration (shown in FIG. 1) to the first extended configuration (shown in FIG. 3) and then to the second extended configuration (shown in FIG. 4), particularly whereby a large passive actuator facilitates movement of the vehicle cover 106 between the collapsed and the first extended configurations and a small active actuator moves the vehicle cover 106 between the first and second extended configurations. In other embodiments, different configurations and orientations of the base member, the extension member, the active actuator, the passive actuator, and the various couplings may be possible to achieve the same or similar function.

Figure 11C:
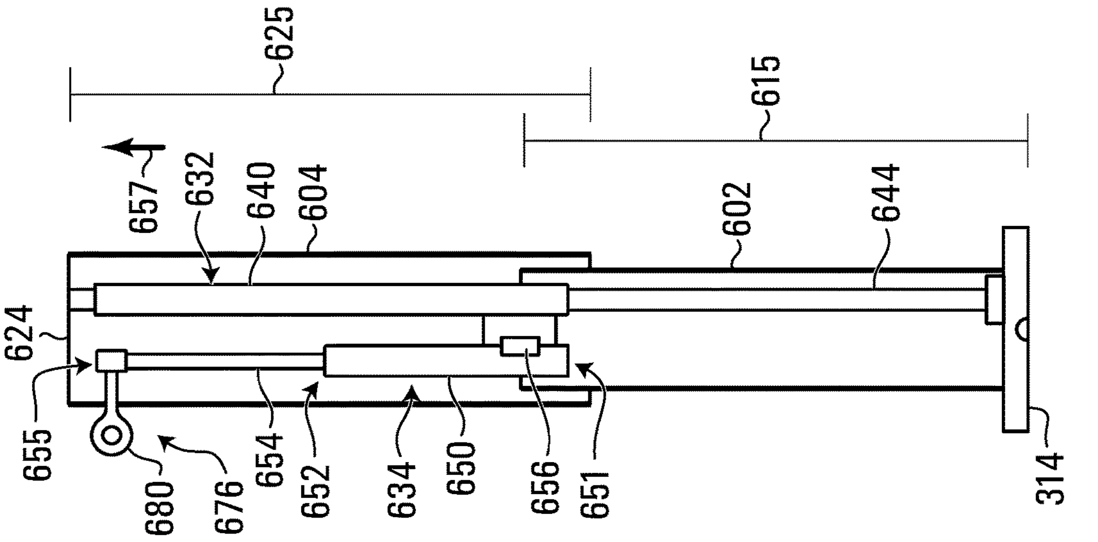
FIGS. 11A-11C are side schematics of a second type of lift member of the vehicle lift system of FIG. 1 in nested and extended configurations in accordance with one embodiment.
Figure 11B:
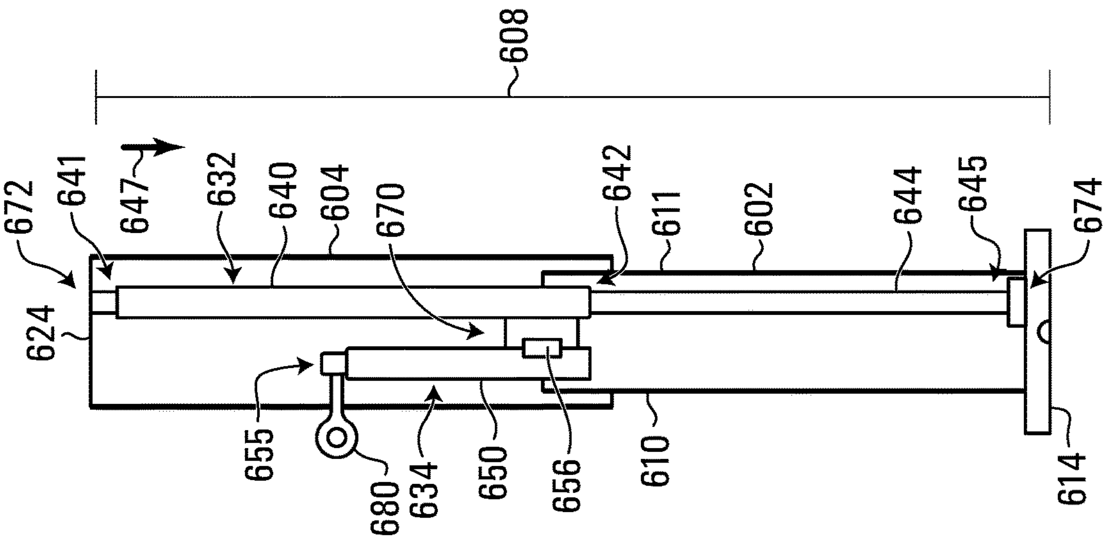
Figure 11A:
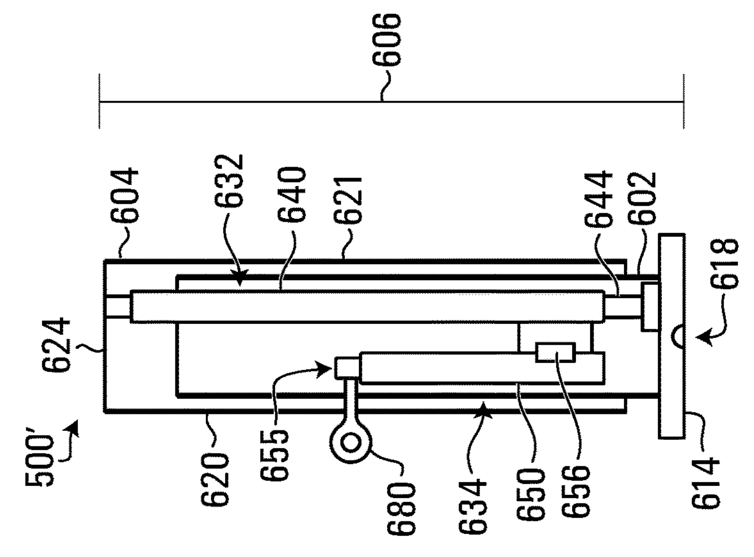

For example, referring now to FIGS. 11A-11C, a second embodiment of the second type of lift member is shown generally at 500'. Similar to the second type of lift member 500 shown in FIGS. 10A-10B, the second type of lift members 500' may also be used as at least one or at least two of the first, second, third and fourth lift members 180, 182, 184 and 186 (shown in FIGS. 1, 3, and 4), and may be used as either both the first and third lift members 180 and 184 or as both the second and fourth lift members 182 and 186 for example.

i) Base Member 602 and Extension Member 604

The lift member 500" also includes a base member 602 and an extension member 604, where the base member 602 is configured and dimensioned to be nested within the extension member 604. The base member 602 is similar to the base member 302 of the lift member 200' (shown in FIGS. 9A-9C) and also has left and right side walls 610 and 611, front and rear end walls and a baseplate 614. In the embodiment shown, the base member 602 has a height 615 (shown in FIG. 11C) of approximately 32 inches, a width of approximately 2 inches and a length of approximately 5 inches; in other embodiments, the height 615 may range between approximately 18 and 48 inches, and the base member 602 may have a width ranging between approximately 2 and 5 inches, and a length ranging between approximately 2 and 5 inches.

The left side wall 610 may include a slot (not shown) to receive a rod connector 680 coupling the lift member 500' to the vehicle cover 106 and to allow movement of the rod connector 680 across a portion of the height 615. In other embodiments and depending on the positioning of the lift member 500 in the vehicle bed 104, the base member slot may be in the right side wall 611 instead. In the embodiment shown, the base member slot has a height of approximately 13 inches and a width of approximately 0.75 inches and begins approximately 17 inches from the baseplate 614; in other embodiments, the base member slot may have a height ranging between approximately 10 and 26 inches and a width ranging between approximately 0.5 and 1 inch and may begin between approximately 8 and 22 inches from the baseplate 614. The baseplate 614 fixedly couples the lift member 500' to the vehicle bed 104 via a bed coupling 618. The bed coupling 618 may be similar to the bed coupling 218 of the lift member 200 (shown in FIGS. 5A-5C). The baseplate 614 is configured and dimensioned to stabilize the lift member 500' once the lift member 500' is attached to the vehicle bed 104 via the bed coupling 618, and in the embodiment shown in FIGS. 11A-11C, the baseplate 614 has a width of approximately 8 inches, a length of approximately 12 inches, and a height of approximately 0.375 inches, and may be made from 304 stainless steel; in other embodiments, the baseplate 614 may have a width ranging between approximately 5 and 10 inches, a length ranging between approximately 13 and 16 inches and a height ranging between approximately 0.25 and 0.5 inches, may be made from other metals, such as aluminium or other alloys, and may have stabilizing features similar to the baseplate 214 of the lift member 200.

The extension member 604 may be similar to the extension member 304 of the lift member 200' (shown in FIGS. 9A-9C) and may include left and right side walls 620 and 621, front and rear end walls and a top plate 624. In the embodiment shown, the extension member 604 has a height 625 (shown in FIG. 11C) of approximately 32 inches, a width of approximately 2.5 inches and a length of approximately 5.5 inches; in other embodiments, the height 625 may range between approximately 18 and 48 inches, and the extension member 604 may have a width ranging between approximately 2.5 and 5.5 inches and a height ranging between approximately 2.5 and 5.5 inches.

The base member 602 is dimensioned to be nested within the extension member 604 (similar to the base member 302 and the extension member 304 of the lift member 200' shown in FIGS. 9A-9C), and as such, the height 615, the width and the length of the base member 602 is less than the height 625, the width and the length of the extension member 604. Referring to FIGS. 11A-11C, the lift member 500' is configured to move between a nested configuration where the base member 602 is nested within the extension member 604 (shown in FIG. 11A) to an extended configuration where the extension member 604 is extended from the base member 602 (shown in FIGS. 11B and 11C) due to actuation of a passive actuator 632 as described below. In certain embodiments, movement of the extension member 604 and alignment of the extension and base members 604 and 602 during movement of the extension member 604 may be facilitated by a slider mechanism. The slider mechanism may be similar to the slider mechanism of the lift member 200 (shown in FIGS. 5A-5B) described above. In the embodiment shown, a total nested height 606 (shown in FIG. 11A) from the top plate 624 to the baseplate 614 while the lift member 500' is in the nested configuration is approximately 32 inches, while a total extended height 608 (shown in FIG. 11B) from the top plate 624 to the baseplate 614 while the lift member 500' is in the extended configuration is approximately 60 inches. In other embodiments, the total nested height 606 may range between approximately 18 and 48 inches, and the total extended height 608 may range between approximately 34 and 94 inches.

The left side wall 620 of the extension member 604 may include a slot (not shown) to receive the rod connector 680 coupling the lift member 500' to the vehicle cover 106 and to allow the rod connector 680 to move across a portion of the height 625. In other embodiments and depending on the positioning of the lift member 500 in the vehicle bed 104 and the position of the base member slot, the extension member slot may be in the right side wall 621 instead. In the embodiment shown, the extension member slot has a height of approximately 13 inches and a width of approximately 0.75 inches and begins approximately 17 inches from the top plate 624; in other embodiments, the extension member slot may have a height ranging between approximately 10 and 26 inches and a width ranging between approximately 0.5 and 1 inch and may begin between approximately 8 and 22 inches from the top plate 624. The base member slot and the extension member slot may be positioned and dimensioned to overlap and align when the base member 602 is nested within the extension member 604 in the nested configuration (shown in FIG. 11A) and to vertically align when the extension member 604 is extended relative to the base member 602 in the extended configuration (shown in FIGS. 11C and 10C), to allow the rod connector 680 to move across both a portion of the base member height 615 and a portion of the extension member height 625 when the lift member 500' is in the nested configuration, the extended configuration and configurations between the nested and extended configurations.

ii) Passive Actuator 632 and Active Actuator 634

The base and extension members 602 and 604 house the passive actuator 632 and an active actuator 634. As noted above, in the second type of lift member 500', the passive actuator 632 comprises a large actuator configured and dimensioned to move the vehicle cover 106 between the collapsed configuration (shown in FIG. 1) and the first extended configuration (shown in FIG. 3), while the active actuator 634 comprises a small actuator configured and dimensioned to move the vehicle cover 106 between the first extended configuration (shown in FIG. 3) and the second extended configuration (shown in FIG. 4).

The passive actuator 632 may be a gas strut or a gas spring having a housing 640 having a top end 641 and a bottom end 642, and an extendable rod 644 having a distal end 645, whereby the passive actuator rod 644 is generally biased toward an extended configuration (shown in FIGS. 11B and 11C) in the downward direction 647 and may be kept in a retracted configuration (shown in FIG. 11A) by the weight of the vehicle cover 106. In other embodiments, the passive actuator 632 may comprise any passive extension mechanism known to one of ordinary skill in the art, and may be similar to the passive actuator 532 of the lift member 500 (shown in FIGS. 10A-10C). As described above, in the second type of lift member 500', the passive actuator 632 comprises a large passive actuator configured to move the vehicle cover 106 away from the vehicle bed 104 from the collapsed configuration (shown in FIG. 1) to the first extended configuration(shown in FIG. 3), and may specifically comprise a 1500 mm length, 700 mm stroke 100 N gas strut, where the passive actuator housing 640 has a diameter of approximately 28 mm, and the passive actuator rod 644 has a diameter of approximately 12 mm. In other embodiments, the passive actuator 632 may comprise an actuator having a housing length ranging between approximately 1000 and 3000 mm, corresponding stroke length ranging between 600 and 1500 mm, and/or or having a force ranging between 60 N and 600 N.

The active actuator 634 may be an electric linear actuator having a housing 650 having a top end 651 and a bottom end 652, an extendable rod 654 having a distal end 655, and a direct current (DC) motor 656 configured to supply power to extend and retract the active actuator rod 654 relative to the active actuator housing 650 in an upward direction 657. In other embodiments, the active actuator 634 may comprise another type of active actuator requiring input of power known to one of ordinary skill in the art, and may be similar to the active actuator 534 of the lift member 500 (shown in FIGS. 10A-10C). As described above, in the second type of lift member 500', the active actuator 634 comprises a small active actuator generally configured to move the vehicle cover 106 away from the vehicle bed 104 from the first extended configuration (shown in FIG. 3) to the second extended configuration (shown in FIG. 4), and may specifically comprise a 12V/24V 700 mm stroke 900 N linear actuator. In other embodiments, the active actuator 634 may comprise an actuator having stroke lengths ranging between approximately 600 and 2000 mm, or having an expansive force ranging between 600 and 1000 N.

In the embodiment shown, the passive actuator housing 640 is coupled to the active actuator housing 650 via a housing coupling 670. The housing coupling 670 may enable the entire active actuator 634 to be raised when the passive actuator rod 644 is extended in the downward direction 647. The housing coupling 670 may be similar to the housing coupling 270 of the lift member 200 (shown in FIGS. 5A-5C) and may be positioned similar to the housing coupling 570 of the lift member 500 (shown in FIGS. 10A-10C). The passive actuator housing 640 is coupled to the extension member 604 proximate to the top plate 624 via an extension member coupling 672. The extension member coupling 672 may be similar to the extension member coupling 272 of the lift member 200 (shown in FIGS. 5A-5C). The distal end 645 of the passive actuator rod 644 is coupled to the baseplate 614 of the base member 602 via a base member coupling 674. The base member coupling 674 may be similar to the base member coupling 274 of the lift member 200 (shown in FIGS. 5A-5C). The combination of the extension member coupling 672 and the base member coupling 674 enables the extension of the lift member 500' from the nested configuration (shown in FIG. 11A) to the extended configuration (shown in FIGS. 11B and 11C) when the passive actuator rod 644 extends from the passive actuator housing 640 in the downward direction 647. After extension of the passive actuator rod 644, a locking mechanism may be actuated to lock the base member 602 relative to the extension member 604 (prior to extension of the active actuator rod 654) to stabilize the lift member 500' in the extended configuration. The locking mechanism may be similar to the locking mechanism of the lift member 200. The distal end 655 of the active actuator rod 654 is coupled to the vehicle cover 106 via a cover coupling 676. The cover coupling 676 may be similar to the cover coupling 276 of the lift member 200 (shown in FIGS. 5A-5C, 6, 7A, and 7B).

The combination of the housing coupling 670, the extension member coupling 672, the base member coupling 674 and the cover coupling 676 generally function to ensure that: (A) extension and retraction of the passive actuator rod 644 results in (1) extension and retraction of the lift member 500' from the nested configuration (shown in FIG. 11A) to the extended configuration (shown in FIG. 11B and 11C) and (2) corresponding rising and lowering of the entire active actuator 634 which enables the extension and retraction of the vehicle cover 106 from the collapsed configuration (shown in FIG. 1) to the first extended configuration (shown in FIG. 3); and further that (B) extension and retraction of the active actuator rod 654 results in: (3) corresponding extension and retraction of the vehicle cover 106 from the first extended configuration (shown in FIG. 3) to the second extended configuration (shown in FIG. 4). In other embodiments, the housing coupling 670, the extension member coupling 672, the base member coupling 674 and the cover coupling 676, may be any other couplings known to a person of ordinary skill in the art which enables the extension and retraction of the passive and active actuator rods 644 and 654 to be transferred into extension and retraction of the vehicle cover 106 from the collapsed configuration to the first extended configuration and then to the second extended configuration as described above, and may comprise adhesive fastenings, magnetic fastenings, suction-based fastening etc.

Operation of First and Second Type of Lift Member 200, 500

Figure 12:
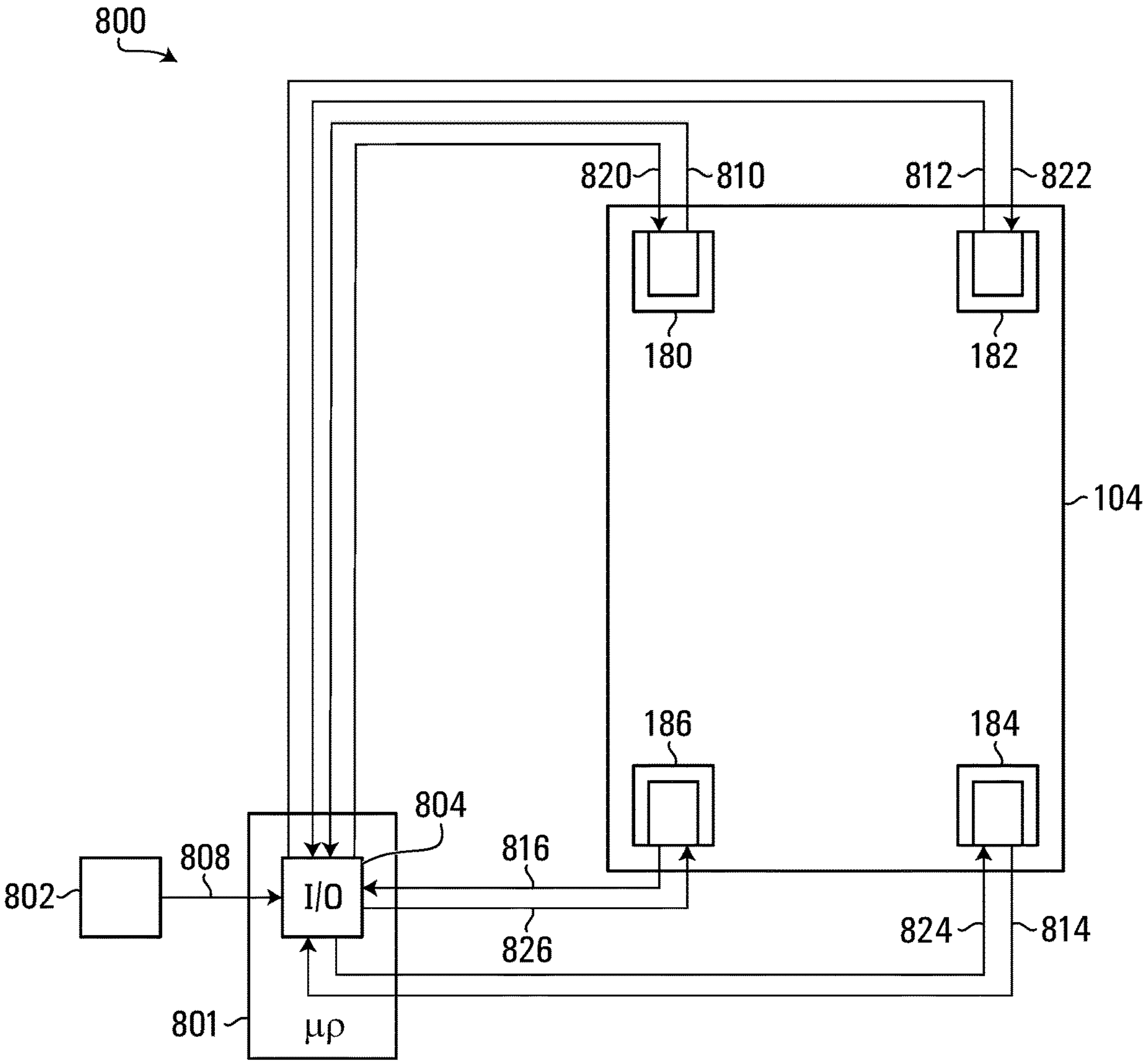
FIG. 12 is a schematic of a control system for the vehicle lift system of FIG. 1 in accordance with one embodiment.

Referring to FIGS. 1, 3, 4, and 12, in the embodiment of the vehicle cover lift system 100 shown, the plurality of lift members 102 include the first, second, third and fourth lift members 180, 182, 184 and 186. The plurality of lift members 102 include a combination of the first type of lift member (such as the lift member 200 shown in FIGS. 5A-5 or the lift member 200' shown in FIGS. 9A-9C) and the second type of lift member (such as the lift member 500 shown in FIGS. 10A-10C or the lift member 500' shown in FIGS. 11A-11C). Referring to FIG. 12, in the embodiment shown, the first and third lift members 180 and 184 comprise the first type of lift member while the second and fourth lift members 182 and 186 comprise the second type of lift member; in other embodiments, the configuration may be reversed such that the first and third lift members 180 and 184 comprise the second type of lift member while the second and fourth lift members 182 and 186 comprise the first type of lift member. In such embodiments, opposite corners of the vehicle bed and cover 104 and 106 are coupled with a same type of lift member, while adjacent corners of the vehicle bed and cover 104 and 106 are coupled with a different type of lift member. The alternating and opposing configuration of the first and second types of lift members can improve the stability of the vehicle cover 106 as it moves between the collapsed, the first extended and the second extended configurations as described below. In yet other embodiments, including embodiments where the plurality of lift members 102 include more than four lift members, the plurality of lift members 102 may include a different combination of the first type of lift member and the second type of lift member shown in FIG. 12, and may for example, include alternating first and second types of lift members. Again, the alternating configuration of the first and second types of lift members can improve the stability of the vehicle cover 106 as it moves between the collapsed, the first extended and the second extended configurations as described below As described above, the first type of lift member includes a large active actuator (such as the large active actuator 232 shown in FIGS. 5A-5C and the large active actuator 332 shown in FIGS. 9A-9C) configured and dimensioned to move the vehicle cover 106 between the collapsed configuration (shown in FIG. 1) and the first extended configuration (shown in FIG. 3) and a small passive actuator (such as the small passive actuator 234 shown in FIGS. 5A-5C and the small passive actuator 334 shown in FIGS. 9A-9C) configured and dimensioned to facilitate movement of the vehicle cover 106 between the first extended configuration (shown in FIG. 3) and the second extended configuration (shown in FIG. 4). The second type of lift member has an opposite configuration and includes a large passive actuator (such as the large passive actuator 532 shown in FIGS. 10A-10C and the large passive actuator 632 shown in FIGS. 11A-11C) configured and dimensioned to facilitate moving the vehicle cover 106 between the collapsed configuration and the first extended configuration, and a small active actuator (such as the small active actuator 534 shown in FIGS. 10A-10C and the small active actuator 634 shown in FIGS. 11A-11C) configured and dimensioned to facilitate moving the vehicle cover 106 between the first extended configuration and the second extended configuration. The opposite arrangement of passive and active actuators in the first type of lift members versus the second type of lift members enables: (A) the vehicle cover 106 to be moved between the collapsed and the first extended configurations with only control signals to the large active actuators of the first type of lift members, as the large passive actuators of the second type of lift members automatically assist movement to the first extended configuration when the weight of the vehicle cover 106 is removed from the large passive actuators of the second type of lift member (due to the aforementioned extension of the large active actuator of the first type of lift member), and (B) the vehicle cover 106 to be moved between the first extended and the second extended configurations with only control signals to the small active actuators of the second type of lift members, as the small passive actuators of the first type of lift members automatically assist movement to the second extended configuration when the weight of the vehicle cover 106 is removed from the small passive actuators of the first type of lift members (due to the aforementioned extension of the small active actuators of the second type of lift member).

Referring to FIG. 12, in the embodiment shown, a control system 800 for the vehicle cover lift system 100 system shown in FIGS. 1, 3 and 4 may include a processor 801 and a user input device 802. The processor 801 is in communication with the user input device 802 and with the active actuators of each of the lift members 180, 182, 184 and 186 via an input/output (I/O) interface 804. The user input device 802 may include a control device having at least three settings: “collapsed configuration”, “first extended configuration” and “second extended configuration”. Each setting may have a corresponding button on the user input device 802. In other embodiments, each setting may have a corresponding position on a slider of the user input device 802. Other embodiments may include additional or alternative settings. Actuation of a button sends a corresponding setting signal 808 to the processor 801 via the I/O interface 804. In response to receiving the setting signal 808, I/O interface 804 is configured to send a request for a current position signal 810, 812, 814 and 816 representing a current position of the active actuator rod in the lift members 180, 182, 184 and 186 respectively and send a desired position signal 820, 822, 824 and 826 for controlling the active actuators of the lift members 180, 182, 184 and 186. In certain embodiments, the desired position signal 820, 822, 824 and 826 may be sent to the motors (such as the motors 246, 346, 556 and 656) of the active actuators of each of the lift members 180, 182, 184 and 186 to power the extension/retraction of the active actuator rod of the active actuators.

For example, in response to receiving a setting signal 808 from the user input device 802 indicating that the user selected “collapsed configuration”, the processor 801 may be configured to first submit a request to each of the lift members 180, 182, 184 and 186 requesting a current position signal 810, 812, 814 and 816 respectively representing a current position of the active actuator rod of the active actuator in each of the lift members 180, 182, 184 and 186. In response to the received current position signals 810, 812, 814 and 816, the processor 801 may be configured to produce respective desired position signals 820, 822, 824 and 826 for retracting the active actuator rod of the active actuator in each of the lift members 180, 182, 184 and 186 back to a fully retracted position.

For example, if the current position signals 810 and 814 indicates that the active actuator rods of the large active actuators (such as the large active actuator 232 shown in FIGS. 5A-5C, and the large active actuator 332 shown in FIGS. 9A-9C) of the first type of lift members 180 and 184 are extended, the processor 801 may be configured to send respective desired position signals 820 and 824 directing the large active actuators to fully retract their active actuator rods into their respective active actuator housings (such as to the retracted large active actuator rod 244 shown in FIG. 5A and the retracted large active actuator rod 344 shown in FIG. 9A). The retraction of the extended large active actuator rods causes the weight of the vehicle cover 106 to be applied to the large passive actuators (such as the large passive actuator 532 shown in FIGS. 10A-10C and the large passive actuator 632 shown in FIGS. 11A-11C) of the second type of lift members 182 and 186, which automatically causes the large passive actuators to fully retract their passive actuator rods (such as to the retracted large passive actuator rod 544 shown in FIG. 10A and the retracted large passive actuator rod 644 shown in FIG. 11A). However, if the current position signals 810 and 814 indicate that the active actuator rods of the large active actuators of the first type of lift members 180 and 184 are not extended, the processor 801 may be configured to not send any additional desired position signals to the large active actuators of the first type of lift members 180 and 184.

Similarly, if the current position signals 812 and 816 indicates that the small active actuators (such as the small active actuator 534 shown in FIGS. 10A-10C and the small active actuator 634 shown in FIGS. 11A-11C) of the second type of lift members 182 and 186 have extended active actuator rods, the processor 801 may be configured to send corresponding desired position signals 822 and 826 directing the small active actuators of the second type of lift members 182 and 186 to retract their active actuator rods into their respective active actuator housings (such to as to the retracted small active actuator rod 554 shown in FIGS. 10A and 10B and the retracted small active actuator rod 654 shown in FIG. 11A for example). The retraction of the small active actuator rods of the second type of lift members 182 and 186 causes the weight of the vehicle cover 106 to be applied to the small passive actuators (such as the small passive actuator 234 shown in FIGS. 5A-5C and the small passive actuator 334 shown in FIGS. 9A-9C) of the first type of lift members 180 and 184, which automatically causes the small passive actuators to fully retract their passive actuator rods (such as to the retracted small passive actuator rod 254 shown in FIGS. 5A and 5B and the retracted small passive actuator rod 354 shown in FIGS. 9A and 9B). However, if the current position signals 812 and 816 indicate that the active actuator rods of the small active actuators of the second type of lift members 182 and 186 are not extended, the processor 801 may be configured to not send any additional desired position signals to the small active actuators of the second type of lift members 182 and 186.

In response to receiving a setting signal from the user input device 802 indicating that the user selected "first extended configuration", the processor 801 may be similarly configured to first submit a request to each of the lift members 180, 182, 184 and 186 requesting the current position signals 810, 812, 814 and 816 respectively representing a current position of the active actuator rod of the active actuator in each of the lift members 180, 182, 184 and 186. In response to the received current position signals 810, 812, 814 and 816, the processor 801 may be configured to produce respective desired position signals 820 and 824 for fully extending the active actuator rod of the large active actuator in each of the first type of lift members 180 and 184 and respective desired position signals 822 and 826 for fully retracting the active actuator rod of the small active actuator in each of the second type of lift members 182 and 186.

For example, if the current position signals 810 and 814 indicate that the active actuator rods of the large active actuators of the first type of lift members 180 and 184 are fully or partially retracted, the processor 801 may be configured to send respective desired position signals 820 and 824 directing the large active actuators to fully extend their active actuator rods from their respective active actuator housings (such as to the extended large active actuator rod 244 shown in FIGS. 5B and 5C and the extended large active actuator rod 344 shown in FIGS. 9A and 9C). The extension of the large active actuator rods removes the weight of the vehicle cover 106 from the large passive actuators of the second type of lift members 182 and 186. As described above, the large passive actuators are biased towards an extended configuration, and the removal of the weight of the vehicle cover 106 causes the large passive actuators to automatically fully extend their passive actuator rods (such as to the extended large passive actuator rod 544 shown in FIGS. 10B and 10C and the extended large passive actuator rod 644 shown in FIGS. 11B and 11C). However, if the current position signals 810 and 814 indicate that the active actuator rods of the large active actuators of the first type of lift members 180 and 184 are not extended, the processor 801 may be configured to not send any additional desired position signals to the large active actuators of the first type of lift members 180 and 184.

Similarly, if the current position signals 812 and 816 indicates that the active actuator rods of the small active actuators of the second type of lift members 182 and 186 are fully or partially extended, the processor 801 may be configured to send corresponding desired position signals 822 and 826 directing the small active actuators to fully retract their active actuator rods into their respective active actuator housings (such as to the retracted small active actuator rod 554 shown in FIGS. 10A and 10B and the retracted small active actuator rod 654 shown in FIGS. 11A and 11B). The retraction of the small active actuator rods of the second type of lift members 182 and 186 causes the weight of the vehicle cover 106 to be applied to the small passive actuators of the first type of lift members 180 and 184, which automatically causes the small passive actuators to fully retract their passive actuator rods (such as to the retracted small passive actuator rod 254 shown in FIGS. 5A and 5B and the retracted small passive actuator rod 354 shown in FIGS. 9A and 9B). However, if the current position signals 812 and 816 indicate that the active actuator rods of the small active actuators of the second type of lift members 182 and 186 are not extended, the processor 801 may be configured to not send any additional desired position signals to the small active actuators of the second type of lift members 182 and 186.

Finally, in response to receiving a setting signal from the user input device 802 indicating that the user selected "second extended configuration", the processor 801 may be similarly configured to first submit a request to each of the lift members 180, 182, 184 and 186 requesting the current position signal 810, 812, 814 and 816 respectively representing a current position of the active actuator rod of the active actuator in each of the lift members 180, 182, 184 and 186. In response to the received current position signals 810, 812, 814 and 816, the processor 801 may be configured to produce respective desired position signals 820, 822, 824 and 826 for extending the active actuator rod of the active actuator in each of the lift members 180, 182, 184 and 186 to a fully extended position.

For example, if the current position signals 810 and 814 indicate that the active actuator rods of the large active actuators of the first type of lift members 180 and 184 are fully or partially retracted, the processor 801 may be configured to send respective desired position signals 820 and 824 directing the large active actuators to fully extend their active actuator rods from their respective active actuator housings (such as to the extended large active actuator rod 244 shown in FIGS. 5B and 5C and the extended large active actuator rod 344 shown in FIGS. 9B and 9C). The extension of the large active actuator rods removes the weight of the vehicle cover 106 from the large passive actuators of the second type of lift members 182 and 186. As described above, the large passive actuators are biased towards an extended configuration, and the removal of the weight of the vehicle cover 106 causes the large passive actuators to automatically fully extend their passive actuator rods (such as to the extended large passive actuator rod 544 shown in FIGS. 10B and 10C and the extended large passive actuator rod 644 shown in FIGS. 11B and 11C). However, if the current position signals 810 and 814 indicate that the active actuator rods of the large active actuators of the first type of lift members 180 and 184 are fully extended, the processor 801 may be configured to not send any additional desired position signals to the large active actuators of the first type of lift members 180 and 184.

Similarly, if the current position signals 812 and 816 indicates that the active actuator rods of the small active actuators of the second type of lift members 182 and 186 are fully or partially retracted, the processor 801 may be configured to send corresponding desired position signals 822 and 826 directing the small active actuators to fully extend their active actuator rods from their respective active actuator housings (such as to the extended small active actuator rod 544 shown in FIG. 10C and the extended small active actuator rod 654 shown in FIGS. 11C). The extension of the small active actuator rods of the second type of lift members 182 and 186 removes the weight of the vehicle cover 106 from the small passive actuators of the first type of lift members 180 and 184. As described above, the small passive actuators are biased towards an extended configuration, and the removal of the weight of the vehicle cover 106 causes the small passive actuators to automatically fully extend their passive actuator rods (such as to the extended small passive actuator rod 254 shown in FIG. 5C and the extended small passive actuator rod 354 shown in FIG. 9C). However, if the current position signals 812 and 816 indicate that the active actuator rods of the small active actuators of the second type of lift members 182 and 186 are not retracted, the processor 801 may be configured to not send any additional desired position signals to the small active actuators of the second type of lift members 182 and 186.

Frame Members

In certain embodiments, the vehicle cover lift system 100 also includes at least one stabilizing frame 400 extending between at least two lift members of the plurality of lift members 102. The frame 400 may function to stabilize the lift members 102 as the lift members 102 move between the nested configuration (shown in FIGS. 5A, 9A, 10A and 11A) and extended configurations (shown in FIGS. 5B, 5C, 9B, 9C, 10B, 10C, 11B and 11C) and move the vehicle cover 106 between the collapsed configuration (shown in FIG. 1), the first extended configuration (shown in FIG. 3) and the second extended configuration (shown in FIG. 4). The frame 400 may also enable attachment of additional components to the lift members 102 as described below.

Figure 13:
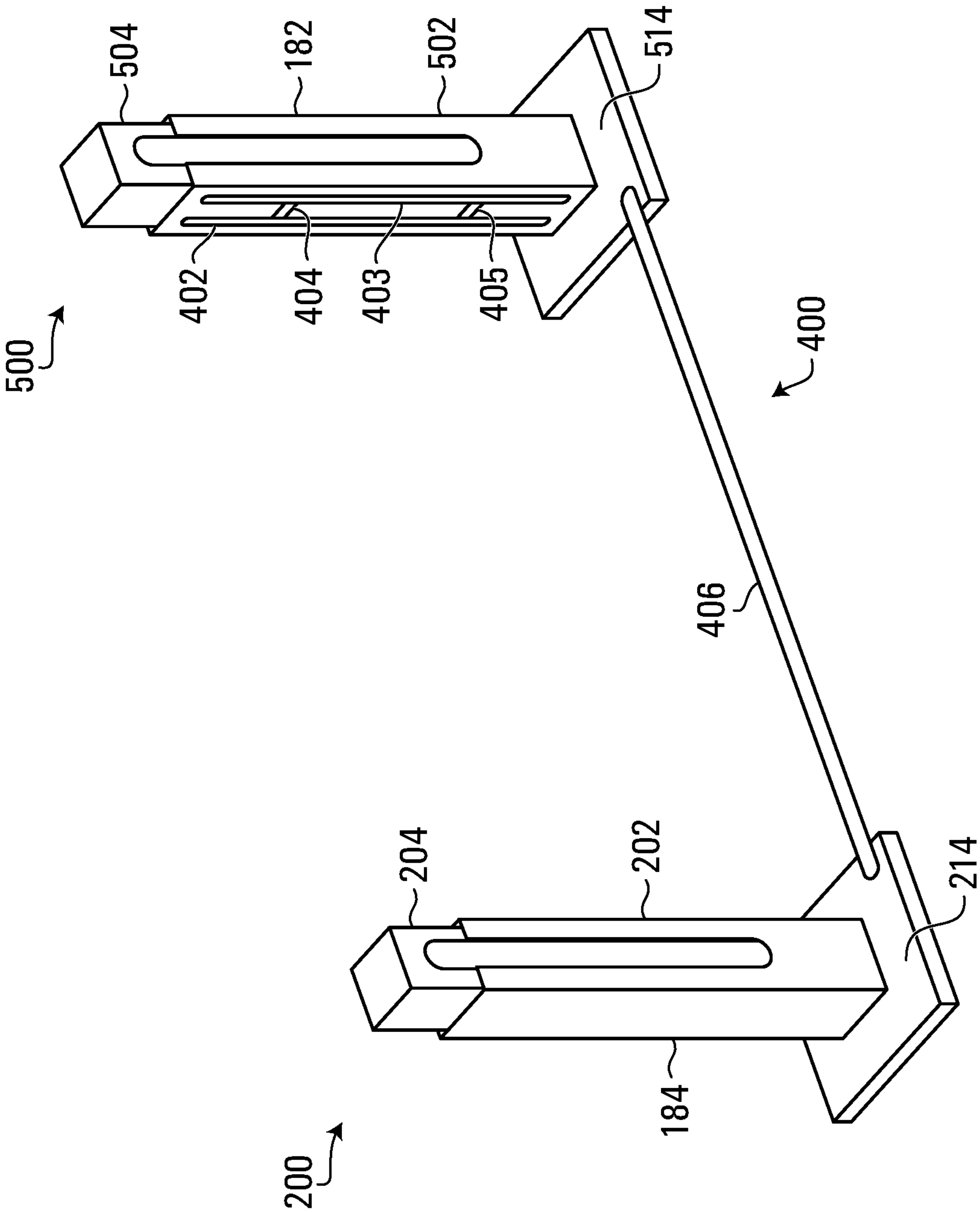
FIG. 13 is a perspective view of a stabilizing frame for the vehicle lift system of FIG. 1 in accordance with one embodiment.

Referring to FIG. 13, the embodiment of the frame 400 shown is adapted for attachment to the first embodiment of the first type of lift member 200 (shown in FIGS. 5A-5C) and the first embodiment of the second type of lift member 500 (shown in FIGS. 10A-10C), where the extension member (such as the extension members 204 and 504) are dimensioned to be nested within the base members (such as the base members 202 and 502). In the embodiment shown in FIG. 13, the frame 400 is coupled to the second lift member 182 being the second type of lift member 500 and the third lift member 186 being the first type of lift member 200; in other embodiments, the frame 400 may be coupled to other ones of the plurality of lift members 102.

In the embodiment shown, the frame 400 includes first and second vertical mounts 402 and 403 and first and second horizontal mounts 404 and 405 coupled to the base member 502 of the second lift member 182. The vertical and horizontal mounts 402, 403, 404 and 405 may generally comprise an attached portion of the mounting system, and may comprise attached rails or tracks for example. The vertical mounts 402 and 403 may specifically be coupled to the rear end wall of the base member 502 facing the third lift member 184; in other embodiments, the first and second vertical mounts 402 and 403 may be coupled to other walls of the base member 502, generally depending on the position of the second lift member 182 in the vehicle bed 104. The vertical mounts 402 and 403 have a height of approximately 32 inches and a width of approximately 1 inch, and may be made from aluminium or another metal-based material; in other embodiments and depending on the height 215, the vertical mounts 402 and 403 may have a height ranging between approximately 32 and 44 inches, a width ranging between approximately 1 and 5 inches and may be made from wood-based or polymer-based materials. The horizontal mounts 404 and 405 may also be coupled to the rear end wall and may extend between the vertical mounts 402 and 403 proximate an upper end and a lower end of the vertical mounts 402 and 403. The horizontal mounts 404 and 405 have a height of approximately 1 inch and a width of approximately 5 inches, and may be made from aluminium or another metal-based material; in other embodiments and depending on a width of the base member 502, the horizontal mounts 404 and 405 may have a height ranging between approximately 1 and 5 inches, a width ranging between approximately 1 and 12 inches and may be made from wood-based or polymer-based materials. Similar corresponding vertical and horizontal mounts (not shown) may be coupled to the front end wall of the base member 202 of the third lift member 184 facing the second lift member 182 at positions generally mirroring the position of the vertical and horizontal mounts 402, 403, 404 and 405 on the rear end wall of the second lift member 182.

The vertical and horizontal mounts 402, 403, 404 and 405 on both the second and third lift members 182 and 184 generally allow attachable components—such as shelves, panels and racks for example—to be coupled to and between the second and third lift members 182 and 184 across a long edge of the vehicle bed 104 (such as the right edge 123 for example) to stabilize the second and third lift members 182 and 184 as they move between the nested and extended configurations and move the vehicle cover 106 between the collapsed, the first extended and the second extended configurations. For example, in some embodiments, attachable components such as shelves, panels and racks may include corresponding couplings to fit in apertures of the vertical and horizontal mounts 402, 403, 404 and 405, and the attachable components may stabilize the second and third lift members 182 and 184 by providing additional load paths for forces during the movement of second and third lift members 182 and 184.

In the embodiment shown in FIG. 13, the frame 400 further includes a horizontal spanning member 406 having a first end coupled to the baseplate 514 of the second lift member 182 and a second end coupled to the baseplate 214 of the third lift member 184. The horizontal spanning member 406 may further stabilize the second and third lift members 182 and 184 as they move between the nested and extended configurations and move the vehicle cover 106 between the collapsed, first extended and second extended configurations, again by providing an additional load path for forces during the movement of the second and third lift members 182 and 184.

Similar vertical and horizontal mounts (not shown) may be coupled to the end walls of the base member of the fourth and first lift members 186 and 180 and a similar horizontal spanning member (not shown) may be coupled to the baseplate of the fourth and first lift members 186 and 180 along the left edge 127, to similarly stabilize the fourth and first lift members 186 and 180 as they move between the nested and extended configurations and move the vehicle cover 106 between the collapsed, first extended and second extended configurations. Similar vertical and horizontal mounts may be coupled to the side walls of first and second lift members 180 and 182 which face each other (such as the side walls 211 and 511 for example) and similar vertical and horizontal mounts may be coupled to the side walls of the third and fourth lift members 184 and 186 which face each other. Having vertical and horizontal mounts coupled to each of the lift members 180, 182, 184 and 186 may allow additional structures - such as the aforementioned shelves, panels and racks for example - to be coupled to and between any of the lift members 180, 182, 184 and 186.

Figure 14:
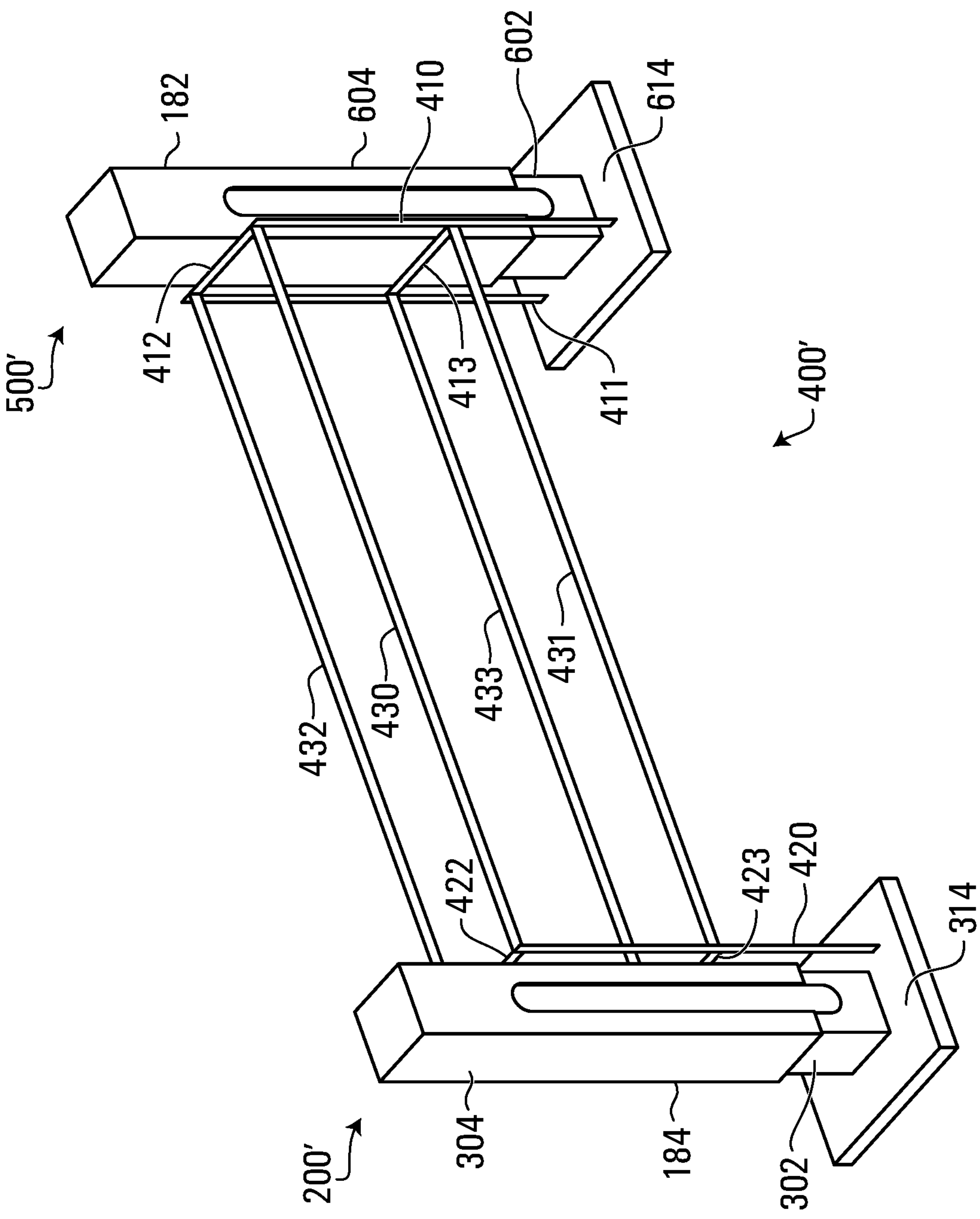
FIG. 14 is a perspective view of a stabilizing frame for the vehicle lift system of FIG. 1 in accordance with another embodiment.

Referring to FIG. 14, a second embodiment of the frame 400' is adapted for attachment to the second embodiment of the first type of lift member 200' (shown in FIGS. 9A-9C) and the second embodiment of the second type of lift member 500' (shown in FIGS. 10A-10C), where the base member (such as the base members 302 and 602) are dimensioned to be nested within the extension members (such as the extension members 304 and 504) as described above. In the embodiment shown, the frame 400' is coupled to the second lift member 182 being the second type of lift member 500' and the third lift member 186 being the first type of lift member 200'; in other embodiments, the frame 400' may be coupled to other ones of the plurality of lift members 102.

In the embodiment shown, the frame 400' includes a first vertical member 410, a second vertical member 411, a first horizontal member 412 and a second horizontal member 413 associated with the second lift member 182. In the embodiment shown, the lower end of each of the vertical members 410 and 411 may be coupled to the baseplate 614 of the second lift member 182 proximate the end walls facing the third lift member 184, which allow the vertical members 410 and 411 to remain unaffected by the movement of the extension member 604 relative to the base member 602 as the second lift member 182 moves between the nested configuration (shown in FIG. 11A) and the extended configuration (shown in FIGS. 11B and 11C). In other embodiments, the first and second vertical members 410 and 411 may be coupled to the baseplate 614 proximate other end walls of the lift member 500', generally depending on the position of the second lift member 182 in the vehicle bed 104. The horizontal members 412 and 413 may extend between the vertical members 410 and 411 at an upper end and near a middle of the vertical members 410 and 411. Other embodiments may include additional or fewer horizontal members extending between the vertical members 410 and 411. The vertical members 410 and 411 may have a height of approximately 32 inches and a width of approximately 1 inch, and may be made from aluminium or another metal-based material; in other embodiments, the vertical members 410 and 411 may have a height ranging between approximately 32 and 44 inches, a width ranging between approximately 1 and 5 inches and may be made from wood-based or polymer-based materials. The horizontal members 412 and 413 have a height of approximately 1 inch and a width of approximately 5 inches, and may be made from wood-based or polymer-based materials; in other embodiments, the horizontal members 412 and 413 may have a height ranging between approximately 1 and 5 inches, a width ranging between approximately 1 and 12 inches and may be made from wood-based or polymer-based materials.

The frame 400' also includes a mirroring first vertical member 420, a second vertical member (not shown), a first horizontal member 422 and a second horizontal member 423 associated with the third lift member 184. Similar to the vertical members 410 and 411 associated with the second lift member 182, a lower end of each of the vertical members 420 and 421 may be coupled to the baseplate 314 of the third lift member 184 proximate the end walls facing the second lift member 182, which allow the vertical members 420 and 421 to remain unaffected by the movement of the extension member 304 relative to the base member 302. The first and second horizontal members 422 and 423 may extend between the vertical members 420 and 421 at an upper end and near a middle of the first and second vertical members 420 and 421. Other embodiments may include additional or fewer horizontal members extending between the first and second vertical members 420 and 421. The vertical and horizontal members 420, 421, 422 and 423 may have dimensions and may be made of material similar to the vertical and horizontal members 410, 411, 412 and 413 described above.

The frame 400' may further include a first spanning member 430 and a second spanning member 431 extending between the first vertical member 410 associated with the second lift member 182 and the first vertical member 420 associated with the third lift member 184, generally at the upper end and the middle of the first vertical members 410 and 420. Other embodiments may include additional or fewer spanning members extending between the first vertical members 410 and 420. The frame 400' may further include a third spanning member 432 and a fourth spanning member 433 extending between the second vertical member 411 associated with the second lift member 182 and the second vertical member (not shown) associated with the third lift member 184, generally at the upper end and the middle of the second vertical members 420 and generally mirroring the first and second spanning members 430 and 431. Other embodiments may include additional or fewer spanning members extending between the second vertical members 411 and 421. The spanning members 430, 431, 432 and 433 may generally comprise an attached portion of a mounting system, and may comprise attached rails or tracks for example. The spanning members 430, 431, 432 and 433 may also generally be identical, and may each have a height of approximately 1 inch and a width of approximately 58 inches, and may be made from aluminium or another metal-based material; in other embodiments, the spanning members 430, 431, 432 and 433 may have a height ranging between approximately 1 and 5 inches, a width ranging between approximately 42 and 80 inches and may be made from wood-based or polymer-based materials.

The spanning members 430, 431, 432 and 433 generally allow attachable components—such as shelves, panels and racks for example—to be coupled thereto. The combination of the vertical members 410, 411, 420 and 421, the horizontal members 412, 413, 422 and 423 and the spanning members 430, 431, 432 and 433 also function to stabilize the second and third lift members 182 and 184 as they move between the nested and extended configurations and move the vehicle cover 106 between the collapsed, the first extended and the second extended configurations. For example, the spanning members 430, 431, 432 and 433 may provide additional load paths for forces during the movement of the second and third lift members 182 and 184.

In the embodiment shown in FIG. 14, the frame 400' is associated with the second and third lift members 182 and 184. In other embodiments, the frame 400' may alternatively or additionally include vertical, horizontal and spanning members associated with the fourth and first lift members 186 and 180, to similarly stabilize the fourth and first lift members 186 and 180 as they move between the nested and extended configurations and move the vehicle cover 106 between the collapsed, first extended and second extended configurations. Additionally, in other embodiments, the frame 400' may alternatively or additionally include vertical, horizontal and spanning members associated with the first and second lift members 180 and 182, to allow the attachable components to be coupled across the top edge 121 of the vehicle bed 104, and to stabilize the first and second lift members 180 and 182 as they move between the nested and extended configurations and move the vehicle cover 106 between the collapsed, first extended and second extended configurations.

Collapsible Structures

As the vehicle cover lift system 100 is adapted to move the vehicle cover 106 between the collapsed configuration (shown in FIG. 1), the first extended configuration (shown in FIG. 3), and second extended configuration (shown in FIG. 4), an internal volume between the vehicle cover 106 and the vehicle bed 104 is variable from a small internal volume when the vehicle cover 106 is in the collapsed configuration, to a medium internal volume when the vehicle cover 106 is in the first extended configuration and to a large internal volume when the vehicle cover 106 is in the second extended configuration. This variable internal volume can facilitate placement of one or more types of collapsible structures between the vehicle cover 106 and the vehicle bed 104.

i) Collapsible Desk 450

Referring to FIGS. 15-20, one embodiment of such collapsible structures comprises at least one collapsible desk shown generally at 450. In the embodiment shown, the at least one collapsible desk 450 includes a first collapsible desk 451 extending between the fourth and first lift members 186 and 180 and a second collapsible desk 452 extending between the second and third lift members 182 and 184. In the embodiment shown, the first and second collapsible desks 451 and 452 are substantially identical and are mirror images of each other. Specific components of the first collapsible desk 451 are described in detail below, and one of ordinary skill in the art would appreciate that the same components and descriptions are applicable to the second collapsible desk 452.

The collapsible desk 451 is generally configured to be moved by an operator between a collapsed desk configuration (shown in FIGS. 15 and 16) adapted to fit in the small internal volume when the vehicle cover 106 is in the collapsed configuration (shown in FIG. 1) and an extended desk configuration (shown in FIG. 20) adapted to fit in the large internal volume when the vehicle cover 106 is in the second extended configuration (shown in FIG. 4). The extended desk configuration of the collapsible desk 451 can also be extended outwards relative to the fourth and first lift members 186 and 180 to increase the amount of space for a user within the internal volume between the cover and bed surfaces 168 and 128, and can also provide privacy by supplying walls along the long edges (such as the left and right edges 127 and 123) of the vehicle bed 104 when the plurality of lift members 102 are in the extended configuration and the vehicle cover 106 is in the second extended configuration.

In the embodiment shown in FIGS. 15-20, the collapsible desk 451 may include a fixed lower portion 460 and a collapsible upper portion 480. The fixed lower portion 460 includes a fixed bottom wall 461, fixed first and second side walls 462 and 463 fixedly coupled to the fixed bottom wall 461 and a fixed rear wall 464 also fixedly coupled to the fixed bottom wall 461. In the embodiment shown, the fixed bottom wall 461 has a width of approximately 23 inches and a length of approximately 57 inches; in other embodiments, the fixed bottom wall 461 may have a width ranging between approximately 18 and 23 inches and a length ranging between approximately 45 and 80 inches, generally depending on a length of the long edges (such as the left and right edges 127 and 123) of the vehicle bed 104. The fixed first and second side walls 462 and 463 are substantially identical. The fixed first and second side walls 462 and 463 have respective widths substantially equal to the width of the fixed bottom wall 461 and respective heights of approximately 10.5 inches; in other embodiments, the fixed first and second side walls 462 and 463 may have respective heights ranging between approximately 10 and 22 inches. Similarly, the fixed rear wall 464 has a length substantially identical to the length of the fixed bottom wall 461 and a height slightly larger than the respective heights of the fixed first and second side walls 462 and 463 at approximately 12 inches (to allow nesting of the collapsible upper portion 480 as described below); in other embodiments, and depending on the corresponding height of the fixed first and second side walls 462 and 463, the height of the fixed rear wall 464 may range between approximately 10 inches and 15 inches. Collectively, the fixed bottom wall 461, the fixed first and second side walls 462 and 463 and the fixed rear wall 464 generally form a drawer structure having an open front positioned between the fourth and first lift members 186 and 180. The drawer structure has a length 710 of approximately 57 inches (shown in FIG. 16, approximately equal to the length of the fixed bottom wall 461 and the fixed rear wall 464), a width 711 of approximately 23 inches (shown in FIG. 15, approximately equal to the width of the fixed bottom wall 461 and the fixed first and second side walls 462 and 463) and a height 712 of approximately 12 inches (shown in FIG. 15, approximately equal to the height of the fixed rear wall 464).

The entire collapsible desk 451 may be slidably coupled or slidably engaged to the fourth and first lift members 186 and 180 via a first side wall track 466 coupled to the fixed first side wall 462 and a second side wall track 467 coupled to the fixed second sidewall 463. The first side wall track 466 may be adapted to be coupled to a corresponding first attachment roller 476 (best shown in FIG. 16) coupled to the end wall of the base member 502 of the fourth lift member 186 facing the first lift member 180. The second side wall track 467 may be adapted to be coupled to a corresponding second attachment roller 477 (best shown in FIG. 16) coupled to the end wall of the base member 202 of the first lift member 180 facing the fourth lift member 186. In other embodiments, the collapsible desk 451 may be coupled to other side walls of the lift members, depending on the position of the lift members 180 and 186 within the vehicle bed 104. In the embodiment shown, the first and second side wall tracks 466 and 467 are positioned at substantively identical and mirroring positions on the fixed first and second side walls 462 and 463 and the corresponding attachment rollers 476 and 477 are also positioned at substantively identical and mirroring positions on the end walls of the fourth and first lift members 186 and 180, to maintain the collapsible desk 451 parallel to the bed surface 128. In other embodiments, the first and second side wall tracks 466 and 467 may be positioned at different locations on the fixed first and second side walls 462 and 463 and the first and second attachment rollers 476 and 477 may also be positioned at corresponding different locations on the side walls of the fourth and first lift members 186 and 180 so long as the collapsible desk 451 is maintained parallel to the bed surface 128.

Figure 17:
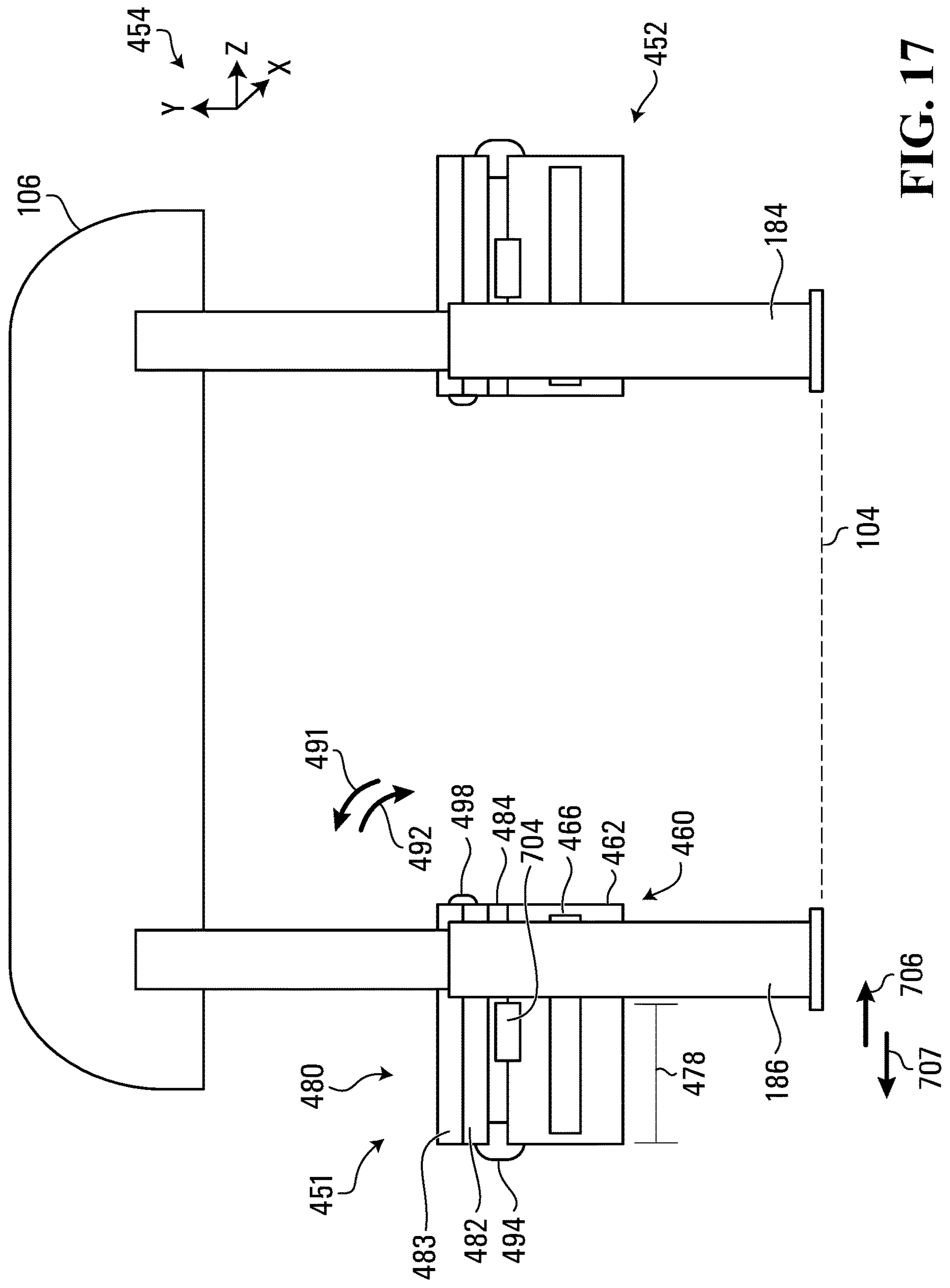
Figure 18:
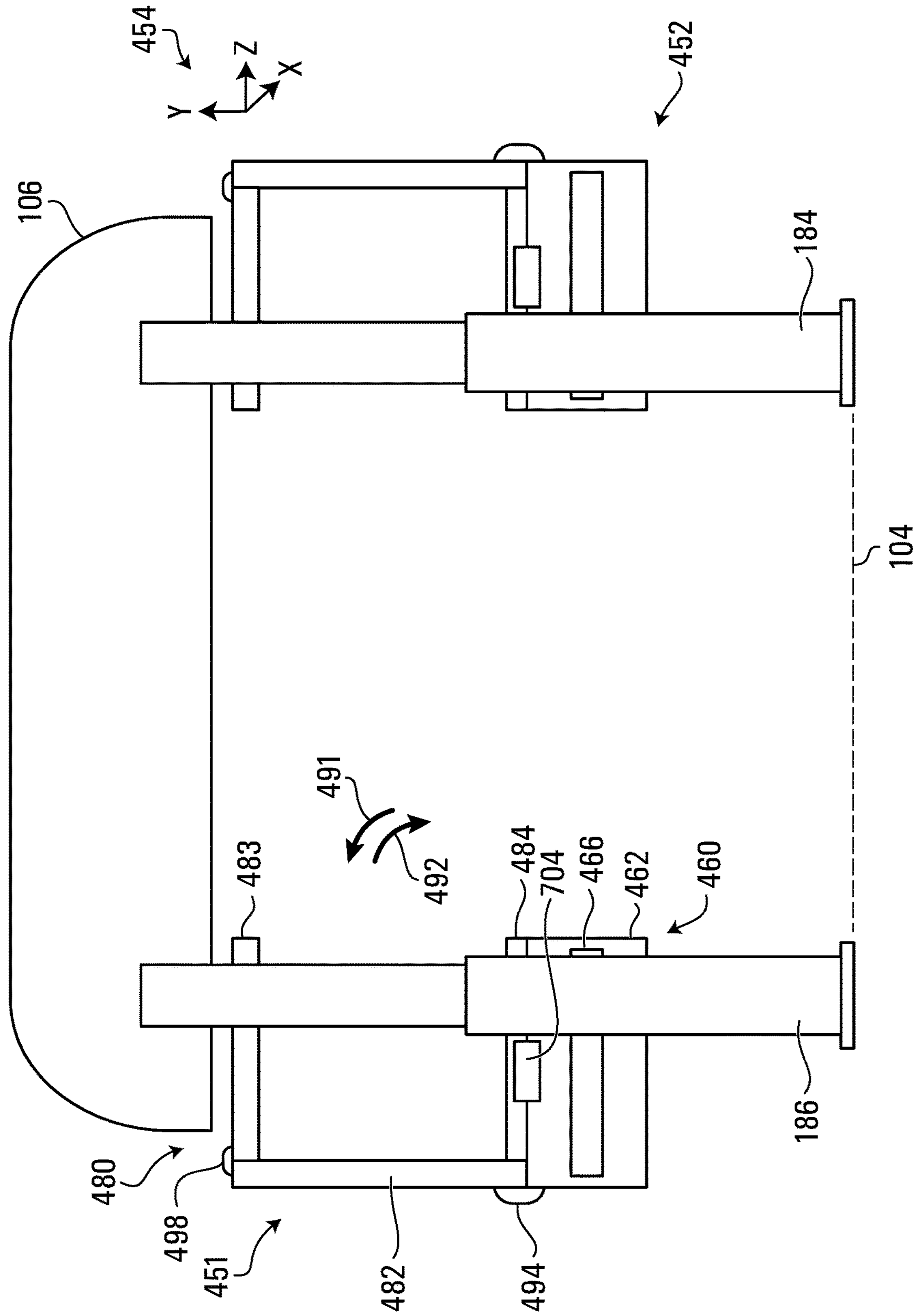
Figure 19:
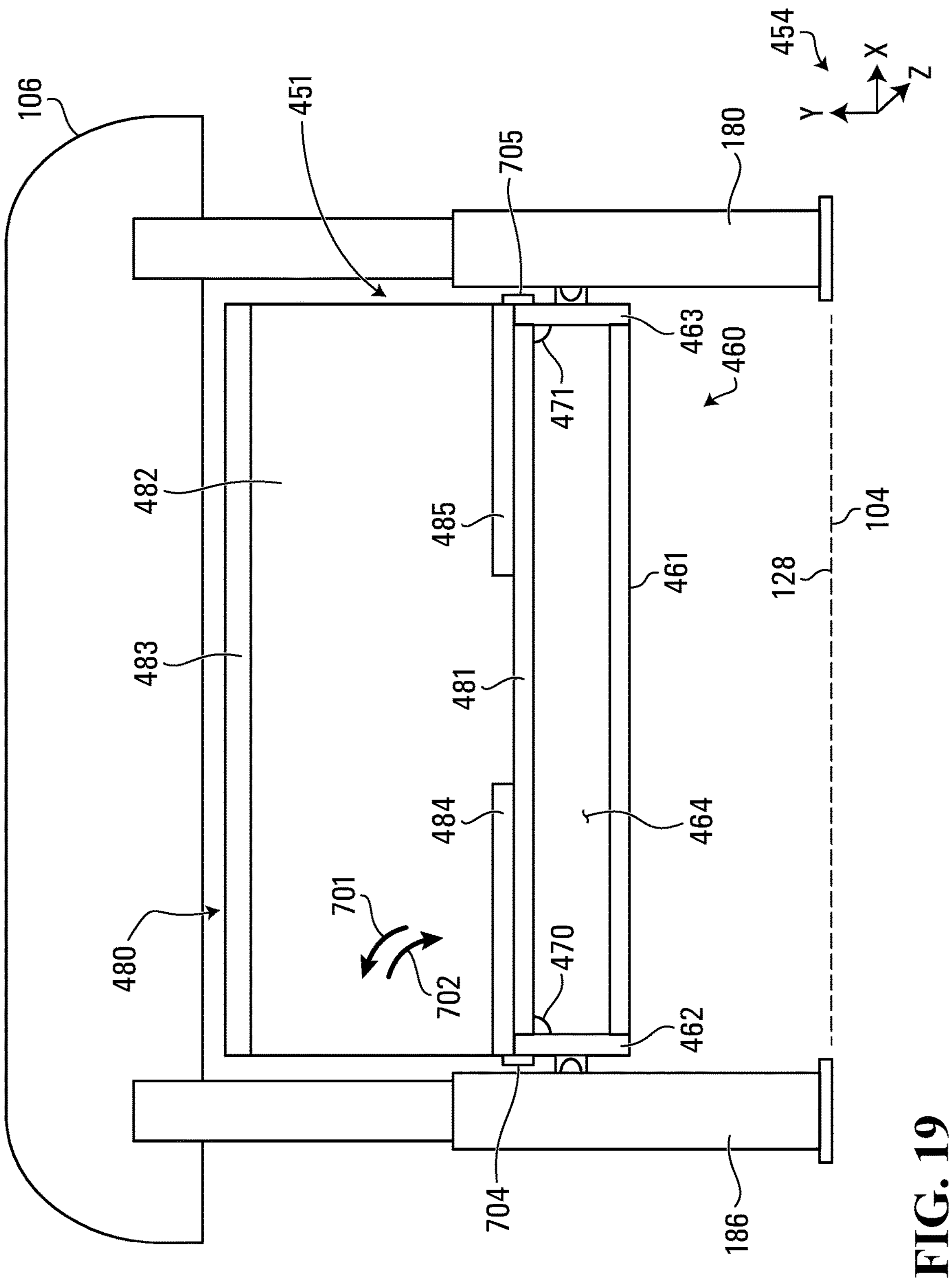
Figure 20:
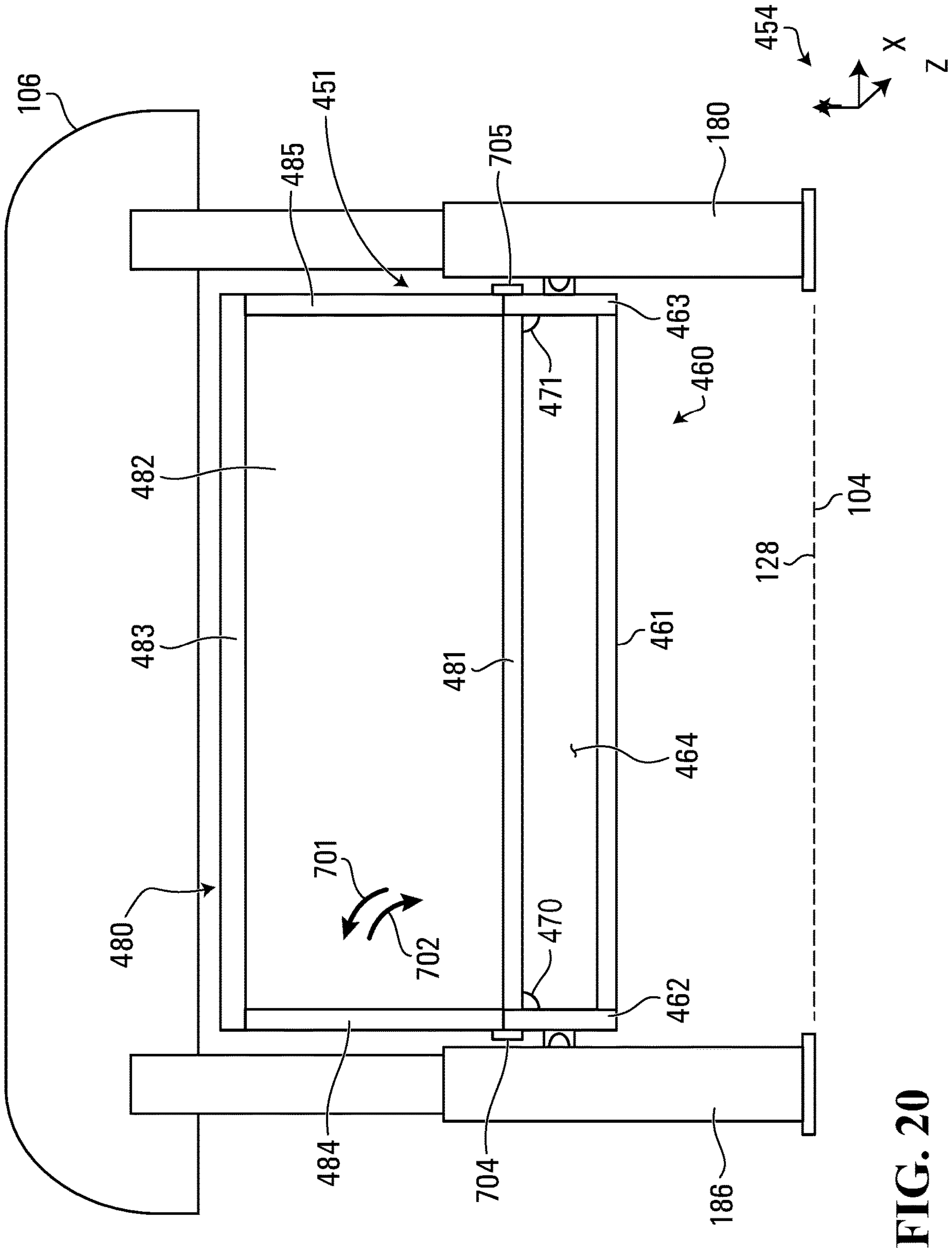
FIG. 20 is a side elevation view of the collapsible desk of FIG. 15 in the extended desk configuration.

Referring now to FIG. 17, the combination of the first and second side wall tracks 466 and 467 and the first and second attachment rollers 476 and 477 generally allow the collapsible desk 451 to be extended from the fourth and first lift members 186 and 180 via an extension distance 478, which may increase the variable internal volume between the vehicle cover and bed 106 and 104. In the embodiment shown, the extension distance 478 is approximately 16 inches; in other embodiments, depending on the length of the fixed first and second side walls 462 and 463, the extension distance 478 may range between approximately 15 and 20 inches.

Referring back to FIGS. 15-20, the collapsible upper portion 480 includes a movable bottom wall 481, a pivotable rear wall 482, a pivotable top wall 483, a pivotable first side wall 484 and a pivotable second side wall 485. In the embodiment shown in FIGS. 15-20, the movable bottom wall 481 is removably coupled to the to the fixed rear wall 464 and the fixed first and second side walls 462 and 463. The movable bottom wall 481 has a width of approximately 19 inches and a length of approximately 55.5 inches and is generally dimensioned to fit within a space formed by the fixed rear wall 464 and fixed side walls 462 and 463 to form a removable top wall of the drawer structure. In other embodiments and depending on size of the vehicle bed 104, the movable bottom wall 481 may have a width ranging between approximately 18 and 22 inches and a length ranging between approximately 52 and 80 inches. Additionally, in the embodiment shown, the fixed first and second side walls 462 and 463 also include respective bottom wall stops 470 and 471 (best shown in FIGS. 16, 19 and 20) which retain the movable bottom wall 481 in a substantially horizontal configuration shown in FIGS. 15-20. In other embodiments (not shown), the movable bottom wall 481 may be pivotably coupled to the fixed rear wall 464 via at least one bottom wall hinge. The at least one bottom wall hinge may allow the movable bottom wall 481 to be pivoted in an upward direction 491 and a downward direction 492 (shown in FIGS. 15, 17 and 18) relative to an x-axis of reference coordinate 454, such that the movable bottom wall 481 is movable between the substantially horizontal configuration shown in FIGS. 15-20 and a substantially vertical configuration (not shown) generally parallel to the pivotable rear wall 482 in a vertical configuration described below and shown in FIGS. 18-20. In such embodiments, in addition to, or as an alternative to, the bottom wall stops 470 and 471, the at least one bottom wall hinge may also include one or more internal components which maintain the movable bottom wall 481 in the substantially horizontal configuration. For example, the at least one bottom wall hinge may comprise a constant torque hinge designed to provide constant resistance and pre-set to a weight of the movable bottom wall 481, a friction or a stop hinge designed to resist motion caused by gravity or external forces, a detent hinge, etc. In the embodiment shown, the movable bottom wall 481 includes a substantially flat and continuous top surface made of bamboo or another wood-based material, and may generally function as a desk top. In other embodiments, the movable bottom wall 481 may be made of metal-based or polymer-based materials. In other embodiments, the movable bottom wall 481 may include built-in appliances, such as a built-in sink or a built-in stove and may generally function as a kitchen counter. In such embodiments, a separation distance between the movable bottom wall 481 and the fixed bottom wall 461 (substantially equal to the height of the fixed first and second side walls 462 and 463 and the fixed rear wall 464) may provide space for hidden components of the built-in appliances, such as a lower portion of a basin of the built-in sink or electrical components of the built-in stove for example.

Still referring to FIGS. 15-20, the pivotable rear wall 482 generally functions as a wall or a barrier for the long edges of the vehicle bed 104 (such as the left edge 127). In the embodiment shown, the pivotable rear wall 482 has a width of approximately 54 inches and a height of approximately 23 inches; in other embodiments and depending on size of the vehicle bed 104 and the total extended height of the fourth and first lift members 186 and 180 (such as the total extended heights 208 or 508 shown in FIGS. 5B and 10B), the pivotable rear wall 482 may have a width ranging between approximately 42 and 80 inches and a length ranging between approximately 21 and 35 inches. The pivotable rear wall 482 may be pivotably coupled to the fixed rear wall 464 via at least one rear wall hinge 494 (best shown in FIGS. 15, 17 and 18). The at least one rear wall hinge 494 allows the pivotable rear wall 482 to be pivoted in the upward and downward directions 491 and 492 (shown in FIGS. 15, 17 and 18) relative to the x-axis of the reference coordinate 454, such that the pivotable rear wall 482 is movable between a substantially horizontal configuration shown in FIGS. 15-17 and the substantially vertical configuration shown in FIGS. 18-20. The at least one rear wall hinge 494 may include one or more internal components which maintain the pivotable rear wall 482 in the substantially vertical configuration when moved to that configuration, and may comprise a constant torque hinge, a friction or stop hinge, a detent hinge and the like. In certain embodiments (not shown), the pivotable rear wall 482 may also be coupled to the fixed first and second side walls 462 and 463 via respective first and second gas springs which may assist the operator in moving the pivotable rear wall 482 between the substantially horizontal configuration and the substantially vertical configuration. In the embodiment shown, the pivotable rear wall 482 comprises a generally flat, continuous, and substantially opaque surface made of acrylic or another polymer-based material, and may function as a hard privacy barrier. In other embodiments, the pivotable rear wall 482 may include one or more transparent regions (such as a window or the like) to allow light into the interior volume, or may comprise a substantially transparent rear surface. Additionally, in other embodiments, the pivotable rear wall 482 may be made of aluminium, stainless steel, fiberglass, rigid foam insulation, acrylonitrile butadiene styrene (ABS) thermoplastic, carbon fibre, polycarbonate, plexiglass, wood, or fibre-reinforced plastic board.

Still referring to FIGS. 15-20, the pivotable top wall 483 generally functions as a top barrier enclosing the increased internal volume enabled by extension of the collapsible desk 451 relative to the fourth and first lift members 186 and 180. In the embodiment shown, the pivotable top wall 483 has a width of approximately 20 inches and a length of approximately 55 inches; in other embodiments, depending on the size of the vehicle bed 104 and the extension distance 478 of the collapsible desk 451, the pivotable top wall 483 may have a width ranging between approximately 43 and 80 inches and a height ranging between approximately 18 and 22 inches. The pivotable top wall 483 is coupled to the pivotable rear wall 482 via at least one top wall hinge 498 (shown in FIGS. 15-18). The at least one top wall hinge 498 generally allows the pivotable top wall 483 to be pivoted in the upward and downward directions 491 and 492 (shown in FIGS. 15, 17 and 18) relative to the x-axis of the reference coordinate 454, such that the pivotable top wall 483 is movable between a folded configuration shown in FIGS. 15-17 and an extended configuration shown in FIGS. 18-20. The at least one top wall hinge 498 may include one or more internal components which maintain the pivotable top wall 483 in the extended configuration when moved to that configuration, and may comprise a constant torque hinge, a friction or stop hinge, a detent hinge, and the like. Additionally or alternatively, the pivotable first and second side walls 484 and 485 may include attachment features (not shown) designed to couple to corresponding attachment features (not shown) of the pivotable top wall 483. For example, respective top edges of the pivotable first and second side walls 484 and 485 and side edges of the pivotable top wall 483 may include corresponding fasteners, such as corresponding magnetic fasteners, corresponding mechanical fasteners, etc., to attach the top edges and the side edges to stabilize and maintain both the pivotable top wall 483 in the extended configuration and the pivotable first and second side walls 484 and 485 in their respective substantially vertical configurations described below. In certain embodiments (not shown), the pivotable top wall 483 is also coupled to the pivotable rear wall 482 via at least one gas spring which may assist the operator in moving the pivotable top wall 483 between the folded configuration and the extended configuration. In the embodiment shown, the pivotable top wall 483 comprises a generally flat, continuous and substantially opaque surface made of a wood-based material, and may function as a hard and non-flexible privacy barrier. In other embodiments, the pivotable top wall 483 may include one or more transparent regions to allow light into the interior volume or may comprise a substantially transparent rear surface. Additionally, in other embodiments, the pivotable top wall 483 may be made of aluminium, stainless steel, fiberglass, rigid foam insulation, ABS thermoplastic, carbon fibre, polycarbonate, plexiglass, wood, or fibre-reinforced plastic board for example.

Still referring to FIGS. 15-20, the pivotable first and second side walls 484 and 485 generally function as side barriers enclosing the increased internal volume when the collapsible desk 451 is extended relative to the fourth and first lift members 186 and 180. In the embodiment shown, the pivotable first and second side walls 484 and 485 are substantially identical and have respective widths of approximately 18 inches and respective heights of approximately 25 inches; in other embodiments, depending on the total extended height of the fourth and first lift members 186 and 180 (such as the total extended heights 208 and 508 shown in FIGS. 5B and 10B) and the extension distance 478 of the collapsible desk 451, the pivotable first and second side walls 484 and 485 may have respective widths ranging between approximately 16 and 20 inches and respective lengths ranging between approximately 23 and 36 inches. The pivotable first side wall 484 is coupled to the fixed first side wall 462 via at least one first side wall hinge 704 (shown in FIGS. 15-20) and the pivotable second side wall 485 is coupled to the fixed second side wall 463 via at least one second side wall hinge 705 (shown in FIGS. 16, 19 and 20). The at least one first side wall hinge 704 generally allows the pivotable first side wall 484 to be pivoted in a left direction 701 and a right direction 702 (shown in FIGS. 16, 19 and 20) relative to a z-axis of the reference coordinate 454, such that the pivotable first side wall 484 is movable between a substantially horizontal configuration shown in FIGS. 15-19 and a substantially vertical configuration shown in FIG. 20. Similarly, the at least one second side wall hinge 705 also generally allows the pivotable second side wall 485 to be pivoted in the left and right directions 701 and 702, such that the pivotable second side wall 485 is also movable between a substantially horizontal configuration shown in FIGS. 15-19 and a substantially vertical configuration shown in FIG. 20. The at least one first and second side wall hinges 704 and 705 may include one or more internal components which maintain the respective pivotable first and second side wall 484 and 485 in the substantially vertical configuration when moved to that configuration, and may comprise a constant torque hinge, a friction or stop hinge, a detent hinge and the like. Additionally or alternatively, as described above, the pivotable top wall 483 and the pivotable first and second side walls 484 and 485 may include respective attachment features designed to couple to each other to stabilize and maintain both the pivotable top wall 483 in the extended configuration as described above and the pivotable first and second side walls 484 and 485 in their respective substantially vertical configurations. In the embodiment shown, the pivotable first and second side walls 484 and 485 comprises a generally flat, continuous and substantially opaque surface made of a wood-based material, and may function as a hard privacy barrier. In other embodiments, the pivotable first and second side walls 484 and 485 may include one or more transparent regions or may comprise a substantially transparent rear surface. Additionally, in other embodiments, the pivotable top wall 483 may be made of aluminium, stainless steel, fiberglass, rigid foam insulation, ABS thermoplastic, carbon fibre, polycarbonate, plexiglass, wood, or fibre-reinforced plastic board for example.

During operation, when the lift members 102 are in the nested configuration and vehicle cover 106 is in the collapsed configuration, the collapsible desk 451 can be collapsed into the collapsed desk configuration by an operator to fit within the small internal volume between the cover surface 168 and the bed surface 128. In the collapsed configuration, the collapsible desk 451 is substantially the size of its fixed lower portion 460, with a length approximately equal to the length 710 (shown in FIG. 16), a width approximately equal to the width 711 (shown in FIG. 15) and a height slightly greater than the height 712 (shown in FIG. 15). The movable bottom wall 481 is in the substantially horizontal configuration (shown in FIGS. 15-20) resting on the bottom stops 470 and 471. The pivotable first and second side walls 484 and 485 are also in their substantially horizontal configurations (shown in FIGS. 15-19) resting on top of the movable bottom wall 481. The pivotable rear wall 482 and pivotable top wall 483 are also in their respective substantially collapsed configurations (shown in FIGS. 15-17), with the pivotable rear wall 482 resting on top of the folded pivotable first and second side walls 484 and 485 and the pivotable top wall 483 resting on top of the pivotable rear wall 482 (or vice versa in embodiments where the at least one top wall hinge 498 allows substantially 360° motion relative to the x-axis of the reference coordinate 454). The collapsible desk 451 in the collapsed desk configuration can then be retracted relative to the fourth and first lift members 186 and 180 by rolling the first and second side wall tracks 466 and 467 relative to the first and second attachment rollers 476 and 477 of the fourth and first lift members 186 and 180 in a retraction direction 706 (shown in FIG. 17).

In contrast, when the lift members 102 are in the extended configuration and the vehicle cover 106 is in the second extended configuration, the collapsible desk 451 can be expanded into the extended desk configuration by the operator to increase the internal volume between the vehicle cover 106 and the vehicle bed 104, to provide privacy along at least one of the long edges (such as the right or left edges 123 and 127) of the vehicle bed 104, and/or to provide desk functionality to the operator. To move from the collapsed desk configuration to the extended desk configuration, the collapsible desk 451 in the collapsed configuration may first be extended relative to the fourth and first lift members 186 and 180 in an extension direction 707 (shown in FIG. 17) by rolling the first and second side wall tracks 466 and 467 relative to the first and second attachment rollers 476 and 477 of the fourth and first lift members 186 and 180. Once extended relative to the fourth and first lift members 186 and 180, the pivotable rear wall 482 may be rotated from its substantially horizontal configuration (shown in FIGS. 15-17) about the at least one rear wall hinge 494 in the upward direction 491 to the substantially vertical configuration (shown in FIGS. 18-20); additionally, the pivotable top wall 483 may be rotated from its substantially folded configuration (shown in FIGS. 15-17) about the at least one top wall hinge 498 in the upward or downward directions 491 and 492 to the substantially extended configuration (shown in FIGS. 18-20). Next, the pivotable first and second side walls 484 and 485 may be rotated from their respective substantially horizontal configurations (shown in FIGS. 15-19) about the first and second side wall hinges 704 and 705 respectively in the left or right directions 701 and 702 respectively to their respective substantially vertical configurations (shown in FIG. 20). Once the pivotable first and second side walls 484 and 485 are rotated to their respective substantially vertical configurations, the pivotable rear wall 482 is rotated to its substantially vertical configuration and the pivotable top wall 483 is rotated to its extended configuration, the collapsible desk 451 in its extended desk configuration may be secured. For example, attachment features on the side edges of the pivotable top wall 483 may be coupled with the corresponding attachment features on the respective top edges of the pivotable first and second side walls 484 and 485. When the collapsible desk 451 is in the extended desk configuration, the collapsible desk 451 increases its height to the combination of the fixed lower portion 460 and the collapsible upper portion 480, with the length still approximately equal to the length 710 (shown in FIG. 16), the width approximately equal to the width 711 (shown in FIG. 15) and the height equal to the height 712 combined with the height of the pivotable rear wall 482.

ii) Retractable Bed 730

Figure 21:
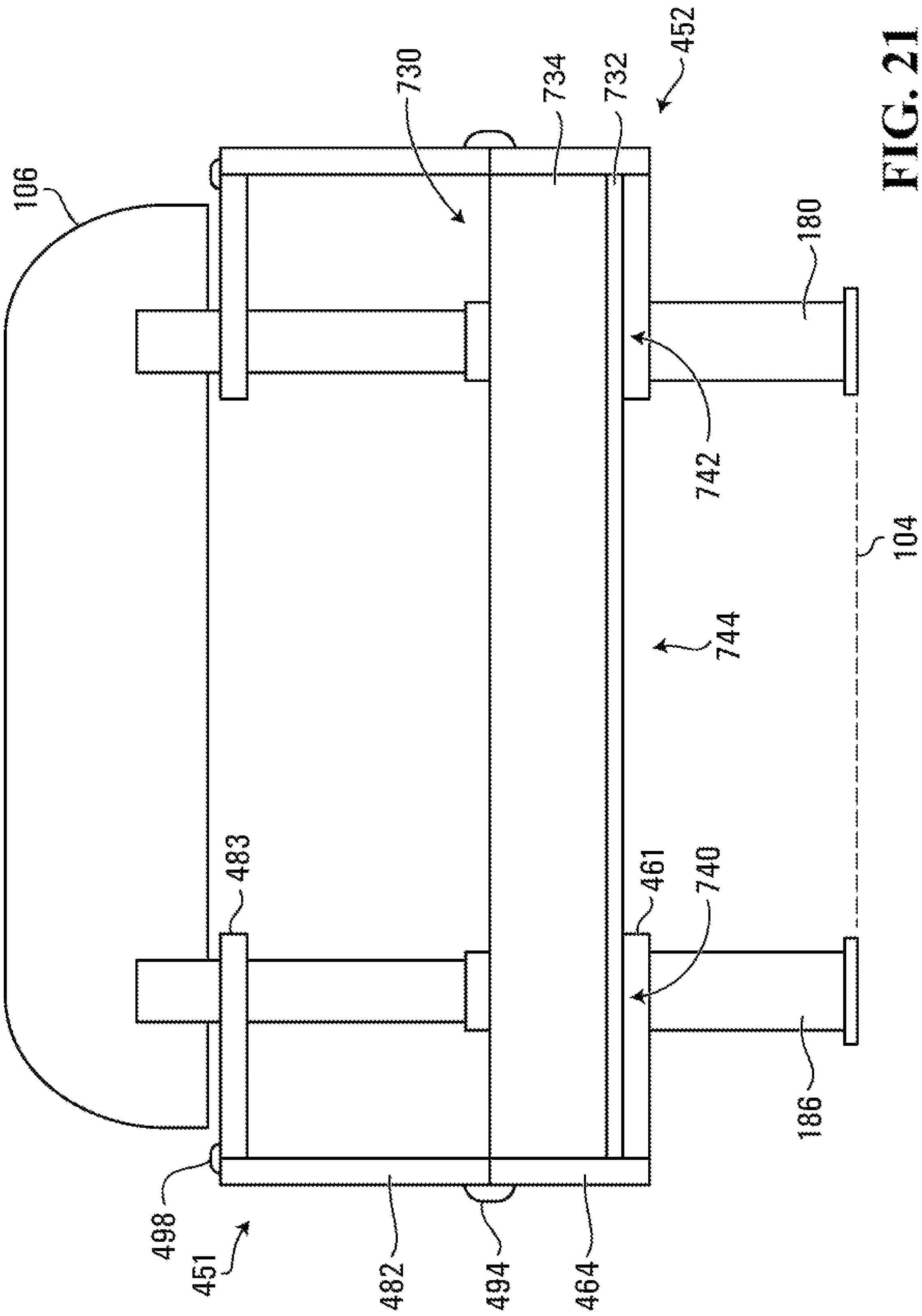
FIG. 21 is a cutaway elevation view of a retractable bed configured to be coupled between two collapsible desks, each collapsible desk configured to be coupled between at least two lift members of the vehicle system of FIG. 1.

Another embodiment of the collapsible structure may comprise a retractable bed formed using the first and second collapsible desks 451 and 452 and shown generally at 730 in FIGS. 21. In the embodiment shown, the retractable bed 730 may additionally include support slats 732 and a mattress 734. The support slats 732 may comprise a first side portion 740, a second side portion 742 and a middle portion 744. The support slats 732 are configured and dimensioned such that, in use, the first side portion 740 rests on the fixed bottom wall 461 of the first collapsible desk 451, the second side portion 742 rests on a corresponding fixed bottom wall of the second collapsible desk 452, and the middle portion 744 spans a separation distance between the first and second collapsible desks 451 and 452 above the bed surface 128. In the embodiment shown, the support slats 732 have a total length of approximately 84 inches and a total width of approximately 52 inches and is made of a wood-based material. Each slat of the support slats 732 has an individual length of approximately 84 inches and an individual width of approximately 2 inches. In other embodiments, depending on dimensions of the vehicle bed 104 and the extension distance 478 (shown in FIG. 17) of the first and second collapsible desks 451 and 452 relative to their respective lift members, the support slats 732 may have a total length ranging between approximately 80 and 88 inches and a total width ranging between approximately 40 and 80 inches. In yet other embodiments, each slat of the support slats 732 may have an individual length ranging between approximately 80 and 88 inches and an individual width ranging between approximately 1 and 4 inches.

The mattress 734 is configured to rest upon the support slats when the support slats are positioned on and between the fixed bottom walls 461 of the first and second collapsible desks 451 and 452. In the embodiment shown, the mattress 734 has dimensions corresponding to the total length and the total width of the support slats 732, and specifically has a length of approximately 84 inches and a width of approximately 52 inches. In other embodiments, and depending on the dimensions of the support slats 732, the mattress 734 may have a length ranging between approximately 72 and 84 inches and a width ranging between approximately 40 and 78 inches.

Figure 15:
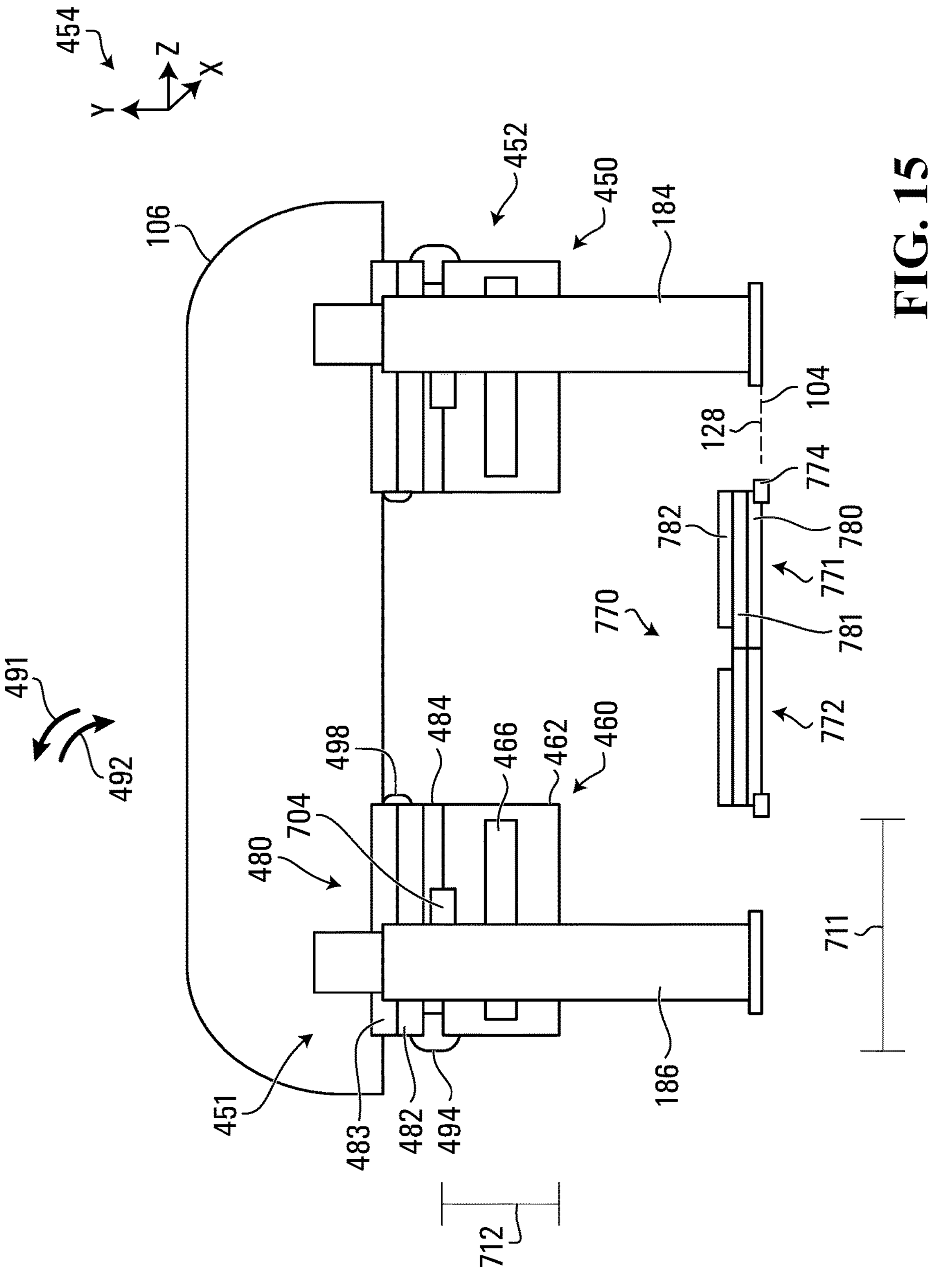
FIGS. 15-19 are end and side elevation views of a collapsible desk configured to be coupled between at least two lift members of the vehicle lift system of FIG. 1 transitioning between a collapsed desk configuration and an extended desk configuration.
Figure 16:
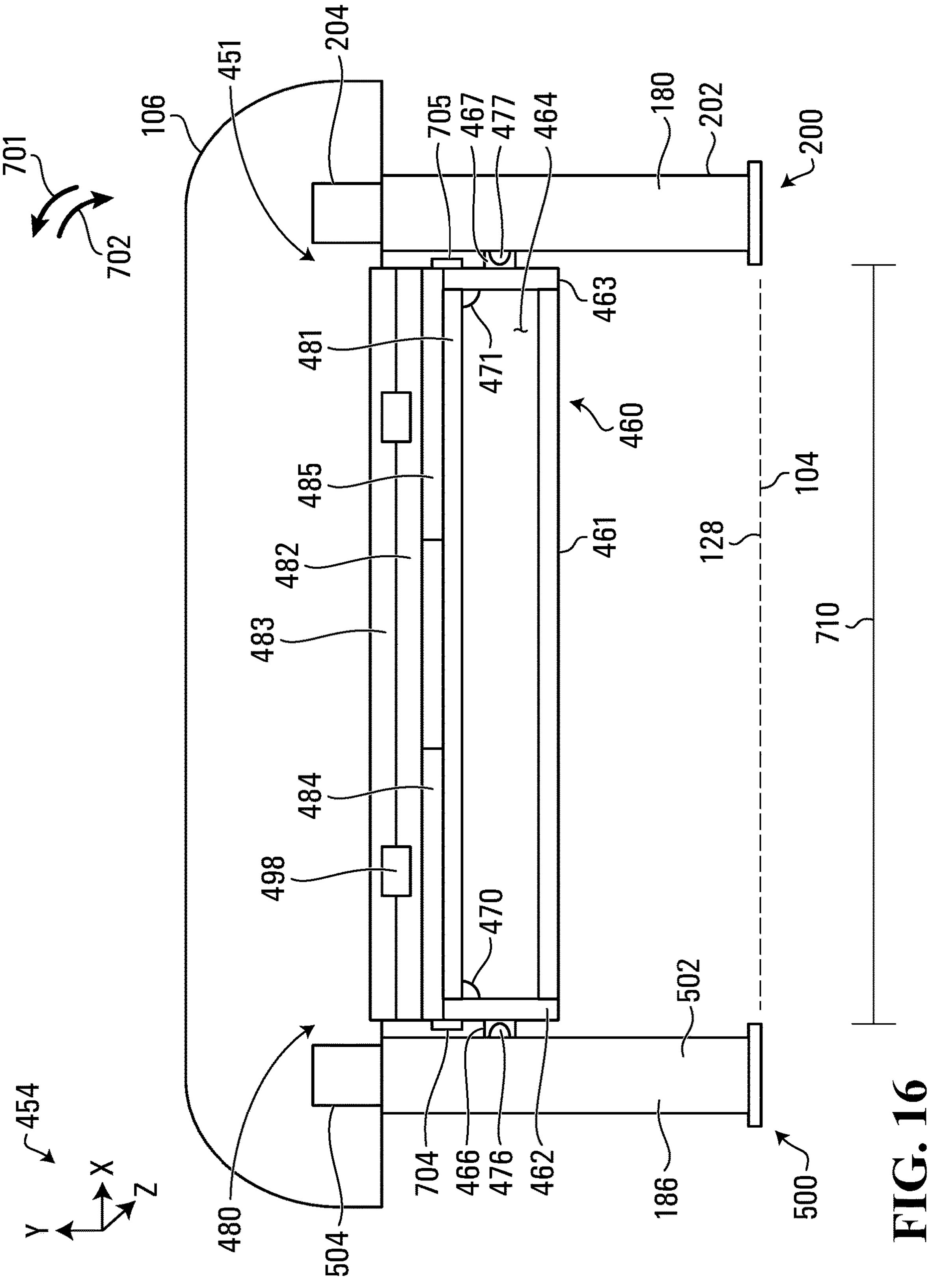

In operation and from the collapsed configuration of the lift members 102 and the vehicle cover 106 shown in FIG. 15, an operator may first extend the plurality of lift members 102 to the extended configuration and the vehicle cover 106 to the second extended configuration. The operator may then slide the first and second collapsible desks 451 and 452 relative to the lift members 102 from the retracted position (shown in FIG. 15) to the extended position (shown in FIG. 17). The operator may then, as applicable depending on the number of components of the first and second collapsible desks 451 and 452, move the respective pivotable rear walls (such as the pivotable rear wall 482) of the first and second collapsible desks 451 and 452 to the substantially vertical configuration (shown in FIGS. 18-21), move the respective pivotable top walls (such as the pivotable top wall 483) of the first and second collapsible desks 451 and 452 to the extended configuration (shown in FIG. 18-21), and move the respective pivotable first and second side walls (such as the pivotable first and second side walls 484 and 485) of the first and second collapsible desks 451 and 452 to their respective substantially vertical configurations (shown in FIG. 20). The operator may then remove the movable bottom wall (such as the movable bottom wall 481) of the first and second collapsible desks 451 and 452, position the support slats 732 with the first side portion 740 supported by the fixed bottom wall 461 of the first collapsible desk 451 and the second side portion 742 supported by the fixed bottom wall of the second collapsible desk 452, and finally position the mattress 734 on top of the support slats 732.

iii) Retractable Table 750

Figure 22:
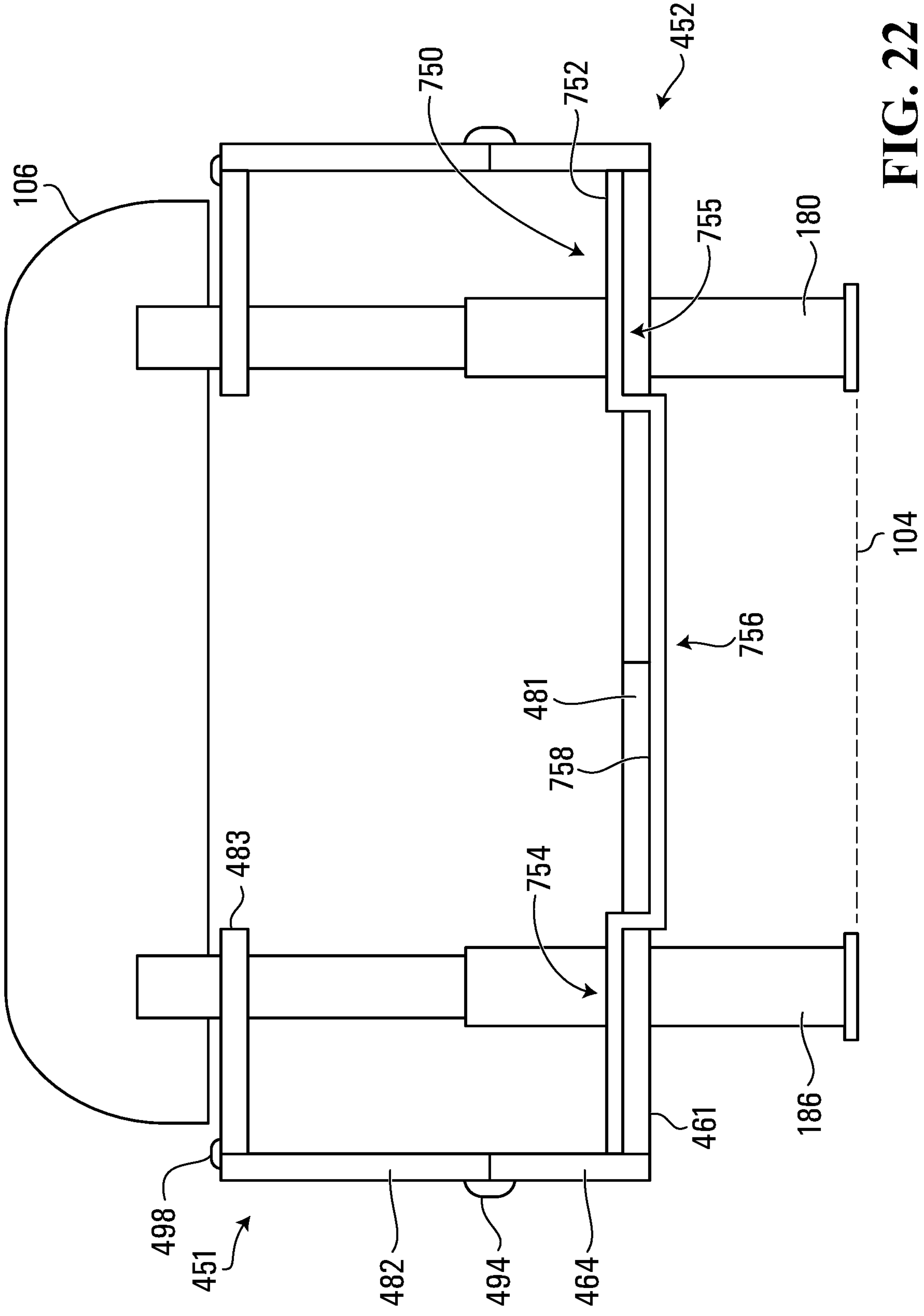
FIG. 22 is a cutaway elevation view of a retractable table configured to be coupled between two collapsible desks, each collapsible desk configured to be coupled between at least two lift members of the vehicle system of FIG. 1.
Figure 23:
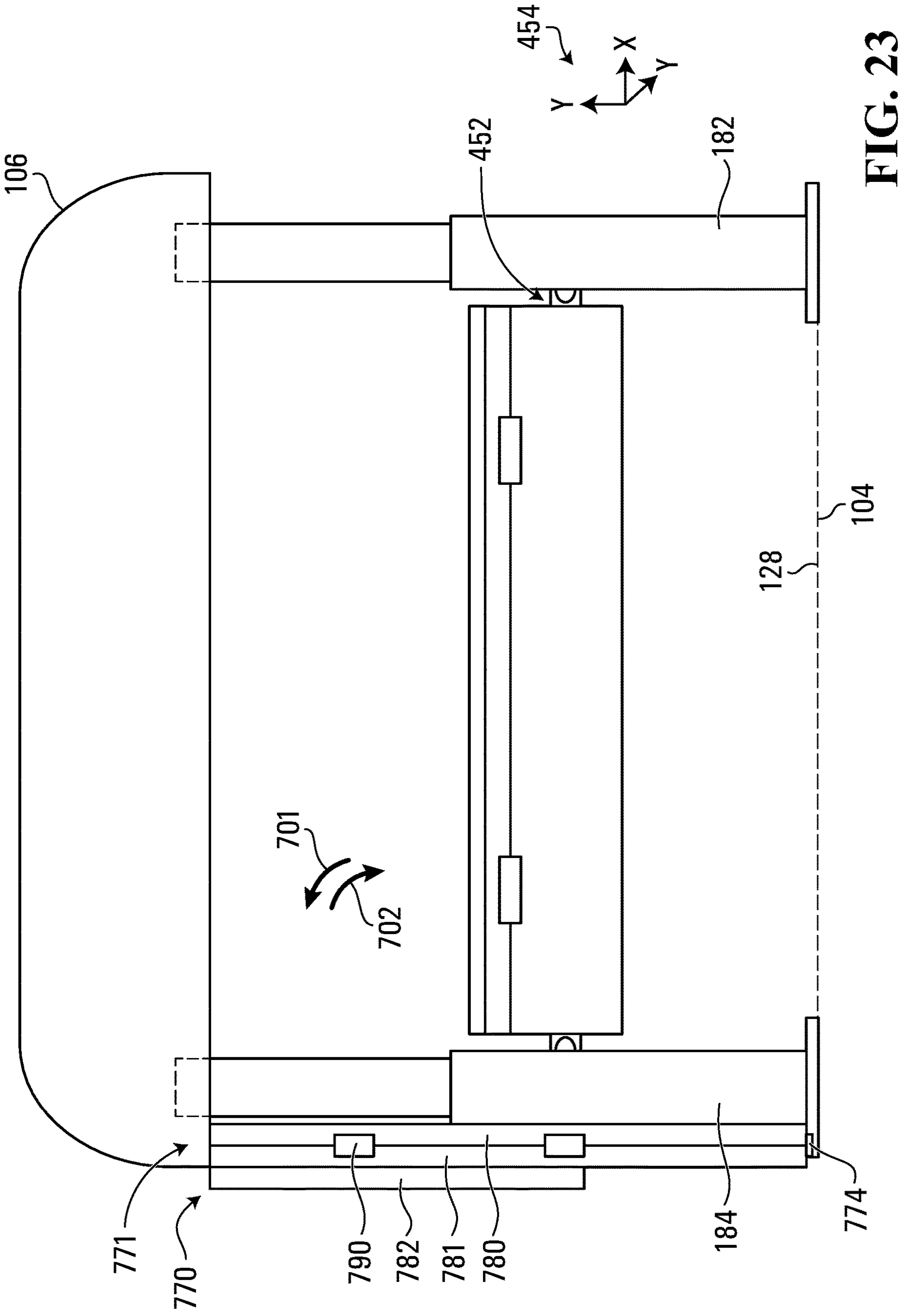
FIGS. 23-26 are end and side elevation views of a collapsible door configured to be coupled to a bed surface of a vehicle bed transitioning between a folded and substantially horizontal configuration and an expanded and substantially vertical configuration.
Figure 24:
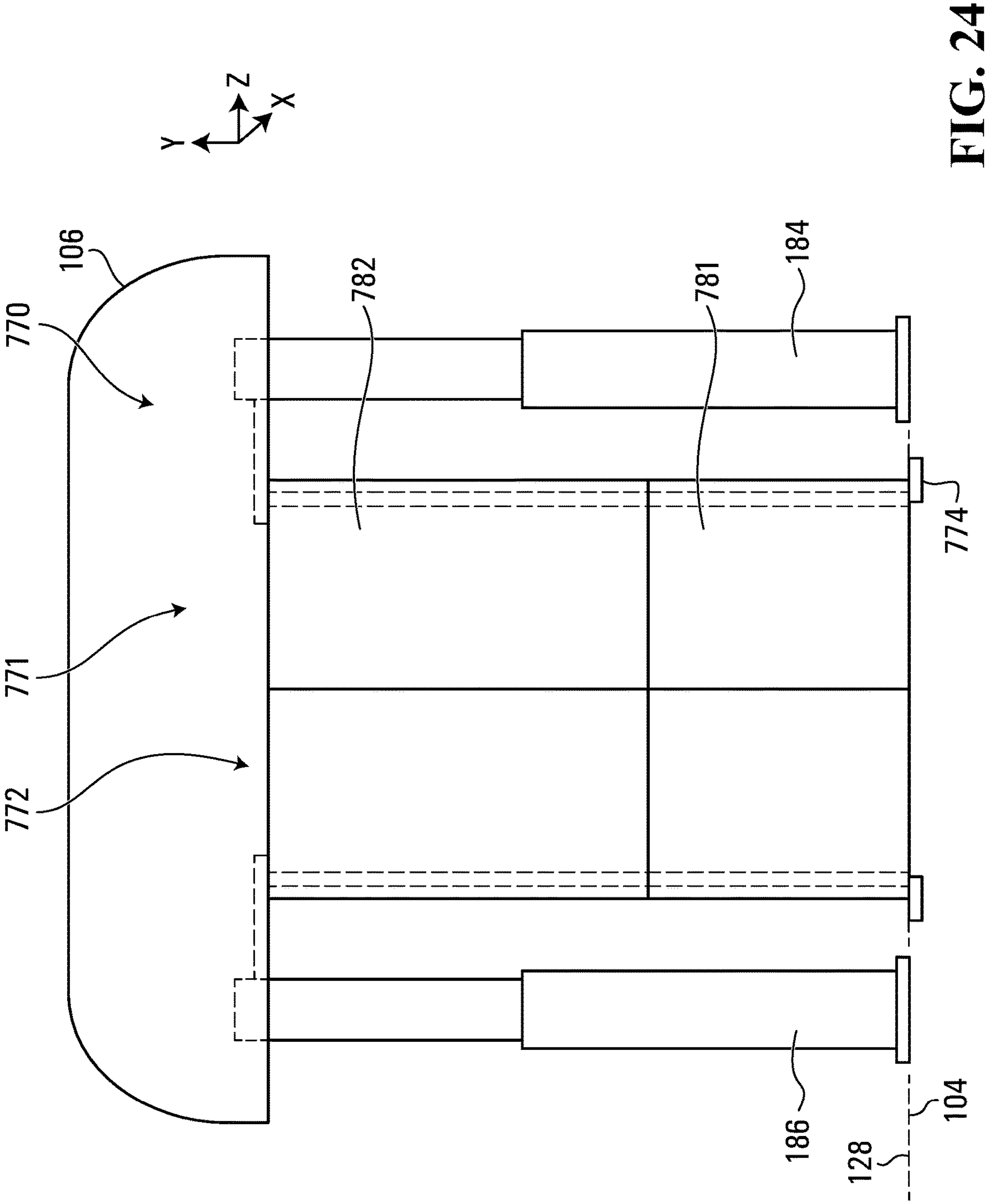

Another embodiment of collapsible structure may comprise a retractable table formed using the first and second collapsible desks 451 and 452 and shown generally at 750 in FIG. 22. In the embodiment shown, the retractable table 750 additionally comprises recessed slats 752. The recessed slats 752 comprises a first side portion 754, a second side portion 755 and a recessed middle portion 756. The recessed slats 752 are dimensioned and configured such that, in use, the first side portion 754 rests on the fixed bottom wall 461 of the first collapsible desk 451, the second side portion 755 rests on a corresponding fixed bottom wall of the second collapsible desk 452, and the recessed middle portion 756 spans the separation distance between the first and second collapsible desks 451 and 452 above the bed surface 128. The recessed middle portion 756 includes a recessed support surface 758 generally dimensioned to receive panels to bridge the separation distance between the first and second collapsible desks 451 and 452 to form a working surface or desk. In the embodiment shown, the recessed slats 752 are dimensioned and configured such that, when in use, the recessed support surface 758 is positioned below the fixed bottom walls (such as the fixed bottom wall 461) of the first and second collapsible desks 451 and 452 to allow the panels supported by the recessed support surface 758 to be substantially flush with the fixed bottom walls 461 of the first and second collapsible desks 451 and 452. Additionally, in the embodiment shown, the panels supported by the recessed support surface 758 are the movable bottom wall 481 of the first collapsible desk 451 and the corresponding movable bottom wall of the second collapsible desk 452. In such embodiments, the recessed support surface 758 has a width of approximately 38 inches and a length of approximately 52 inches, and may be recessed relative to the first and second side portions 754 and 755 by a height of approximately 1 inch. In other embodiments, depending on the separation distance between the first and second collapsible desks 451 and 452, the recessed support surface 758 may have a width ranging between approximately 34 and 42 inches and a length ranging between approximately 40 and 82 inches; and depending on a thickness of the fixed bottom walls and the movable bottom walls of the first and second collapsible desks 451 and 452, the recessed support surface 758 may have a height ranging between approximately 0.25 and 2 inches.

In operation and from the collapsed configuration of the lift members 102 and the vehicle cover 106 shown in FIG. 15, an operator may first extend the plurality of lift members 102 to the extended configuration and the vehicle cover 106 to the second extended configuration. The operator may then slide the first and second collapsible desks 451 and 452 relative to the lift members 102 from the retracted position (shown in FIG. 15) to the extended position (shown in FIG. 17). The operator may then, as applicable and depending on the number of components of the first and second collapsible desks 451 and 452, move the respective pivotable rear walls (such as the pivotable rear wall 482) of the first and second collapsible desks 451 and 452 to the substantially vertical configuration (shown in FIGS. 18-21), move the respective pivotable top walls (such as the pivotable top wall 483) of the first and second collapsible desks 451 and 452 to the extended configuration (shown in FIG. 18-21), and move the respective first and second side walls (such as the pivotable first and second side walls 484 and 485) of the first and second collapsible desks 451 and 452 to their respective substantially vertical configurations (shown in FIG. 20). The operator can then remove the movable bottom wall (such as the movable bottom wall 481) of the first and second collapsible desks 451 and 452, position the recessed slats 752 with the first side portion 754 supported by the fixed bottom wall 461 of the first collapsible desk 451 and the second side portion 755 supported by the fixed bottom wall of the second collapsible desk 452, and finally position the movable bottom walls (such as the movable bottom wall 481) of the first and second collapsible desks 451 and 452 on top of the recessed support surface 758.

iv) Collapsible Door 770

Referring to FIGS. 15 and 23-26, another embodiment of collapsible structure comprises a collapsible door shown generally at 770. The collapsible door 770 is generally configured to extend across the bottom edge 125 (shown in FIG. 1) of the vehicle bed 104 and can provide privacy by supplying a wall along the bottom edge 125 for the internal volume between the vehicle bed and cover 104 and 106 when the plurality of lift members 102 are in the extended configuration and the vehicle cover 106 is in the second extended configuration. The collapsible door 770 is generally configured to be moved by the operator between a substantially horizontal configuration (shown in FIG. 15) on the bed surface 128 in which the collapsible door 770 is adapted to fit in the small internal volume when the vehicle cover 106 is in the collapsed configuration; and a substantially vertical configuration (shown in FIG. 24) in which the collapsible door 770 is adapted to span a vertical separation distance between the bed surface 128 and the horizontal ledge 174, 175 of the vehicle cover 106 when the vehicle cover 106 is in the second extended configuration; and finally to an extended configuration (shown in FIGS. 25 and 26) in which the collapsible door 770 is adapted to span across the bottom edge 125 and a portion of the left and right edges 127 and 123 of the vehicle bed 104 to provide a privacy barrier across the bottom edge 125 and the portion of the left and right edges 127 and 123.

Referring to FIGS. 15 and 23-26, in the embodiment shown, the collapsible door 770 includes a first door portion 771 and a second door portion 772. In the embodiment shown, the first and second door portions 771 and 772 are substantially identical and are mirror images of each other. Specific components of the first door portion 771 are described in detail below, and one of ordinary skill in the art would appreciate that the same components and descriptions are applicable to the second door portion 772.

The first door portion 771 includes a first panel 780, a second panel 781 pivotably coupled to the first panel 780 via at least one central hinge 790, and a third panel 782 pivotably coupled to the second panel 781 via at least one side hinge 794. In the embodiment shown, the first panel 780 has a width of approximately 18 inches and a height of approximately 60 inches, the second panel 781 has a width of approximately 15 inches and a height of approximately 60 inches, and the third panel 782 has a width of approximately 9 inches and a height of approximately 41 inches. In other embodiments, and depending on a width of the bottom edge 125 and the corresponding dimensions of the other panels of the first door portion 771, the first panel 780 may have a width ranging between approximately 14 and 20 inches and a height ranging between approximately 60 and 72 inches; the second panel 781 may have a width ranging between approximately 13 and 17 inches and a height ranging between approximately 60 and 72 inches; and finally, the third panel 782 may have a width ranging between approximately 4 and 10 inches and a height ranging between approximately 40 and 72 inches. In the embodiment shown, the first, second and third panels 780, 781 and 782 comprise a generally flat, continuous and substantially opaque surface made of a wood-based material and may generally function as a hard and non-flexible privacy barrier and door. In other embodiments, the first, second and third panels 780, 781 and 782 may instead comprise a substantially transparent surface. Additionally, in other embodiments, the first, second and third panels 780, 781 and 782 may be made may be made of aluminium, stainless steel, fiberglass, rigid foam insulation, ABS thermoplastic, carbon fibre, polycarbonate, plexiglass, wood, or fibre-reinforced plastic board for example.

The entire first door portion 771 is pivotally coupled or pivotably engaged to the bed surface 128 via at least one portion pivot 774. The at least one portion pivot 774 generally allows the entire first door portion 771 to be pivoted in the left and right directions 701 and 702 (shown in FIG. 26) relative to the z-axis of the reference coordinate 454, such that the entire first door portion 771 is movable between the substantially horizontal configuration (shown in FIG. 15) and the substantially vertical configuration (shown in FIG. 23). The at least one portion pivot 774 may include one or more internal components which maintain the entire first door portion 771 in the substantially vertical configuration when moved to that configuration, and may comprise a constant torque hinge, friction or stop hinge, a detent hinge and the like. In certain embodiments, the first door portion 771 further includes at least one attachment component generally configured to couple the first door portion 771 to the vehicle cover 106 when the first door portion 771 is in the substantially vertical configuration. For example, a top edge of the first panel 780 and/or a top edge of the second panel 781 and the cover rear wall 172 may include corresponding attachment features (not shown) to couple the first door portion 771 to the vehicle cover 106 and to maintain the first door portion 771 in the substantially vertical configuration. The attachment features may comprise corresponding magnetic fastenings, corresponding mechanical fastenings, corresponding suction-based fastenings and the like. In certain embodiments (not shown), the first door portion 771 is also coupled to the bed surface 128 via at least one gas spring, the at least one gas spring configured to assist the operator in moving the entire first door portion 771 between the substantially horizontal configuration and the substantially vertical configuration.

Figure 25:
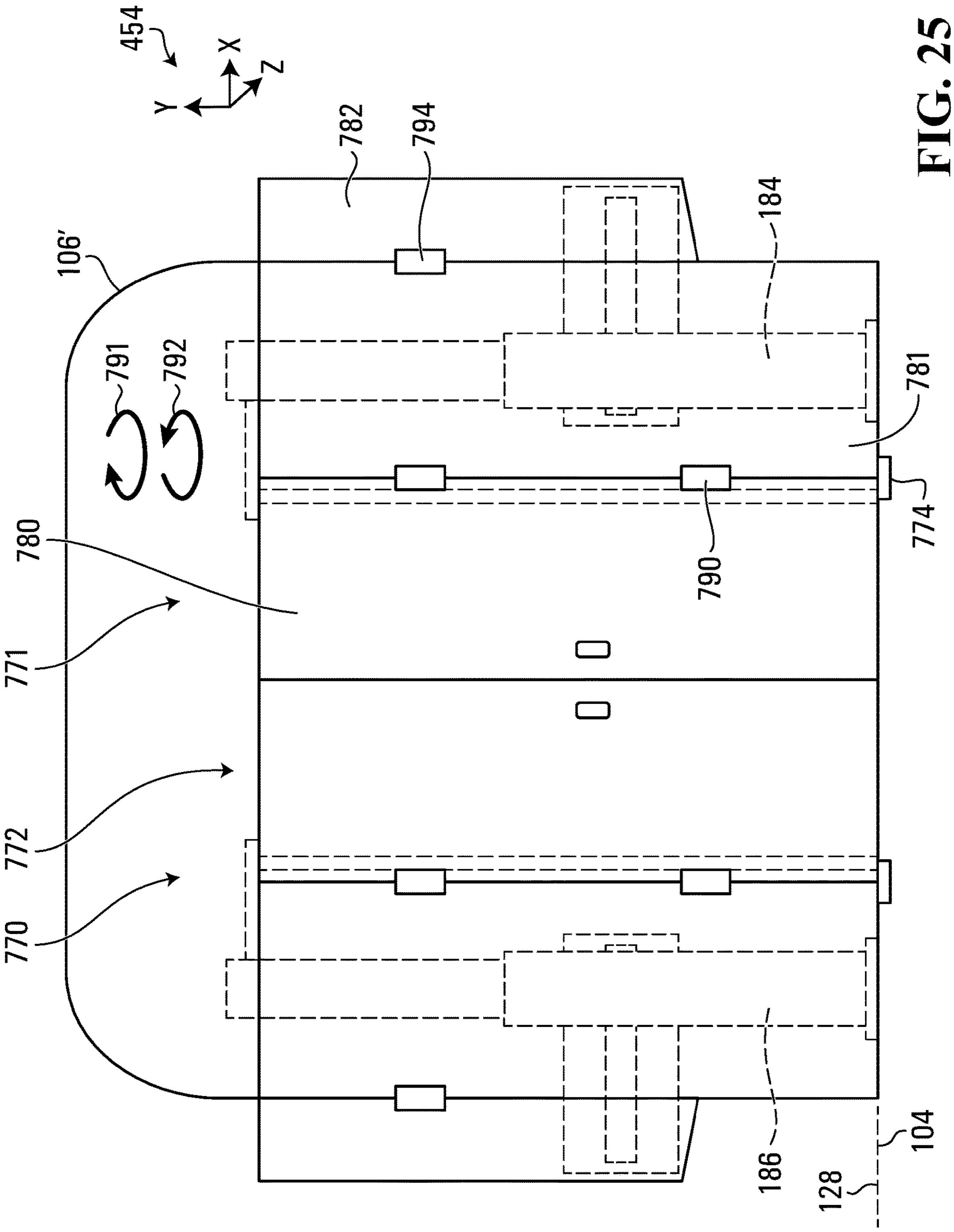
Figure 26:
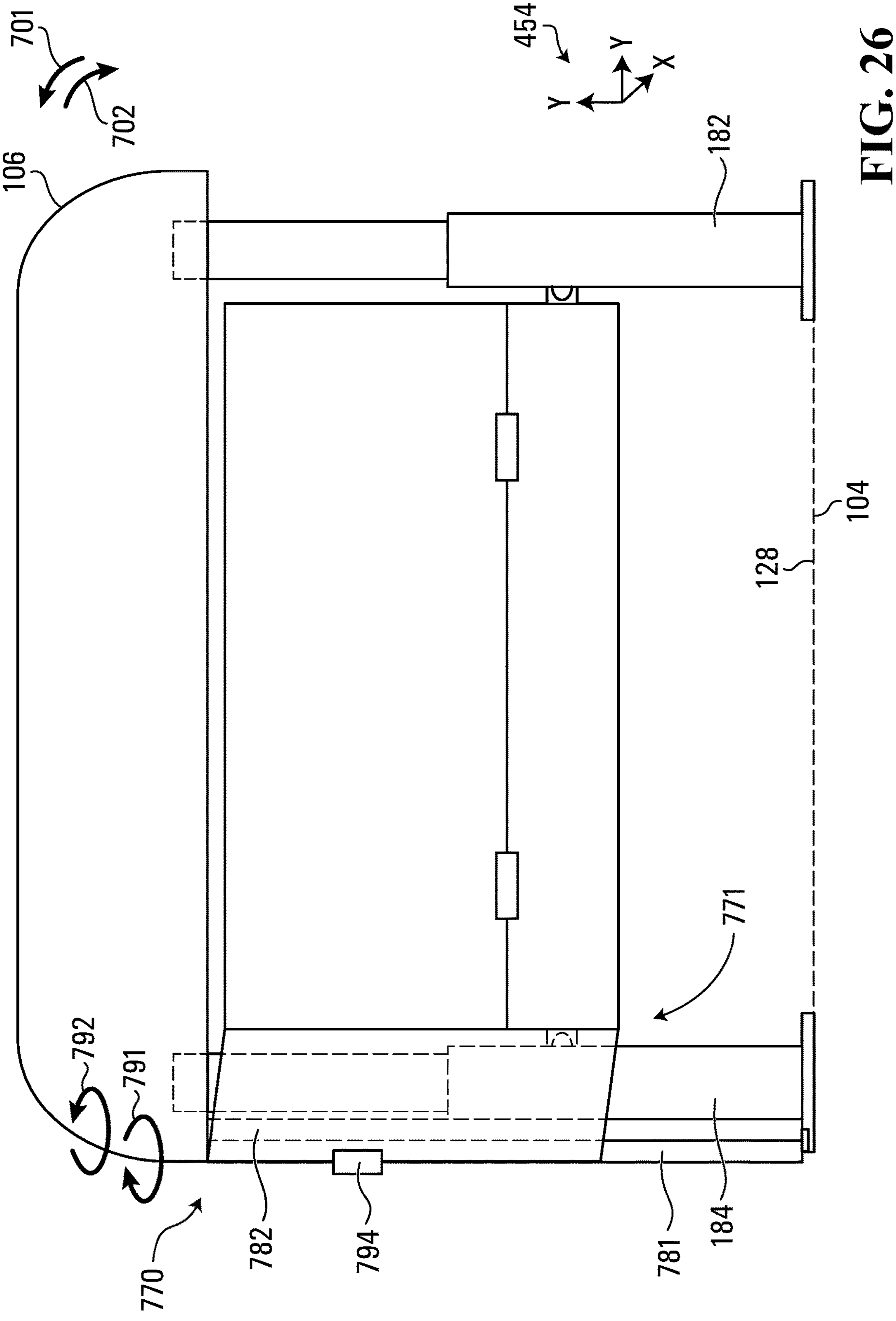

The at least one central hinge 790 generally allows the second panel 781 to be pivoted in a clockwise direction 791 and a counter-clockwise direction 792 (shown in FIGS. 25 and 26) relative to the y-axis of the reference coordinate 454, such that the second panel 781 is movable between a folded configuration (shown in FIGS. 14, 23 and 24) and an extended configuration (shown in FIGS. 25 and 26). The at least one central hinge 790 may include one or more internal components which maintain the second panel 781 in the extended configuration when moved that configuration. Additionally or alternatively, the second panel 781 may further include one or more components generally configured to couple the second panel 781 to the vehicle cover 106 when the second panel 781 is in the extended configuration. For example, the top edge of the second panel 781 and the cover rear wall 172 may include corresponding attachment features (not shown) to couple the second panel 781 to the vehicle cover 106 and to maintain the second panel 781 in the extended configuration. The at least one central hinge 790 may also allow the first panel 780 to be pivoted in the clockwise and counter-clockwise directions 791 and 792 relative to the second panel 781, such that the first panel 780 may be opened and closed relative to the second and third panels 781 and 782. This may allow the first panel 780 to function as a door into the internal volume between the vehicle bed 104 and the vehicle cover 106.

The at least one side hinge 794 may allow the third panel 782 to be pivoted in the clockwise and counter-clockwise directions 791 and 792 (shown in FIGS. 25 and 26) relative to the y-axis of the reference coordinate 454, such that the third panel 782 is movable between a folded configuration (shown in FIGS. 15, 23 and 24) and an extended configuration (shown in FIGS. 25 and 26). The at least one side hinge 794 may also include one or more internal components which maintain the third panel 782 in the extended configuration when moved to that configuration. Additionally or alternatively, the third panel 782 may also include one or more components generally configured to couple the third panel 782 to the second collapsible desk 452 once the third panel 782 is in the extended configuration. For example, a side edge of the third panel 782 and the fixed and pivotable side walls of the second collapsible desk 452 may include corresponding attachment features to couple the third panel 782 to the second collapsible desk and to maintain the third panel 782 in the extended configuration.

In operation and from the collapsed configuration of the lift members 102 and the vehicle cover 106 shown in FIG. 15, an operator may first extend the plurality of lift members 102 to the extended configuration and the vehicle cover 106 to the second extended configuration. The operator may then pivot the entire first and second door portions 771 and 772 about the portion pivot (such as the portion pivot 774) in the left direction 701 to the substantially vertical configuration (shown in FIGS. 23 and 24), and may optionally secure the first and second door portions 771 and 772 in their respective substantially vertical configurations to the vehicle cover 106 to maintain the first and second door portions 771 and 772 in the substantially vertical configuration. Thereafter, the operator may then pivot the second panels (such as the second panel 781) relative to the respective first panels (such as the first panel 780) of both the first and second door portions 771 and 772 in the counter-clockwise direction 792 about the at least one central hinge (such as the at least one central hinge 790) to the extended configuration (shown in FIGS. 25 and 26). The operator may then pivot the third panels (such as the third panel 782) relative to the respective second panels (such as the second panel 781) of both the first and second door portions 771 and 772 either in the clockwise or counter-clockwise directions 791 and 792 about the at least one side hinge (such as the at least one side hinge 794) to the extended configuration (shown in FIGS. 25 and 26), and may optionally secure the third panels in the extended configuration to the first and second collapsible desks 451 and 452 to maintain the third panels in the extended configuration. Once the first and second door portions 771 and 772 are fully extended, the first panels may pivoted about the at least one central hinge to generally function a door into and out of the internal volume formed between the bed surface 128 and the cover surface 168.

In combination, the vehicle cover lift system 100 enables operators to convert vehicles which have a small internal volume between the vehicle bed and vehicle cover into a one having a larger internal volume for recreational, commercial or office use. The vehicle cover lift system 100 can also improve access to the internal volume for loading or unloading the vehicle bed. The disclosed lift members (such as the lift members 200, 200', 500 and 500' for example) can allow for simple attachment to the vehicle bed without significant physical alterations to the vehicle bed. The use of both passive and active actuators within the disclosed lift members (such as the active actuators 232, 332, 534, and 634 and the passive actuators 234, 334, 532 and 632 for example) may provide a less expensive and less complex control system for enabling a two-stage lift of the vehicle cover. Additionally, the collapsible structures (such as the collapsible desks 451 and 452, the retractable bed 730, the retractable table 750 and the collapsible door 770 for example) combined with the vehicle cover lift system 100 may reduce the need to move additional structures into an out of the internal volume between the vehicle bed and vehicle cover for additional workspace or sleeping space functionality.

While specific embodiments have been described and illustrated, such embodiments should be considered illustrative of the subject matter described herein and not as limiting the claims as construed in accordance with the relevant jurisprudence.

The invention claimed is:

1. A system for modifying a separation distance between a vehicle cover and a vehicle bed, the system comprising:
- a plurality of lift members coupled to the vehicle bed and the vehicle cover, each lift member comprising:
  - an active actuator actuatable to extend each lift member; and
  - a passive actuator operable to extend each lift member,
- wherein actuating the active actuator of first ones of the plurality of lift members causes the passive actuator of second ones of the plurality of lift members to extend to move the vehicle cover away from the vehicle bed by a first separation distance, and wherein actuating the active actuator of the second ones of the plurality of lift members causes the passive actuator of the first ones of the plurality of lift members to extend to move the vehicle cover away from the vehicle bed by a second separation distance.

2. The system of claim 1 wherein the plurality of lift members comprise at least four lift members.

3. The system of claim 1 wherein the plurality of lift members comprise an even number of lift members.

4. The system of claim 1 wherein, for each lift member of the first ones of the plurality of lift members:

the active actuator comprises a large actuator configured to move the vehicle cover between a collapsed configuration and a first extended configuration; and the passive actuator comprises a small actuator configured to move the vehicle cover between the first extended configuration and a second extended configuration.

5. The system of claim 1 wherein, for each lift member of the second ones of the plurality of lift members:

the active actuator comprises a small actuator configured to move the vehicle cover between a first extended configuration and a second extended configuration; and the passive actuator comprises a large actuator configured to move the vehicle cover between a collapsed configuration and the first extended configuration.

6. The system of claim 1 wherein each lift member of the plurality of lift members is configured to be coupled to the vehicle bed with a single fastener.

7. The system of claim 1 wherein each lift member of the plurality of lift members is configured to be coupled to the vehicle bed at a bed bolt aperture.

8. The system of claim 1 further comprising a control system for controlling actuation of the active actuator of each lift member of the plurality of lift members in response to user input.

9. The system of claim 1 further comprising at least one frame, the at least one frame attached between at least two of the plurality of lift members.

10. The system of claim 1 further comprising:

a collapsible structure slidably engaged with, and supported between, two lift members of the plurality of lift members, wherein the collapsible structure comprises:

a fixed lower portion comprising a fixed bottom wall, a fixed rear wall and fixed first and second sidewalls; and a collapsible upper portion comprising a movable bottom wall, a pivotable rear wall, a pivotable top wall and pivotable first and second sidewalls.

11. The system of claim 1 further comprising:

a collapsible structure pivotably engaged with a bed surface of the vehicle bed, the collapsible structure comprising at least two panels.

12. A method of modifying a separation distance between a vehicle cover and a vehicle bed with a plurality of lift members coupled to the vehicle cover and the vehicle bed, each lift member of the plurality of lift members comprising an active actuator and a passive actuator, the method comprising:

actuating the active actuator of first ones of the plurality of lift members to cause the passive actuator of second ones of the plurality of lift members to extend to move the vehicle cover away from the vehicle bed by a first separation distance; and actuating the active actuator of the second ones of the plurality of lift members to cause the passive actuator of the first ones of the plurality of lift members to extend to move the vehicle cover away from the vehicle bed by a second separation distance.

13. The method of claim 12 wherein actuating the active actuator of the first ones of the plurality of lift members is performed prior to actuating the active actuator of the second ones of the plurality of lift members.

14. The method of claim 12 wherein actuating the active actuator of the first ones of the plurality of lift members comprises actuating a large active actuator configured to move the vehicle cover between a collapsed configuration and a first extended configuration.

15. The method of claim 12 wherein actuating the active actuator of the second ones of the plurality of lift members comprises actuating a small active actuator configured to move the vehicle cover between a first extended configuration and a second extended configuration.

16. The method of claim 12 further comprising, when the vehicle cover is in a second extended configuration:

sliding a collapsible structure slidably engaged with, and supported between, two of the plurality of lift members in an extension direction relative to the two of the plurality of lift members, the collapsible structure comprising a fixed lower portion and a collapsible upper portion; and expanding the collapsible upper portion of the collapsible structure.

17. The method of claim 12 further comprising, when the vehicle cover is in a second extended configuration:

pivoting a collapsible structure in an upward direction relative to a bed surface of the vehicle bed, the collapsible structure comprising at least two panels; and expanding the at least two panels of the collapsible structure.

18. The method of claim 12 wherein the plurality of lift members comprise at least four lift members.

19. The method of claim 12 wherein the plurality of lift members comprise an even number of lift members.

20. The method of claim 12 wherein each lift member of the plurality of lift members is configured to be coupled to the vehicle bed with a single fastener.

* * * * *